(12) United States Patent
Iwago et al.

(10) Patent No.: US 7,694,963 B2
(45) Date of Patent: Apr. 13, 2010

(54) DOCUMENT FEEDER

(75) Inventors: Toshitaka Iwago, Nagoya (JP); Ryoichi Matsushima, Nagoya (JP); Yoichi Horaguchi, Tajimi (JP); Nobuhiko Suzuki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 538 days.

(21) Appl. No.: 11/581,368

(22) Filed: Oct. 17, 2006

(65) Prior Publication Data
US 2007/0085258 A1   Apr. 19, 2007

(30) Foreign Application Priority Data
Oct. 17, 2005   (JP)   ............... 2005-302384
Feb. 22, 2006   (JP)   ............... 2006-045932

(51) Int. Cl.
B65H 7/02 (2006.01)
B65H 5/22 (2006.01)
B65H 83/00 (2006.01)
G03G 15/00 (2006.01)

(52) U.S. Cl. ............... 271/258.01; 271/3.14; 271/3.01; 399/364; 399/381

(58) Field of Classification Search ............... 271/3.14, 271/255, 186, 3.01, 258.01
See application file for complete search history.

(56) References Cited

U.S. PATENT DOCUMENTS

| 5,926,681 A * | 7/1999 | Ishimaru | 399/367 |
| 5,947,464 A * | 9/1999 | Takada | 271/3.03 |
| 6,161,831 A * | 12/2000 | Kusakabe et al. | 271/186 |
| 6,215,976 B1 * | 4/2001 | Shida et al. | 399/367 |
| 6,354,589 B1 * | 3/2002 | Taruki et al. | 271/265.01 |
| 6,522,860 B2 * | 2/2003 | Nose et al. | 399/374 |
| 6,529,259 B1 * | 3/2003 | Kono | 355/23 |
| 6,648,320 B2 * | 11/2003 | Iino et al. | 271/3.15 |

(Continued)

FOREIGN PATENT DOCUMENTS

JP   8085649   4/1996

(Continued)

OTHER PUBLICATIONS

Office Action dated Feb. 17, 2009 in corresponding Japanese Application No. P 2006-045932. Partial translation only.

Primary Examiner—Patrick H Mackey
Assistant Examiner—Patrick Cicchino
(74) Attorney, Agent, or Firm—Banner & Witcoff, Ltd

(57) ABSTRACT

In a document feeder, a driving control unit feeds a document by a switch-back feeding unit, guides again the document from a document feed path to a bidirectional feed path, and then discharges the document from the document feed path to a document discharging section, when the feeding of the document is in a double-sided scanning feeding mode and in a status during first side feeding. The driving control unit feeds the document by the switch-back feeding unit and then discharges the document from the document feed path, when the feeding of the document is in the double-sided scanning feeding mode and in the status during second side feeding. The driving control unit discharges the document from the document feed path without feeding the document in the switch-back manner, when the feeding of the document is in the double-sided scanning feeding mode and after the second side feeding.

5 Claims, 50 Drawing Sheets

U.S. PATENT DOCUMENTS

| | | | |
|---|---|---|---|
| 7,410,163 B2* | 8/2008 | Yamanaka | 271/186 |
| 7,481,427 B2* | 1/2009 | Tokutsu | 271/186 |
| 2003/0038419 A1* | 2/2003 | Kawai et al. | 271/18 |
| 2003/0214096 A1* | 11/2003 | Onodera | 271/264 |
| 2004/0004319 A1* | 1/2004 | Hattori et al. | 271/10.01 |
| 2004/0212138 A1* | 10/2004 | Kakuta et al. | 271/3.14 |
| 2005/0047813 A1* | 3/2005 | Hosoi et al. | 399/87 |
| 2007/0080490 A1* | 4/2007 | Tu | 271/3.14 |

FOREIGN PATENT DOCUMENTS

| | | |
|---|---|---|
| JP | 8301482 A | 11/1996 |
| JP | 10123766 A | 5/1998 |
| JP | 10268442 | 10/1998 |
| JP | 2005086217 | 3/2005 |

* cited by examiner

-PRIOR ART-

-PRIOR ART-

DOCUMENT FEEDER

CROSS REFERENCE TO RELATED APPLICATION

This application claims priority from Japanese Patent Applications No. 2005-302384, filed on Oct. 17, 2005, and No. 2006-045932, filed on Feb. 22, 2006, the entire subject matters of which are incorporated herein by reference.

TECHNICAL FIELD

Illustrative aspects of the present invention relate to an automatic document feeder suited for the double-sided reading of documents.

BACKGROUND

In the prior art, an image scanner mounted on a copier, a scanner, or a multifunction device having the functions of the former is known to have a document feeder (ADF), feeding a document from a document input tray to a document discharge tray through a feed path. In addition, a document feeder, which reverses the leading end and the trailing end of a document by inverting the document during feeding the document so as to scan the document on both of a first side and a second side of which images are printed and then feeding the document so as to scan both sides of the document, has also been known (for example, see JP-A-8-85649).

FIG. 49 shows a route of a document feeder of the prior art. As shown, a document P placed on a document input tray 100 with a first side (of a first page) is being directed upward is fed by a pickup roller 101 to a transfer path 102. In the transfer path 102, the document P is fed by suitably disposed feed rollers 103 so that its first side is scanned by an image scanning unit while passing through a scanning position X by image sensor such as CCD or CIS. When the document p having first side read is detected at its trailing end by a sensor, reversible rollers 104 are stopped while nipping the trailing end of the document.

As shown in FIG. 50, the document P is fed to a return path 105 by allowing the discharge rollers 104 to rotate reversely. The document P enters again the upstream side about the scanning position X of the feed path 102 through the return path 105. Then, when the document P is fed by the feed rollers 103 and passes through the scanning position X, a second side of the document P is scanned by the image scanner. When the sensor detects the trailing end of the document P of which the second side has been scanned, the discharge rollers 104 are stopped again in a state where they nip the trailing end of the document and then the document P is fed back through the return path 105. The document P entering again the feed path 102 through the return path 105 is in a state where the leading end and the trailing end thereof are reversed again, that is, a state where the first side is opposed to the scanning position X. The document P is fed along the feed path 102 and is discharged to the document discharge tray 106 with the first side facing downward. Accordingly, both surfaces of the first side and the second side of the document P are scanned and the document P is discharged to the document discharge tray 106 in the order in which documents are piled on the document input tray 100.

The pickup roller 101, the feed roller 103, and the discharge roller 104 rotate in a predetermined direction with rotary power from a motor. The pickup roller 101 and the feed roller 103 always rotate in one direction, that is, in a direction in which the document P is fed from the upstream side to the downstream side. On the other hand, the discharge roller 106 rotates in two directions so as to perform a switch-back feeding operation. For example, as shown in FIG. 50, when the document P is nipped by the feed roller 103 and the discharge roller 104, the document feeding direction of the feed roller 103 and the document feeding direction of the discharge roller 104 are necessarily equal to each other. When the document is nipped by the feed roller 103 on the upstream side of the scanning position X and the discharge roller 104, the document feeding direction of the feed roller 103 and the document feeding direction of the discharge roller 104 are necessarily equal to each other. Accordingly, for example, a motor for driving the feed roller 103 and a motor for driving the discharge roller 104 are provided separately, the feed roller 103 always rotates in one direction, and the discharge roller 104 changes its rotation direction at a predetermined time. Alternatively, an electronic clutch is provided to transmit driving power to the pickup roller 101, the feed roller 103, and the discharge roller 104 from a single motor and to cut off the driving power to rollers not involved in feeding the document P at a predetermined time.

SUMMARY

The document feeder may stop its operation during feeding the document P due to paper jam, input of feed stop, turn-off, and so on. In this case, the document P in feed remains in the feed path 102 or the bidirectional path 105. The document P remaining in the feed path 102 or the bidirectional path 105 has to be discharged from the feed path 102 or the bidirectional feed path 105 when the operation is resumed due to release of the paper jam or the turn-on.

In order to discharge the remaining document P at the time of stop, it is necessary to check the position of the document P and the feeding direction. For example, as shown in FIG. 50, when the document P remains at a connection position between the feed path 102 to the bidirectional feed path 105 in the course of feeding the document in a switch-back manner, a guide flap may abut the document P to damage the document P by driving the guide flap disposed at the connection position to deactivate the feed path bidirectional feed path 105. Since the rotation direction of the discharge roller 104 varies before and after the switch-back feeding operation, the remaining document P may cause the paper jam by allowing the discharge roller 104 to rotate in a direction opposite to the switch-back feeding direction at the time of stop.

In the feeding for double-sided scanning, when the remaining document P is discharged to the document discharge tray 106, the document P is discharged with the document faced up or faced down depending on the scanning status. Accordingly, an operation of checking and arranging the page direction of the document P is necessary.

Aspects of the invention provide a document feeder capable of discharging a document remaining in a document feed path or a feed path bidirectional feed path without damaging the document or without causing a paper jam after the feeding of the document is stopped and capable of feeding a document for double-sided scanning.

Further provided is a document feeder capable of discharging a document, which remains in the document feed path or the feed path bidirectional feed path, to a document discharging section with the page direction of the document arranged after the feeding of the document is stopped and capable of feeding the document for double-sided scanning.

DETAILED DESCRIPTION

Hereinafter, an aspect of the present invention will be described with reference to the attached drawings. The aspect is only an example of the invention and the aspect can be properly modified without departing from the scope of the invention.

Figure 1:
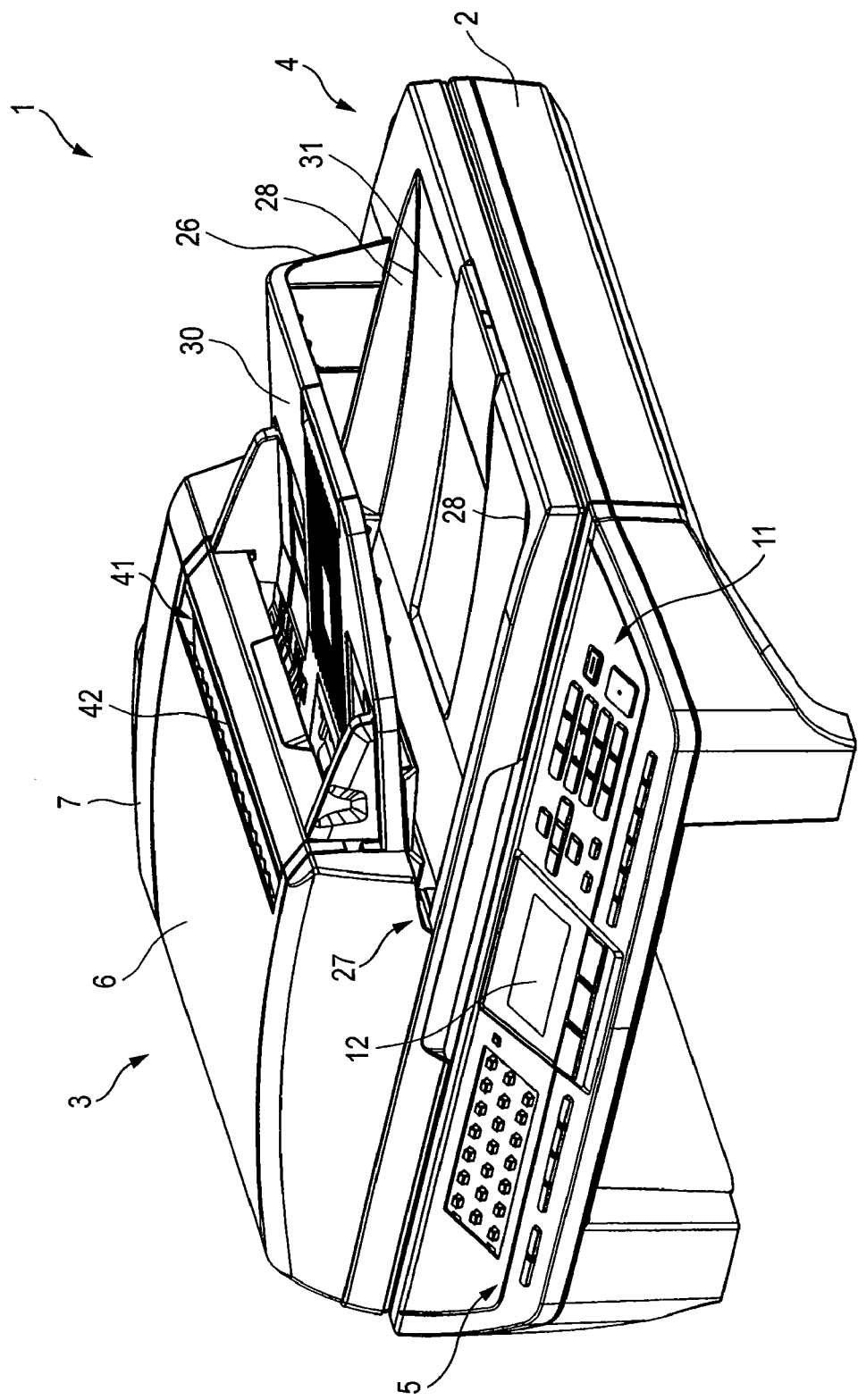
FIG. 1 is a perspective view illustrating an outer configuration of an image scanner according to an aspect of the present invention.
Figure 2:
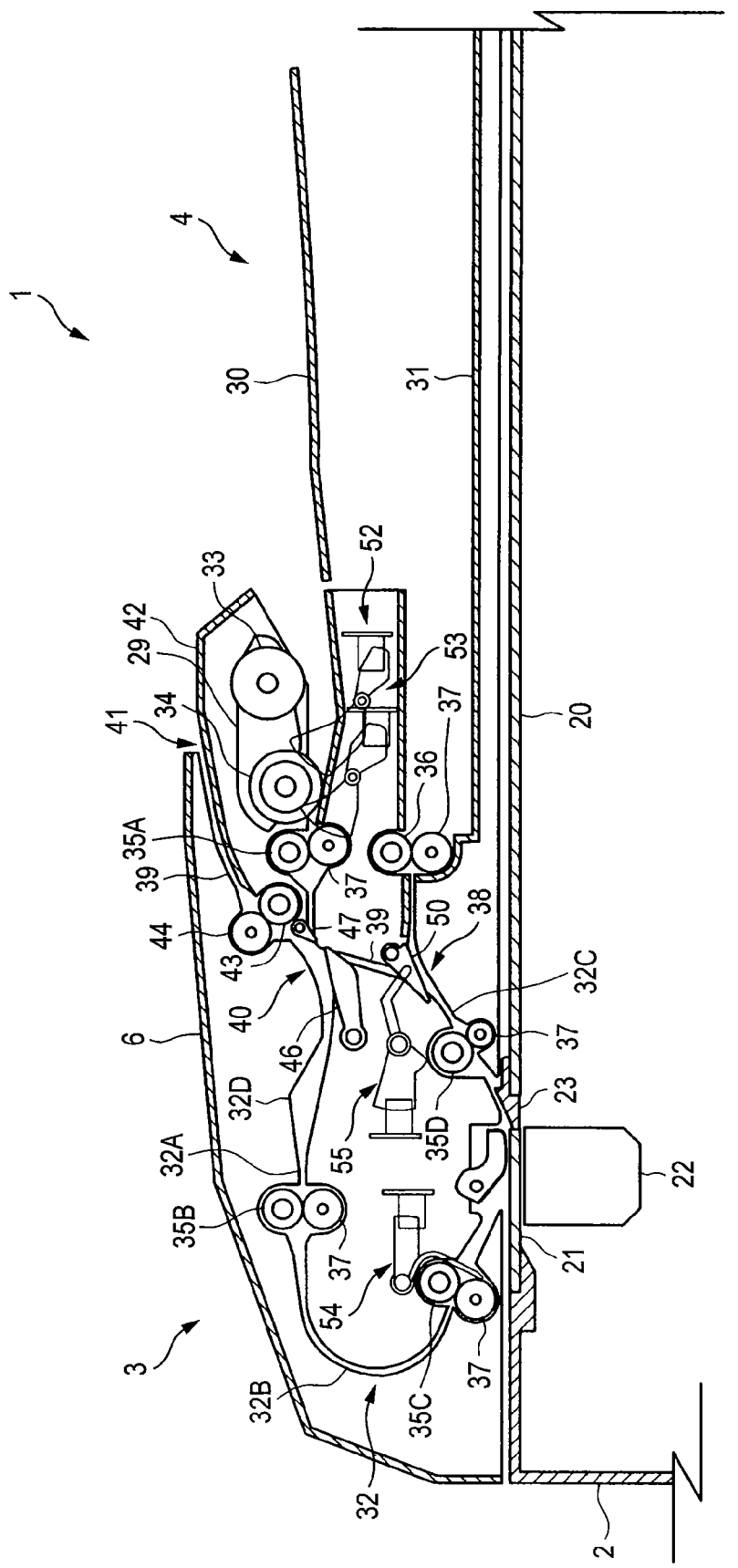
FIG. 2 is a cross-sectional view illustrating an inner configuration of the image scanner.

FIG. 1 shows an outer appearance and FIG. 2 show an inner configuration of the image scanner 1 according to an aspect of the invention. The image scanner 1 is embodied as an image scanning unit for scanning an image of a document, for example, in a copying device, a facsimile device, a scanner device, and a multifunction device (MFD) integrally having a copying function, a facsimile function, and a scanning function.

As shown in FIGS. 1 and 2, in the image scanner 1, a document cover 4 including an ADF is mounted to a document placing table 2 serving as a flatbed scanner (FBS) so as to be opened and closed via a hinge (not shown) on the rear side of the image scanner as shown in FIG. 1. The ADF 3 corresponds to a document feeder.

An operation panel 5 is provided on the front side of the document placing table 2. The operation panel 5 includes a variety of operation keys 11 and a liquid crystal display unit 12. A user inputs a desired instruction through the operation panel 5. For example, instructions including "start" that indicates start or restart of scanning document and "stop" that indicates halt or interruption of scanning are input through the use of the operation keys 11. The image scanner 1 may operate in response to instructions transmitted through a printer driver or a scanner driver of a computer connected thereto, as well as to instructions input through the operation panel 5.

As shown in FIG. 2, in the document placing table 2, platen glass 20 and 21 are disposed on the top surface opposed to the document cover 4. When the document cover 4 is opened, the platen glass 20 and 21 are exposed as a top surface of the document placing table 2. When the document cover 4 is closed, the entire top surface of the document placing table 2 including the platen glass 20 and 21 is covered. An image scanning unit 22 is built into the document placing table 2 so as to be opposed to the platen glass 20 and 21.

When the image scanner 1 is used as an FBS, a document is placed on the platen glass 20 which is formed of, for example, a transparent glass plate. An opening for exposing the platen glass 20 is formed at the center of the top surface of the document placing table 2 and an area of the platen glass 20 exposed through the opening serves as a document scanning area of the FBS.

The platen glass 21 serves as a scanning position when the image scanner 1 employs an ADF 3 and the platen glass 21 is formed of, for example, a transparent glass plate. An opening for exposing the platen glass 21 is formed at the scanning position of the document placing table 2. The platen glass 21 exposed through the opening extends in the rear direction of the image scanner 1 to correspond to the length in the main scanning direction of the image scanning unit 22.

A positioning member 23 is disposed between the platen glass 20 and the platen glass 21. The positioning member 23 is a longitudinal plate member extending in the rear direction of the image scanner 1, similar to the platen glass 21. The positioning member 23 is used as a reference for positioning a document when the document is placed onto the platen glass 20 which is a document placing plane in the FBS. Accordingly, marks indicating the center position and both end positions of various documents such as A4 size and B5 size are recorded on the top surface of the positioning member 23. A guide surface returning a document passing by the platen glass 21 fed by the ADF 3 to the ADF 3 so as to incline and draw up the document is formed on the top surface of the positioning member 23.

The image scanning unit 22 is a line image sensor irradiating light to a document through the platen glass 20 and 21 from a light source, collecting the light, which is reflected from the documents on a light receiving element with a lens, and then converting the received light into an electrical signal. For example, a close CIS image sensor or a CCD image sensor of a reduced optical system can be used as the image scanning unit 22. The image scanning unit 22 is disposed so as to reciprocate below the platen glass 20 and 21 by means of a belt driving mechanism as a scanning mechanism and reciprocates parallel to the platen glass 20 and 21 with the driving power of a carriage motor.

The document cover 4 is provided with the ADF 3 subsequently feeding documents to the discharge tray 31 (discharge section) through the document feed path 32 from the input tray 30 (input section). In the course of the feeding operation of the ADF 3, the document passes through the scanning position on the platen glass 21 and the image scanning unit 22 disposed below the platen glass 21 scans the images of the document.

As shown in FIGS. 1 and 2, the input tray 30 and the discharge tray 31 are disposed in the document cover 4 in two layers using the input tray 30 as the upper layer. A document of which images should be scanned by the ADF 3 is placed on the input tray 30. A plurality of documents are placed on the input tray so that the leading ends in the feeding direction can be inserted into the document feed path 32 in a state where the first sides are arranged upward. A barrier wall 26 is formed by bending the rear side of the input tray 30 downwardly. The lower end of the barrier wall 26 is connected to the top surface of the document cover 4. When the document cover 4 is opened from the document placing table 2, the barrier wall 26 prevents the documents on the discharging tray 31 from dropping. On the front lower side of the input tray 30, a notch 27 is formed in a part of a case body of the ADF 3. The visibility of the document unloaded onto the discharging tray 31 as viewed from the front side is enhanced. Specifically, since a small-sized document is not visible due to obstruction by the input tray 30 but the space between the input tray 30 and the discharging tray 31 is widened by the notch 27, the visibility of the small-sized document is particularly increased.

The discharging tray 31 is spaced vertically apart from below the input tray 30 and is formed integrally with the top surface of the document cover 4. The document scanned and unloaded from the ADF 3 is piled on the discharging tray 31 with the first side facing downward in a state where the document is isolated from the documents on the input tray 30. Both side portions 28 of the discharging tray 31 which are the front and rear sides of the device have surfaces inclined upward. When the document unloaded onto the discharging tray 31 is taken out, the document can be taken out by pressing the document from the upside by the both side portions 28 and allowing the document to slide along the inclined surfaces of both side portions 28. Accordingly, it is easy to take out the document from the discharging tray 31.

As shown in FIG. 2, the document feed path 32 has a substantial U shape in the lateral direction as viewed in the longitudinal section. The document feed path 32 is formed inside the ADF 3 so that the input tray 30 and the discharging tray 31 are connected to each other through the scanning position on the platen glass 21. The document feed path 32 is continuously formed as a passage having a predetermined width, through which the document can pass, by elements constituting the ADF, guide plates, and guide ribs. In this way, by disposing the input tray 30 and the discharging tray 31 in a vertically two-stepped structure and forming the document feed path 32 having a substantially lateral U shape as viewed in the longitudinal section so as to connect the trays to each other, it is possible to narrow the ADF 3 and to decrease the size thereof.

The document feed path 32 has a substantially lateral U shape extending toward one end (the left side in FIG. 2) of the document cover 4 from the input tray 30, being curved downwardly, and reaching the scanning position on the platen glass 21, as viewed in a longitudinal section extending from the scanning position toward the discharging tray 31. The document feed path 32 roughly includes an upper portion 32A and a lower portion 32C forming two straight-line portions of the U shape, and a curved portion 32B curved to connect the upper portion 32A and the lower portion 32C. The document feed path 32 is used as a document feed path common to single-sided scanning and double-sided scanning as performed by the image scanner 1 with ADF 3.

A document feeding unit for feeding a document from the input tray 30 to the discharging tray 31 is disposed in the document feed path 32. Specifically, as shown in FIG. 2, the document feeding unit includes a pickup roller 33, a separation roller 34, feed rollers 35A, 35B, 35C, and 35D, a document discharge roller 36, and pinch rollers 37 formed in the document feed path 32. The driving power is delivered to the rollers constituting the document feeding unit from a single motor 67 (see FIG. 6) as a driving source. The driving power transmission mechanism will be described later.

As shown in FIG. 2, the pickup roller 33 and the separation roller 34 are formed on the most upstream side of the document feed path 32. The pickup roller 33 is rotatably disposed in an end portion of an arm 29 of which the base end is supported by a shaft 111 (see FIG. 12) axially supporting the separation roller 34. The separation roller 34 is spaced apart from the pickup roller 33 in the document feeding direction and is disposed to rotatably abut on the opposed side of the document feed path 32. The pickup roller 33 and the separation roller 34 rotate with the driving power from the motor 67 and the arm 29 also moves upwardly and downwardly with the driving power from the motor 67. The pickup roller 33 and the separation roller 34 have the same diameter and rotate at the same circumferential speed. A separation pad for separating the documents with a friction resulting from the abutment on the roller surface of the separation roller 34 is disposed at the opposed position of the separation roller 34.

The feed rollers 35A, 35B, 35C, and 35D are disposed at different positions in the document feed path 32. In this aspect, the feed roller 35A is disposed on the downstream side in the feeding direction adjacent to the separation roller 34. The feed roller 35B is disposed in the upper portion 32A of the document feed path 32. The feed roller 35C is disposed in the lower portion 32C of the document feed path 32 and on the upstream side in the feeding direction adjacent to the scanning position. The feed roller 35D is disposed in the lower portion 32C of the document feed path 32 and on the downstream side in the feeding direction adjacent to the scanning position. The above-mentioned arrangement of feed rollers 35A, 35B, 35C, and 35D is only an example and can be adequately changed.

The pinch rollers 37 are disposed at the opposed positions of the feed rollers 35A, 35B, 35C, and 35D, respectively. The pinch rollers 37 abut the roller surfaces of the feed rollers 35A, 35B, 35C, and 35D, respectively, by resiliently urging together the shafts of each roller pair with springs. When the feed rollers 35A, 35B, 35C, and 35D rotate, the pinch rollers 37 also accordingly rotate in response. The document is nipped to be pressed on the feed rollers by the pinch rollers 37, with rotary power of the feed rollers 35A, 35B, 35C, and 35D being delivered to the document.

The document discharge roller 36 is disposed at a location farthest downstream in the document feed path 32 and rotates with the driving power delivered from the motor 67, similar to the feed rollers 35A, 35B, 35C, and 35D. A pinch roller 37 is disposed at the opposed position of the document discharge roller 36 and the pinch roller 37 is resiliently urged with a spring so as to be contacted with the document discharge roller 36.

A bidirectional feed path 39 feed path is connected to a connection position 38 of the lower portion 32C of the document feed path 32. When the double-sided scanning is performed, the bidirectional feed path 39 serves to reverse the leading end and the trailing end of a document of which the first side is scanned at the scanning position and return the document to the upstream side adjacent to the scanning position from the downstream side in the document feed path 32. The bidirectional feed path 39 extends upwardly from the connection position 38 to the upper side of the input tray 30 and intersects the upper portion 32A of the document feed path 32. The document fed in a switch-back manner from the intersection position 40 between the upper portion 32A and the bidirectional feed path 39 is returned to the document feed path 32.

An end 41 of the bidirectional feed path 39 is opened in the outer surface of the ADF 3. A document supporting portion 42 is formed from the end 41 of the bidirectional feed path 39 to the input tray 30 to extend continuously from the end. The document supporting portion 42 serves to support a document protruding from the end 41 of the bidirectional feed path 39 and forms an upper cover 6 (see FIG. 1) of the ADF 3 above the pickup roller 33 and the separation roller 34. The upper cover 6 covers the entire ADF 3 including the pickup roller 33 and the separation roller 34 and can be opened and closed. The document supporting portion 42 constructed as the upper cover 6 extends from the end 41 toward the input tray 30 until it reaches the upstream side adjacent to a loading position defined by the pickup roller 33 and the separation roller 34. Accordingly, since a part of the document entering the bidirectional feed path 39 and protruding from the end 41 to the outside of the ADF 3 is supported by the document supporting portion 42 at the time of double-sided scanning, the document is not located downstream (the right side in FIG. 2) from the loading position of the document piled on the input tray 30. Also, by opening the upper cover 6, the document feed path 32 and a part of the bidirectional feed path 39 are exposed.

A reversible roller 43 is disposed closer to the end 41 than the intersection position 40 in the bidirectional feed path 39. The reversible roller 43 rotates in two directions of a forward direction and a backward direction with the driving power delivered from the rotor 67. A pinch roller 44 is disposed at a position to the reversible roller 43. The pinch roller 44 is pressed on the roller surface of the reversible roller 43 by resiliently urging the shaft with a spring and rotates with the rotation of the reversible roller 43. The document is pressed to the reversible roller 37 and nipped by the pinch roller 44, the rotary power of the reversible roller 43 is transferred to the document, and the document is fed in the rotation direction of the reversible roller 43. The reversible roller 43 and the pinch roller 44 correspond to a switch-back feeding unit.

In this aspect, the bidirectional feed path 39 connected to the connection position 38 downstream from the scanning position in the document feed path 32 is allowed to intersect the upper portion 32A of the document feed path 32 and the reversible roller 43 is disposed closer to the end 41 than the intersection position 40. However, the feed path of the bidirectional feed path 39 is arbitrary and the feed path of the bidirectional feed path may be properly modified if only it can reverse the leading end and the trailing end of the document and return the document to the side upstream of the scanning position from the side downstream of the scanning position.

Figure 3:
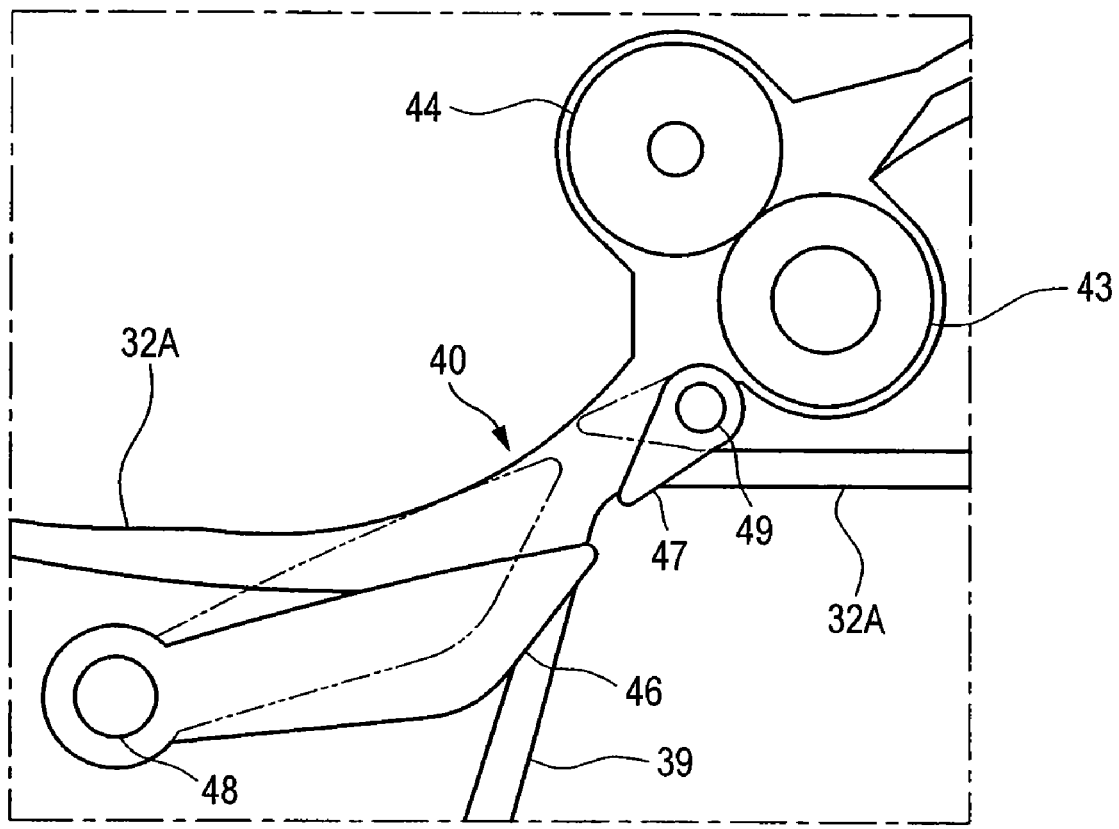
FIG. 3 is an enlarged view illustrating a configuration of an intersection position.

FIG. 3 is an enlarged view showing a configuration of an intersection position. As shown in FIGS. 2 and 3, a guide flap 46 and a guide flap 47 for guiding the document to a desired feed path are disposed at the intersection position 40. The guide flap 46 is disposed to be rotatable about the shaft 48 disposed at the corner (left-lower side in FIG. 3) on the scanning position side in the document feed path 32 about the intersection position 40 and the connection position 38 side of the bidirectional feed path 39 within a predetermined range. The guide flap 46 is formed of a wing-shaped plate and the end protrudes from the intersection position 40. Only one guide flap 46 is shown in FIG. 3, but a plurality of guide flaps 46 having the same shape are disposed in the width direction (a direction perpendicular to the paper plane of FIG. 3, the rear direction of the device) of the document feed path 32 at a predetermined interval and the plurality of guide flaps 46 rotate integrally.

The guide flaps 46 are switched between a third guiding posture indicated by a solid line in FIG. 3 and a fourth guiding posture indicated by a two-dot chained line by rotating about the shaft 48. By abutting on, for example, a guide member of the document feed path 32 or the bidirectional feed path 39, the guide flaps 46 are suppressed from rotation from the third guiding posture downwardly in the figure and rotation from the fourth guiding posture upwardly in the figure. By setting the guide flaps 46 to the third guiding posture, the feed path from the input tray 30 side (the right side in FIG. 3) in the document feed path 32 to the scanning position (the left side in FIG. 3) is continuously activated and the feed path from the document feed path 32 to the connection position 38 side (the lower side in FIG. 3) of the bidirectional feed path 39 is deactivated. Accordingly, the document reaching the intersection position 40 from the input tray 30 side of the document feed path 32 is allowed to enter the scanning position of the document feed path 32 and is suppressed from entering the connection position 38 of the bidirectional feed path 39. The document reaching the intersection position 40 from the end 41 side (the upper side in FIG. 3) of the bidirectional feed path 39 is allowed to enter the scanning position of the document feed path 32 and is suppressed from entering the connection position 38 of the bidirectional feed path 39.

By setting the guide flaps 46 to the fourth guiding posture, the feed path from the connection position 38 side of the bidirectional feed path 39 to the end 41 side is continuously activated and the feed path from the connection position 38 side of the bidirectional feed path 39 to the scanning position side of the document feed path 32 is deactivated. Accordingly, the document reaching the intersection position 40 from the connection position 38 side of the bidirectional feed path 39 is allowed to enter the end 41 side of the bidirectional feed path 39 and is suppressed from entering the scanning position of the document feed path 32.

The switching of the feed path by the guide flaps 46 is performed by means of the abutment on the document. The guide flap 46 is typically positioned in the third guiding posture indicated by the solid line in FIG. 3 by its own weight or by the urging force of a resilient member such as a spring. By allowing the document fed from the connection position 38 of the bidirectional feed path 39 to the intersection position 40 to abut on the guide flaps 46, the guide flaps 46 are pushed to rotate upwardly in the figure and to the fourth posture indicated by the two-dot chained line in FIG. 3. On the other hand, since the document fed from the end 41 of the bidirectional feed path 39 to the intersection position 40 abuts on the guide flaps 46 but is regulated from rotating downwardly in the figure from the third guiding posture, the document is guided by the guide flaps 46 to enter the scanning position through the upper portion 32A of the document feed path 32. The wing shape of the guide flaps 46 employs a shape which can be easily varied in posture by the abutment on the document fed from the connection position 38 side of the bidirectional feed path 39 to the intersection position 40 and which allow the document fed from the end 41 of the bidirectional feed path 39 to the intersection position 40 to be easily guided to the scanning position of the document feed path 32. In this way, when the posture of the guide flaps 46 is allowed to vary by the abutment on the document, it is not necessary to actively vary the posture of the guide flaps 46 with the driving power delivered from the motor 67. Accordingly, it is possible to implement the guide flaps 46 with a simple configuration.

A guide flap 47 is disposed to be rotatable about a shaft 49 disposed at the corner (right-upper side in FIG. 3) on the input tray 30 side of the document feed path 32 adjacent to the intersection position 40 and near the end 41 side of the bidirectional feed path 39 within a predetermined range. The guide flap 47 is formed of a wing-shaped plate with an end protruding from the intersection position 40. Only one guide flap 47 is shown in the figure, but a plurality of guide flaps 47 having the same shape are disposed in the width direction of the document feed path 32 at a predetermined interval and the plurality of guide flaps 47 rotate integrally.

The guide flaps 47 are switched between a fifth guiding posture indicated by a solid line in FIG. 3 and a sixth guiding posture indicated by a two-dot chained line by rotating about the shaft 49. By abutting on, for example, a guide member of the document feed path 32 or the bidirectional feed path 39, the guide flaps 47 are suppressed from rotation from the fifth guiding posture downwardly in the figure and rotation from the sixth guiding posture upwardly in the figure. By setting the guide flaps 47 to the fifth guiding posture, the feed path from the end 41 side of the bidirectional feed path 39 to the scanning position of the document feed path 32 is continuously activated and the feed path from the connection position 38 side of the bidirectional feed path 39 to the input tray 30 side of the document feed path 32 is deactivated. Accordingly, the document reaching the intersection position 40 from the end 41 side of the bidirectional feed path 39 is allowed to enter the scanning position of the document feed path 32 and is suppressed from entering the input tray 30 side. The document reaching the intersection position 40 from the connection position 38 of the bidirectional feed path 39 is allowed to enter the end 41 side of the bidirectional feed path 39 and is suppressed from entering the input tray 30 side of the document feed path 32.

By setting the guide flaps 46 to the sixth guiding posture, the feed path from the input tray 30 side of the document feed path 32 to the scanning position side is continuously activated and the feed path from the input tray 30 side of the document feed path 32 to the end 41 side of the bidirectional feed path 39 is deactivated. Accordingly, the document reaching the intersection position 40 from the input tray 30 side of the document feed path 32 is allowed to enter the scanning position of the document feed path 32 and is suppressed from entering the end 41 side of the bidirectional feed path 39.

The switching of the feed path by the guide flaps 47 is performed by means of the abutment on the document. The guide flap 47 is typically positioned in the fifth guiding posture indicated by the solid line in FIG. 3 by its own weight or by the urging force of a resilient member such as a spring. By allowing the document fed from the input tray 30 side of the document feed path 32 to abut on the guide flaps 47, the guide flaps 47 are pushed to rotate to the left side in the figure and to the sixth posture indicated by the two-dot chained line in FIG. 3. On the other hand, when the document fed from the connection position 38 side of the bidirectional feed path 39 to the intersection position 40 abuts on the guide flaps 47, the guide flaps 47 are suppressed from rotating to the right side in the figure from the fifth guiding posture. Accordingly, the document is guided by the guide flaps 47 to enter the end 41 side of the bidirectional feed path 39. The wing shape of the guide flaps 47 employs a shape which can be easily varied in posture by the abutment on the document fed from the input tray 30 side of the document feed path 32 to the intersection position 40 and which allow the document fed from the connection position 38 side of the bidirectional feed path 39 to the intersection position 40 to be easily guided to the end 41 side of the bidirectional feed path 39. In this way, when the posture of the guide flaps 47 is allowed to vary by the abutment on the document, it is not necessary to actively vary the posture of the guide flaps 47 with the driving power delivered from the motor 67. Accordingly, it is possible to implement the guide flaps 47 with a simple configuration.

Figure 4:
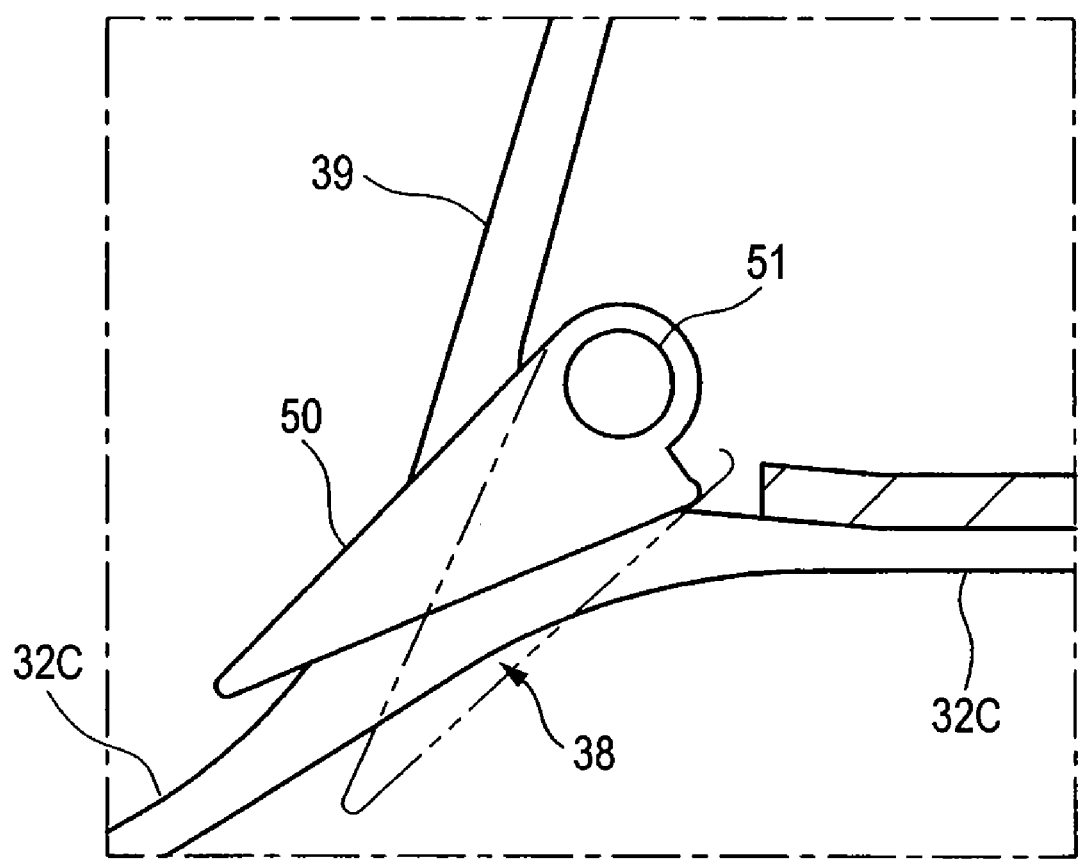
FIG. 4 is an enlarged view illustrating a configuration of a connection position.

FIG. 4 is an enlarged view showing a configuration of a connection portion. As shown in FIGS. 2 and 4, a guide flap 50 is disposed at the connection position 38. The guide flap 50 is disposed to be rotatable about a shaft 51 and rotates between a first guiding posture indicated by a solid line in FIG. 4 and a second guiding posture indicated by a two-dot chained line with the driving power delivered from the motor 67. By abutting on, for example, a guide member of the document feed path 32 or the bidirectional feed path 39, the guide flap 50 is suppressed from rotation from the first guiding posture upwardly in the figure and rotation from the second guiding posture downwardly in the figure. When the guide flap 50 is in the first guiding posture, the feed path from the scanning position side (the left side in FIG. 4) of the document feed path 32 to the discharging tray 31 side (the right side in FIG. 4) is continuously activated. Accordingly, the document passing through the scanning position is guided to the lower portion 32C of the document feed path 32 at the connection position 38 toward the discharging tray 31. When the guide flap 50 is in the second guiding posture, the feed path from the downstream side of the lower portion 32C of the document feed path 32 about the scanning position to the bidirectional feed path 39 is continuously activated. Accordingly, the document passing through the scanning position is guided at the connection position 38 to enter the bidirectional feed path 39. In this way, the guide flap 50 is disposed to guide the document at the connection position 38 to any one of the document feed path 32 and the bidirectional feed path 39. In FIG. 4, only one guide flap 50 is shown, but a plurality of guide flaps 50 having the same shape are formed in the width direction of the document feed path 32 with a predetermined interval and the plurality of guide flaps 50 integrally rotate. The guide flap 50 corresponds to a guiding unit.

As shown in FIG. 2, a plurality of sensors for sensing the feeding of the document is disposed in the document feed path 32 and the bidirectional feed path 39. Specifically, a front sensor 52 and a second front sensor 53 (third document detecting sensor) are disposed on the upstream side and the downstream side respectively of the separation roller 34 in the document feed path 32 and a rear sensor 54 (first document detecting sensor, third document detecting sensor) is disposed on the side upstream from the scanning position. A switch-back sensor 55 (second document detecting sensor, third document detecting sensor) is disposed between the connection position 38 of the bidirectional feed path 39 and the intersection position 40. Since the sensors may be optical sensors and have the same configuration except that the shapes of detectors are different from each other depending on difference in detection positions, the configuration is described using the front sensor 52 as an example.

Figure 5:
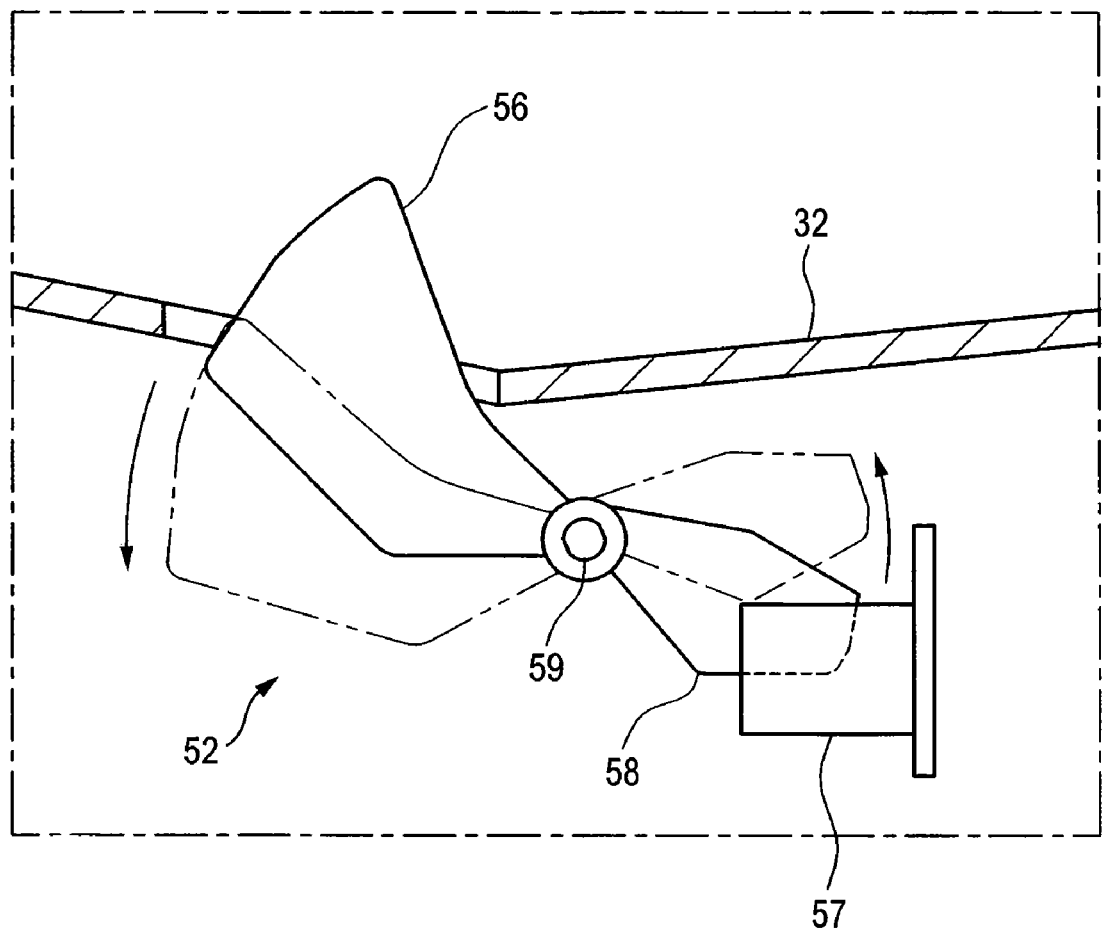
FIG. 5 is an enlarged view illustrating a configuration of a first front sensor.

As shown in FIG. 5, the front sensor 52 includes a detector 56, which protrudes from the bottom surface of the document feed path 32 and rotates to retreat from the document feed path 32 when contacting the document, and a photo interrupter 57 detecting the rotation of the detector 56, as shown in FIG. 5. A shield portion 58 sensed by the photo interrupter 57 is formed integrally with the detector 56 and is rotatable about a shaft 59. The detector 56 is resiliently urged by an urging member such as a spring (not shown) to a position where the detector 56 protrudes into the document feed path 32, that is, in the clockwise direction in the example shown in FIG. 5. In a state where no external force act on the detector 56, the detector 56 protrudes into the document feed path 32 as indicated by a solid line in FIG. 5 and the shield portion 58 is interposed between a light-emitting portion and a light-receiving portion of the photo interrupter 57. Accordingly, the light delivery of the photo interrupter 57 is hindered, thereby turning off the first front sensor 62.

When a document is placed on the input tray 30, the document abuts the detector 56 and compels the detector 56 to rotate so as to retreat from the document feed path 32. The shield portion 58 is also allowed to rotate along with the detector 56 and the shield portion 58 is moved from being between the light-emitting portion and the light-receiving portion of the photo interrupter 57 as indicated by a two-dot chained line in FIG. 5. Accordingly, the light delivery of the photo interrupter 57 is not hindered, thereby turning on the first front sensor 52. It is detected on the basis of the On/Off state of the first front sensor 52 whether a document is placed on the input tray 30.

The second front sensor 53 disposed on the immediate downstream side of the separation roller 34 serves to sense the leading end or the trailing end of the document fed to the document feed path 32 on the basis of the On/Off state thereof. For example, by monitoring the number of rotations of the feed rollers 35A, 35B, 35C, and 35D by the use of an encoder or the number of steps of the motor 67 after the second front sensor 53 senses the trailing end of the document, a position of the leading end or the trailing end of the document in the document feed path 32 is determined.

The rear sensor 54 disposed upstream from the scanning position serves to sense the leading end and the trailing end of the document fed in the document feed path 32 on the basis of the On/Off state thereof. By monitoring the number of rotations of the feed rollers 35A, 35B, 35C, and 35D by the use of an encoder or the number of steps of the motor 67 after the rear sensor 54 senses the leading end or the trailing end of the document, it is determined whether the leading end or the trailing end of the document reaches the scanning position. The image scanning of the image scanning unit 22 is controlled on the basis of the signal from the rear sensor 54. When the leading end of the document reaches the scanning position, the image scanning is started and when the trailing end of the document reaches the scanning position, the image scanning is ended.

The switch-back sensor 55 disposed between the connection position 38 of the bidirectional feed path 39 and the intersection position 40 serves to sense the leading end or the trailing end of the document fed in the bidirectional feed path 39 on the basis of the On/Off state thereof. For example, by monitoring the number of rotations of the feed rollers 35A, 35B, 35C, and 35D and the reversible roller 43 by the use of an encoder or the number of steps of the motor 67 after the switch-back sensor 55 senses the trailing end of the document, it is determined whether the trailing end of the document passes through the intersection position 40.

Figure 6:
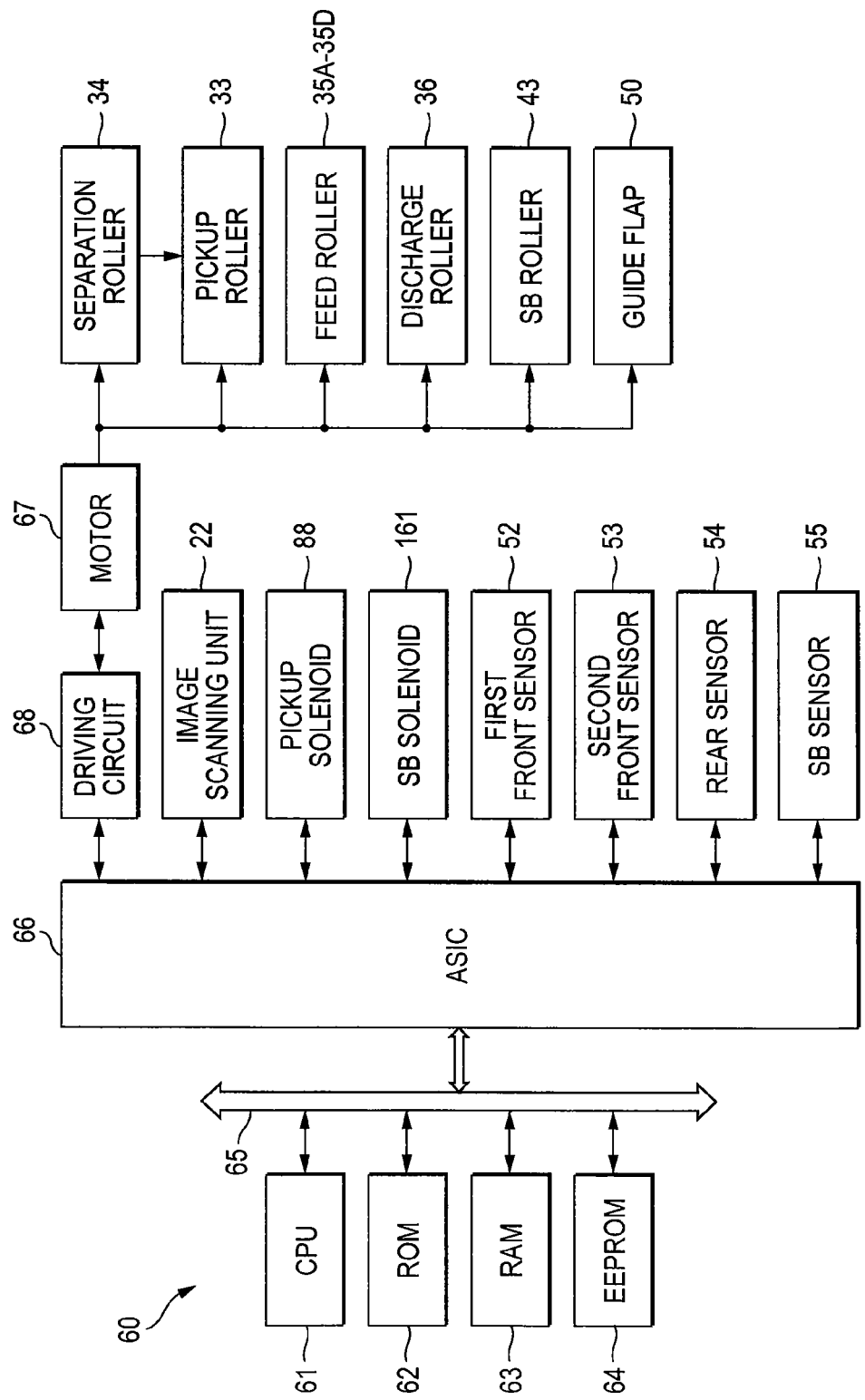
FIG. 6 is a block diagram illustrating a configuration of a control unit.

FIG. 6 illustrates a configuration of a control unit 60 of the image scanner 1. The control unit 60 controls not only the ADF 3 but also the entire operations of the image scanner 1. As shown in FIG. 6, the control unit 60 is composed of a micro computer mainly including a CPU 61, a ROM 62, a RAM 63, and an EEPROM (Electrically Erasable and Programmable ROM) 64 and is connected to an ASIC (Application Specific Integrated Circuit) 66 through a bus 65.

Programs or the like for controlling a variety of operations of the image scanner 1 and the ADF 3 are stored in the ROM 62. The RAM 63 is used as a memory area or a work area for temporarily storing a variety of data used for the CPU 61 to execute the programs. The EEPROM 64 is a memory area for storing a variety of settings or flags which should be stored even after the power source is turned off. The control unit 60 constituted by these elements is supplied with electric power from a backup power source and thus even when the power source is turned off, the information stored in the RAM 63 is retained. The CPU 61, ROM 62, RAM 63 and EEPROM 64 correspond to a driving control unit. Further, the CPU 61 and RAM 63 correspond to a feeding mode storage unit, a scanning status storage unit and a rotation direction storage unit.

The ASIC 66 controls the rotation of the motor 67 by generating a phase excitation signal or the like for turning on the motor 67 in accordance with an instruction from the CPU 61, sending the signal to the driving circuit 68 of the motor 67, and turning on the motor 67 through the driving circuit 68. The motor 67 delivers the driving power to the pickup roller 33, the separation roller 34, the feed rollers 35A, 35S, 35C, and 35D, the discharge roller 36, the reversible roller (SB roller) 43, and the guide flap 50 by means of forward and backward rotations thereof and serves as a single driving source in the ADF 3. The history of instructions to the motor including stop instructions, forward rotation (clockwise rotation) instructions and backward rotation (counterclockwise rotation) instructions are stored in the RAM 63. This history is used as a rotation direction information.

The driving circuit 68 drives the motor 67 and generates an electrical signal for operating the motor 67 from the output signal of the ASIC 66. In response to the electrical signal, the motor 67 rotates in a predetermined rotation direction and the rotary power of the motor 67 is delivered to the pickup roller 33, the separation roller 34, the feed rollers 35A, 35B, 35C, and 35D, the discharge roller 36, the reversible roller 43, and the guide flap 50 through each driving power delivery mechanism 70, 110, 120, 151, 170.

An image scanning unit 22 scanning an image of a document fed to the scanning position by the ADF 3 is connected to the ASIC 66. The image scanning unit 22 scans the image of the document on the basis of a control program stored in the ROM 62. Although not shown in FIG. 6, a driving mechanism allowing the image scanning unit 22 to reciprocate is activated in response to the output signal of the ASIC 66.

The first front sensor 52, the second front sensor 53, the rear sensor 54, and the switch-back sensor 55 are connected to the ASIC 66. The CPU 61 receives the on/off signals of the sensors and outputs a predetermined output signal to the ASIC 66 on the basis of the control program stored in the ROM 62 so as to activate the motor 67 or the image scanning unit 22. The history of turning on/off of the rear sensor 54 and the switch-back sensor 55 is used as the scanning status information.

A pickup solenoid 88 and a switch-back solenoid (SB solenoid) 161 are connected to the ASIC 60. The CPU 61 controls the ASIC 66 to output signals at predetermined times based on the control program stored in the RAM 62 to operate the pickup solenoid 88 and the switch-back solenoid 161.

Hereinafter, a driving power transmission mechanism transmitting driving power from a motor 67 to a pickup roller 33, a separation roller 34, feed rollers 35A, 35B, 35C, and 35D, a discharge roller 36, a reversible roller 43, and a guide flap 50 will be described. The axes of the separation roller 34, the feed rollers 35A, 35B, 35C, and 35D, the discharge roller 36, the reversible roller 43, and the guide flap 50 extend in the width direction of a document feed path 32. The separation roller 34, the feed rollers 35A, 35B, 35C, and 35D, the discharge roller 36, the reversible roller 43, and the guide flap 50 are disposed at predetermined positions of the axes along the width of the document feed path 32, respectively. Of course, the rollers may be disposed over almost all range of the axes in the width direction or a plurality of rollers may be disposed coaxially at a predetermined interval in the width direction of the document feed path 32.

As show in FIG. 1, in the ADF 3 disposed on the top surface of the document cover 4, the document feed path 32 or the rollers are received in the case. The motor 67 and the driving power transmission mechanisms applying the driving power to the rollers are received in the case of the ADF 3. The motor 67 and the driving power transmission mechanisms are disposed at one end in the width direction of the document feed path 32 of the ADF 3. Driven gears are disposed at the ends of the axes of the separation roller 34, the feed rollers 35A, 35B, 35C, and 35D, the discharge roller 36, the reversible roller 43, and the guide flap 50. The rollers are driven by transmitting the driving power to the driven gears through the driving power transmission mechanisms from the motor 67. In this aspect, the driven gears disposed at the ends of the axes of the motor, 67, the driving power transmission mechanisms, the separation roller 34, the feed rollers 35A, 35B, 35C, and 35D, the discharge roller 36, the reversible roller 43, and the guide flap 50 are received in a space 7 inside the case of the ADF 3. In addition, the gears described below are spur gears having teeth formed parallel to the center lines on the outer peripheries, so long as it is particularly limited.

FIGS. 7 to 10 illustrate the driving power transmission mechanism 70 transmitting the driving power from the motor 67 to the separation roller 34. The driving power transmission mechanism 70 transmits the driving power of the feeding direction to the separation roller 34 by allowing the motor 67 to rotate in the clockwise (CW) direction and cuts off the transmission of the driving power to the separation roller 34 by switching the CW rotation to a counterclockwise (CCW) rotation. The CW rotation and the CCW rotation are the opposite rotation directions of the motor 67 and correspond to the forward rotation and the backward rotation, respectively.

Figure 7:
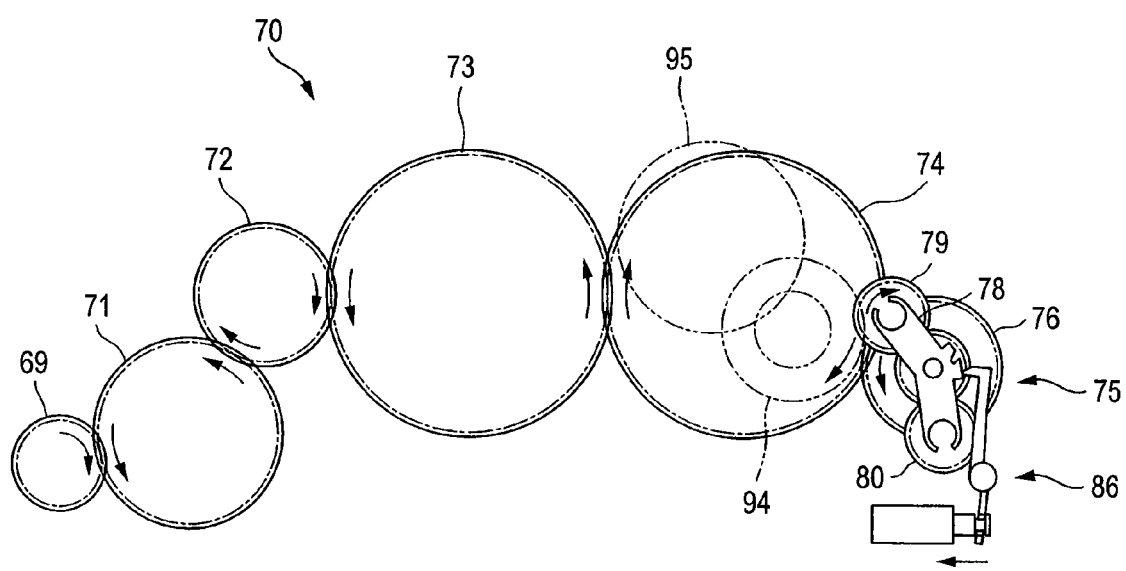
FIG. 7 is a diagram illustrating a configuration of a driving power transmission mechanism.

As shown in FIG. 7, four transmission gears 71, 72, 73, and 74 sequentially engages with a driving gear 69 disposed on the driving shaft of the motor 67, thereby transmitting the driving power to the sun-and-planet gear 75. The four transmission gears 71, 72, 73, and 74 are not particularly limited, but may be properly disposed depending on the distance from the driving gear 69 to the sun-and-planet gear 75. In this case, the number of transmission gears and the diameters thereof may be changed. With the CW rotation or the CCW rotation of the motor 67, the transmission gears 71, 72, and 73 sequentially engaging with each other rotate in a predetermined direction, thereby transmitting the driving power so as to allow the transmission gear 74 to rotate in the CCW direction or the CW direction.

Figure 9:
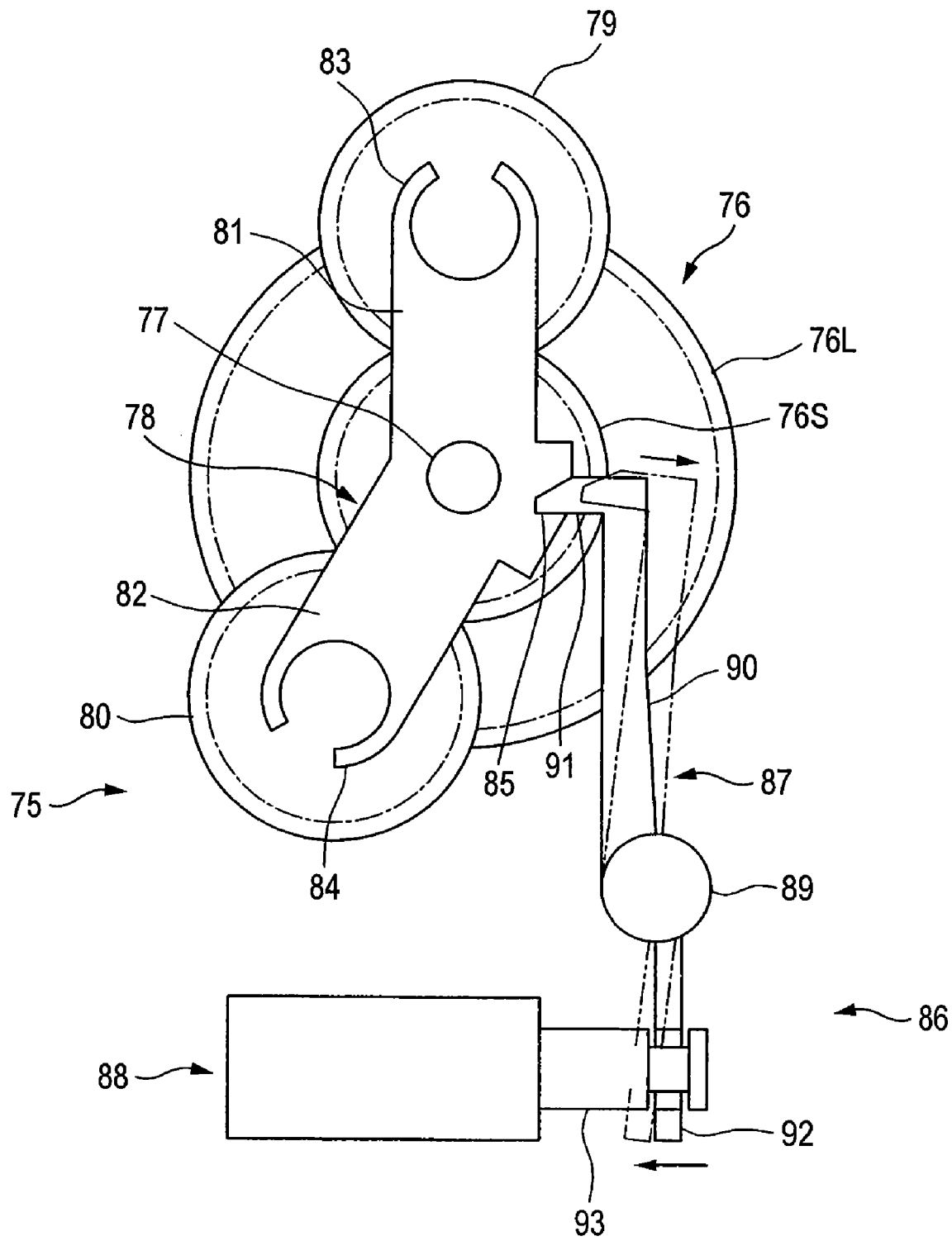
FIG. 9 is a diagram illustrating a configuration of a sun-and-planet gear and a locking mechanism.

FIG. 9 illustrates a configuration of the sun-and-planet gear 75. In the sun-and-planet gear 75, a support arm 78 is rotatably disposed to be coaxial with an axis 77 of a sun gear 76 and two planet gears 79 and 80 engaging with the sun gear 76 are pivotally supported by the support arm 78.

The sun gear 76 is a two-stepped gear having a large-diameter gear 76L and a small-diameter gear 76S coaxial and integral with each other. In the support arm 78, arm portions 81 and 82 extend in two diameter directions from the axis 77 and the planet gears 79 and 80 are pivotally supported by bearing portions 83 and 84 formed at the ends of the arm portions 81 and 82. The planet gears 79 and 80 pivotally supported by the support arm 78 engage with the gear 76S of the sun gear 76. When the sun gear 76 rotates, the planet gears 79 and 80 engaging with the gear 76S also rotates. With the rotation of the sun gear 76, the support arm 78 rotates in the same direction. That is, when the sun gear 76 rotates, the planet gears 79 and 80 rotate on their own axes and revolve around the sun gear 76.

A locking depression 85 is formed in the vicinity of the axis 77 of the support arm 78. By locking the locking depression 85 to a locking mechanism 86, the support arm 78 is stopped at a predetermined position regardless of the rotation of the sun gear 76. The posture in which the support arm 78 is locked to the locking mechanism 86 is a disengagement posture to be described later.

The locking mechanism 86 includes a locking member 87 and a pickup solenoid 88. The locking member 87 includes an arm portion 90 extending in the diameter direction toward the support arm 78 from the shaft 89, a locking claw 91 formed in a claw shape at the end of the arm portion 90, a power receiving portion 92 extending in the diameter direction from the shaft 89. The locking claw 91 can engage with the locking depression 85 of the support arm 78 and disengages with the locking depression 85 by allowing the arm portion 90 to rotate about the shaft 89. The power receiving portion 92 is connected to a shaft 93 of the pickup solenoid 88. In the pickup solenoid 88, an electromagnetic force acts with a supply of power so as to linearly drive the shaft 93 in a direction retreating to the main body and the electromagnetic force disappears by cutting the supply of power so as to resiliently return the shaft 93 in a direction advancing from the main body. The driving power of the shaft 93 is transmitted to the power receiving portion 92 and the locking member 87 rotates about the shaft 89 to a predetermined posture. In the state where the pickup solenoid 88 is turned off, as indicated by a solid line in FIG. 9, the locking member 87 has a posture in which the locking claw 91 can engage with the locking depression 85 of the support arm 78. In the state where the pickup solenoid 88 is turned on, as indicated by a two-dot chained line in FIG. 9, the locking member 87 has a posture in which the locking claw 91 disengages from the locking depression 85.

As shown in FIG. 7, the transmission gear 74 engages with the gear 76L of the sun gear 76 of the sun-and-planet gear 75. By allowing the transmission gear 74 to rotate in a predetermined direction with the driving power transmitted from the motor 67, the sun gear 76 rotates in a predetermined direction. For example, as shown in FIG. 7, when the driving gear 69 rotates in the CW direction, the transmission gear 74 rotates in the CW direction and the sun gear 76 rotates in the CCW direction. When the pickup solenoid 88 is turned on, the support arm 78 is rotatable. Accordingly, the planet gears 79 and 80 revolve in the CCW direction. In addition, only when the locking claw 91 is allowed to disengage with the locking depression 85, the pickup solenoid 88 can be turned on. Even when the pickup solenoid 88 is turned off after the support arm 78 rotationally moves from the disengagement posture, the locking claw 91 does not engage with the locking depression 85.

Figure 8:
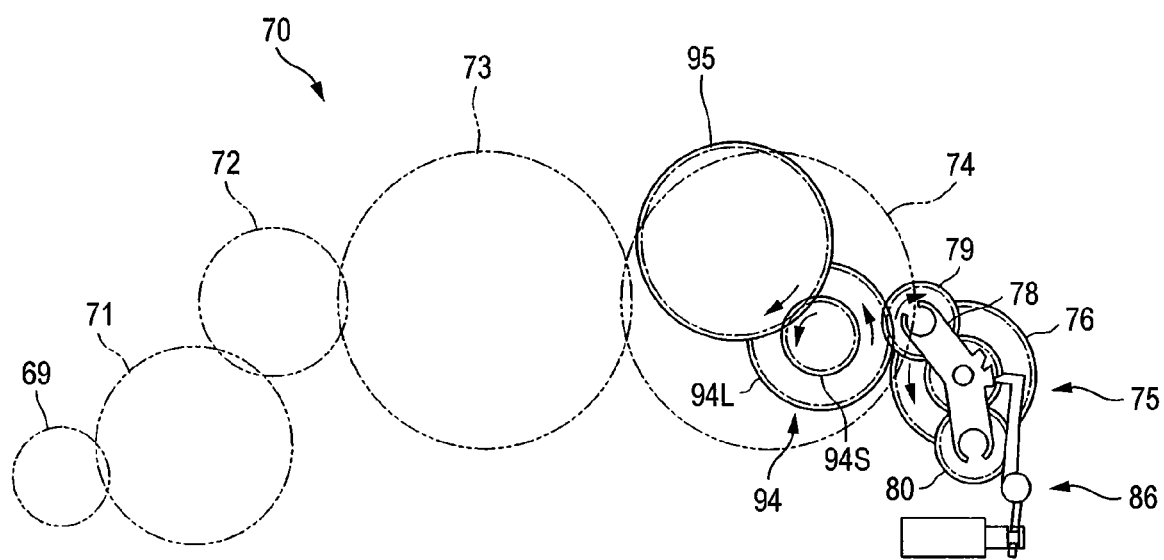
FIG. 8 is a diagram illustrating the configuration of the driving power transmission mechanism.

As shown in FIG. 8, a transmission gear 94 is disposed adjacent to the sun-and-planet gear 75. The transmission gear 94 can engage with or disengage from the planet gears 79 and 80 of the sun-and-planet gear 75. As shown in FIG. 8, by allowing the planet gears 79 and 80 to revolve in the CCW direction, the planet gear 79 engages with the transmission gear 94 and the planet gear 80 disengages with the transmission gear 94. The transmission gear 94 is a two-stepped gear having a large-diameter gear 94L and a small-diameter gear 94S which are coaxial and integral with each other. The planet gears 79 and 80 can engage with or disengage from the large-diameter gear 94L. The small-diameter gear 94S engages with a driven gear 95 disposed on the shaft 111 (see FIG. 12) pivotally supporting the separation roller 34. The gear configuration from the transmission gear 94 to the driven gear 95 is not particularly limited, but the number of transmission gears or the diameters thereof may be properly changed depending on the distance from the transmission gear 94 to the driven gear 95.

By allowing the planet gear 79 revolving in the CCW direction to engage with the transmission gear 94, the revolving of the planet gear 79 is stopped. The planet gear 79 rotates in the CW direction with the driving power transmitted from the sun gear 76. Accordingly, the transmission gear 94 rotates in the CCW direction and the driven gear 95 rotates in the CW direction. With the CW rotation of the driven gear 95, the shaft 111 pivotally supporting the separation roller 34 rotates in the feeding direction.

Figure 10:
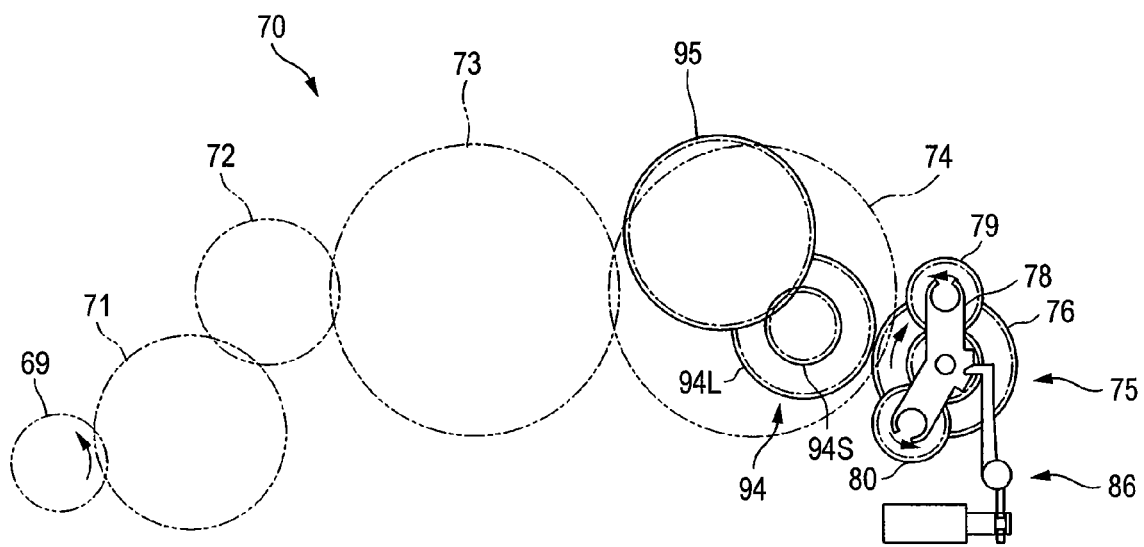
FIG. 10 is a diagram illustrating a configuration of the driving power transmission mechanism.

As shown in FIG. 10, when the driving gear 69 is switched from the CW rotation to the CCW rotation, the transmission gear 74 rotates in the CCW direction and the sun gear 76 rotates in the CW direction. As shown in FIG. 8, in the state where the planet gear 79 engages with the transmission gear 94, the locking claw 91 does not engage with the locking depression 85 even when the pickup solenoid 88 is turned off. Accordingly, since the support arm 78 is rotatable, the planet gear 79 and 80 revolve in the CW direction. By allowing the support arm 78 to rotate with the revolving of the planet gears 79 and 80, the locking depression 85 of the support arm 85 is positioned to engage with the looking claw 91. At this time, when the pickup solenoid 88 is turned off, as shown in FIG. 10, the locking claw 91 engages with the locking depression 85 to regulate the rotation of the support arm 78. In this state, both of the planet gears 79 and 80 do not engage with the transmission gear 94. The posture of the support arm 78 in which both of the planet gears 79 and 80 disengage from the transmission gear 94 is referred to as a disengagement posture. By allowing the locking claw 91 to engage with the locking depression 85, the support arm 78 is locked unrotatable and the support arm 78 is maintained in the disengagement posture until the pickup solenoid 88 is turned on next time.

Figure 11:
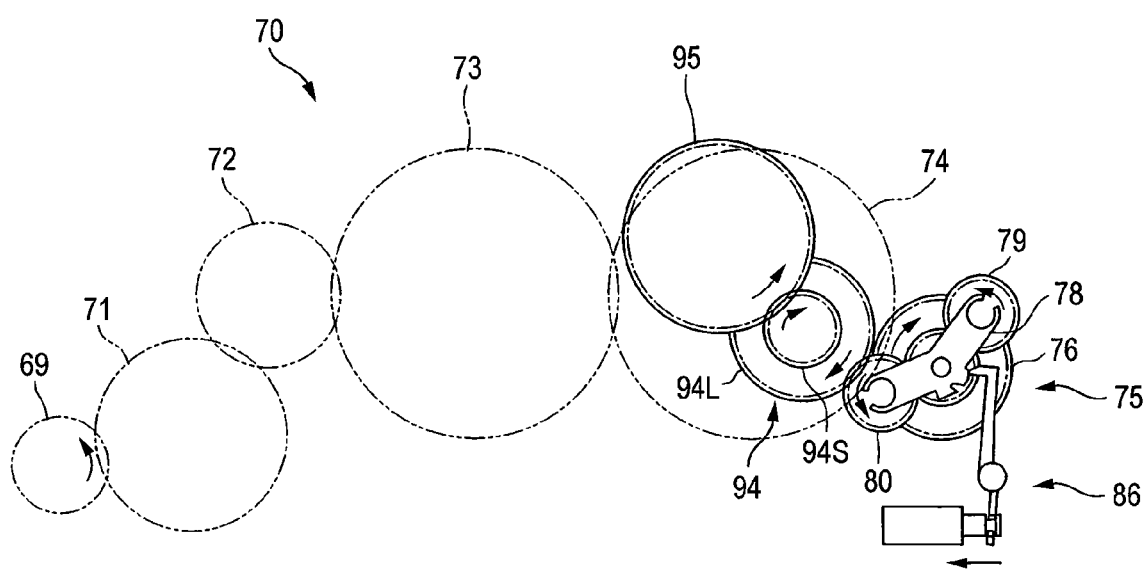
FIG. 11 is a diagram illustrating a configuration of the driving power transmission mechanism.

As shown in FIG. 11, when the pickup solenoid 88 is turned on, the planet gears 79 and 80 revolve in the CW direction with the CW rotation of the sun gear 76. The revolving of the planet gear 80 is stopped by allowing the planet gear 80 revolving in the CW direction to engage with the transmission gear 94. The planet gear 80 rotates in the CCW direction with the driving power transmitted from the sun gear 76. With this rotation, the transmission gear 94 rotates in the CW direction and the driven gear 95 rotates in the CCW direction. With the CCW rotation of the driven gear 95, the shaft 111 pivotally supporting the separation roller 34 rotates in a direction opposite to the feeding direction.

Hereinafter, the driving power transmission mechanism 110 from the shaft 111 pivotally supporting the separation roller 34 to the pickup roller 33 will be described. As shown in FIG. 2, the pickup roller 33 is pivotally supported by the end of the arm 29 and is disposed on the opposite side of the separation roller 34 in the feeding direction with a gap therebetween. As described above, the driving power of the motor 67 is transmitted to the shaft 111 and the driving power is transmitted to the arm 29, the pickup roller 33, and the separation roller 34 from the shaft 111.

Figure 12:
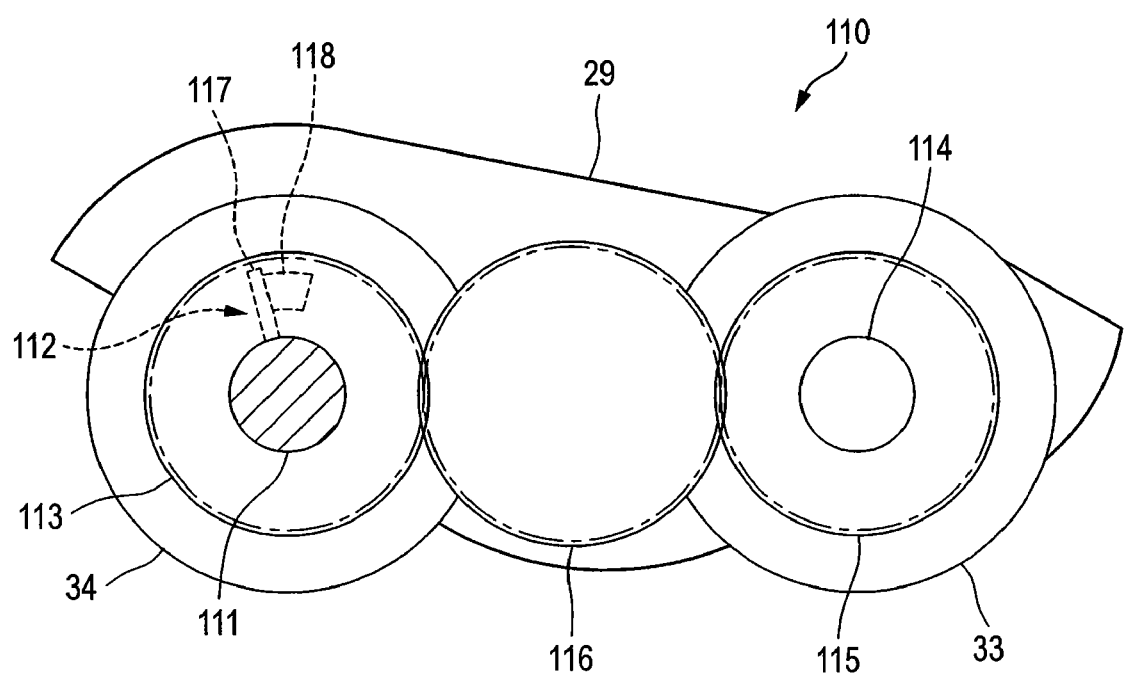
FIG. 12 is a diagram illustrating a configuration of a driving power transmission mechanism.

FIG. 12 illustrates the driving power transmission mechanism 110 from the shaft 111 to the pickup roller 33. The driving power transmission mechanism 110 includes a one-turn clutch disposed in the shaft 111, a gear 113 formed integrally with the separation roller 34, a gear 115 fixed to the shaft 114 of the pickup roller 33, and a transmission gear 116 transmitting the driving power to the gear 115 from the gear 113. In addition, the one-turn clutch 112 and the gear 113 are disposed on both sides in the axial direction of the separation roller 34. In FIG. 12, since the one-turn clutch 112 is disposed on the inside of the separation roller 34 in FIG. 12 and the gear 113 is disposed on the front side in FIG. 12, the one-turn clutch 112 disposed on the inside of the separation roller 34 is indicated by a dotted line.

The one-turn clutch 112 includes a pin 117 protruding in the diameter direction from the shaft 111 and a locking piece 118 protruding in the axial direction from the separation roller 34. The pin 117 protrudes in the diameter direction of the shaft 111 from the side surface of the separation roller 34 and rotates with the rotation of the shaft 111. The locking piece 118 protrudes in the axial direction from the side surface of the separation roller 34. The position of the locking piece 118 in the diameter direction of the separation roller 34 is in the range of the protruding length of the pin 117 and the pin 117 and the locking piece 118 can engage with each other. As shown in FIG. 12, by allowing the pin 117 to engage with the locking piece 118, the rotation of the shaft 111 is transmitted to the separation roller 34 through the pin 117 and the locking piece 118 and thus the separation roller 34 rotates in the same direction as the shaft 111.

Since the separation roller 34 is rotatable about the shaft 111, the separation roller 34 can rotate in a direction in which the locking piece 118 disengages from the pine 117. When the separation roller 34 rotates by about one turn about the shaft 111, the locking pin 118 reaches and engages with the position of the pin 117 again. Accordingly, the separation roller 34 can revolve by about one turn without transmission of the driving power from the shaft 111.

The transmission gear 116 is interposed between the gear 113 disposed in the separation roller 34 and the gear 115 fixed to the shaft 114 of the pickup roller 33. The transmission gear 116 engages with the gear 113 and the gear 115. Since the gear 113 is formed integrally with the separation roller 34, the gear rotates with the rotation of the separation roller 34. The transmission gear 116 rotates with the rotation of the gear 113 and the gear 115 rotates with the rotation of the transmission gear 116. Since the gear 115 is fixed to the shaft 114 of the pickup roller 33, the pickup roller 33 rotates with the rotation of the gear 115. That is, the separation roller 34 and the pickup roller 33 always rotate in the same direction. The driving power is transmitted to the separation roller 34 and the pickup roller 33 from the shaft 111 rotatably supporting the separation roller 34 by means of the driving power transmission mechanism 110.

As shown in FIG. 12, the base end of the arm 29 is rotatably supported by the shaft 111 and moved upwardly and downwardly with the driving power transmitted from the shaft 111. A sliding clutch not shown is disposed between the shaft 111 and the base end of the arm 29. The rotation of the shaft 111 is transmitted to the arm 29 by means of the sliding clutch. A clutch plate slides by receiving a load greater than a predetermined torque and thus the sliding clutch transmits the driving power. By allowing the shaft 111 to rotate in the CW direction, the rotary power is transmitted to the arm 29 through the sliding clutch and thus the arm 29 rotates in a direction in which the pickup roller 33 is lowered. On the other hand, when the shaft 111 rotates in the CCW direction, the arm 29 rotates in a direction in which the pickup roller 33 is raised. As shown in FIG. 2, when the arm 29 rotates in the direction in which the pickup roller 33 is lowered, the pickup roller 33 abuts on the guide surface of the document feed path 32 or the document on the document input tray 30. Accordingly, a load is generated with respect to the rotation of the arm 29, the sliding clutch slides, and thus the shaft 11 can rotate again in the state where the arm 29 is stopped. When the arm 29 rotates in a direction in which the pickup roller 33 is raised, the arm 29 abuts on the case of the ADF 3. Accordingly, a load is generated with respect to the rotation of the arm 29, the sliding clutch slides, and thus the shaft 11 can further rotate in the state where the arm 29 is stopped. In this way, the driving power is transmitted to the arm 29 through the sliding clutch from the shaft 111 and the arm 29 moves to lower or raise the pickup roller 33 about the guide surface of the document feed path 32.

Figure 13:
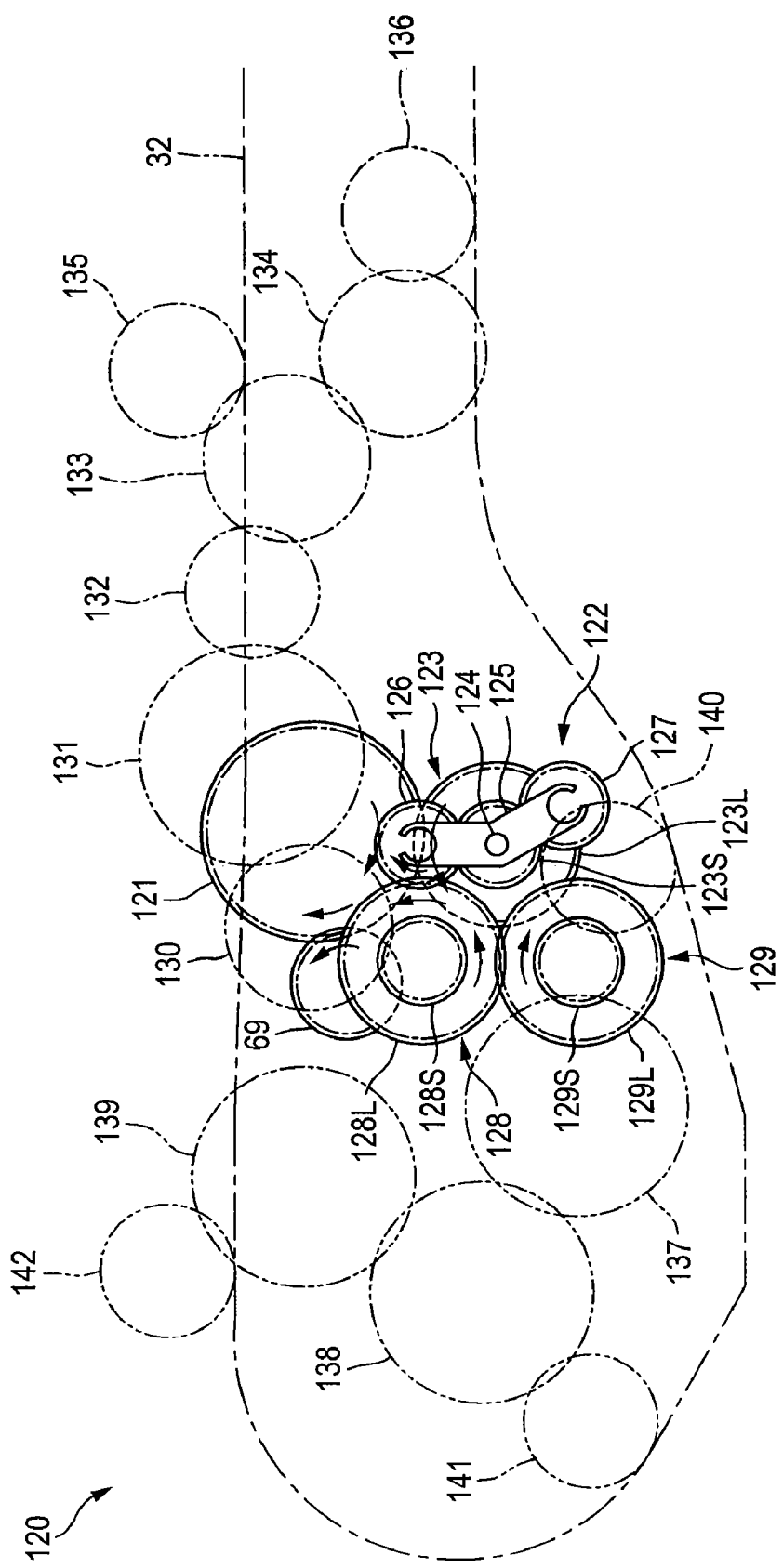
FIG. 13 is a diagram illustrating a configuration of a driving power transmission mechanism.
Figure 14:
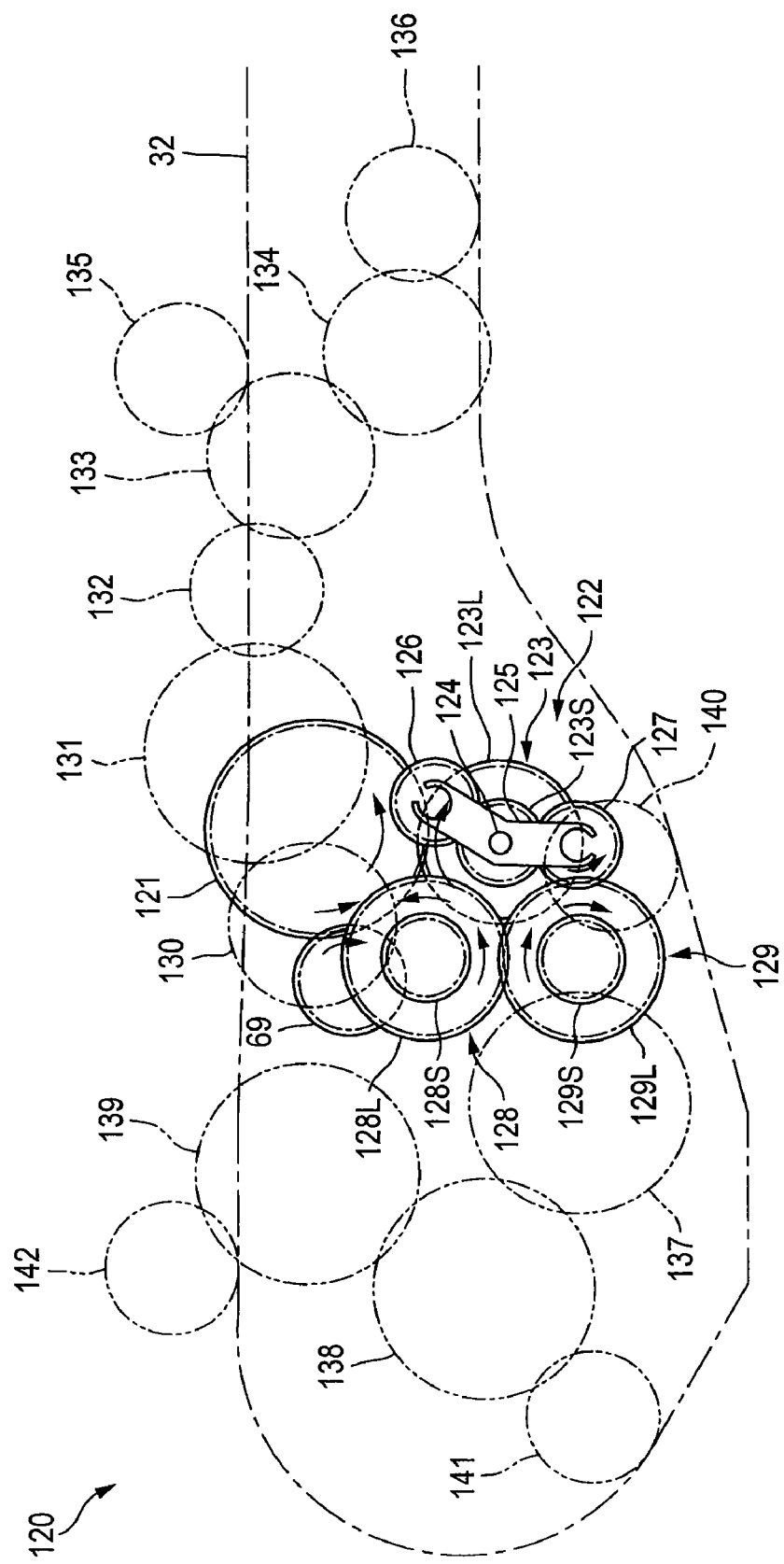
FIG. 14 is a diagram illustrating a configuration of the driving power transmission mechanism.
Figure 15:
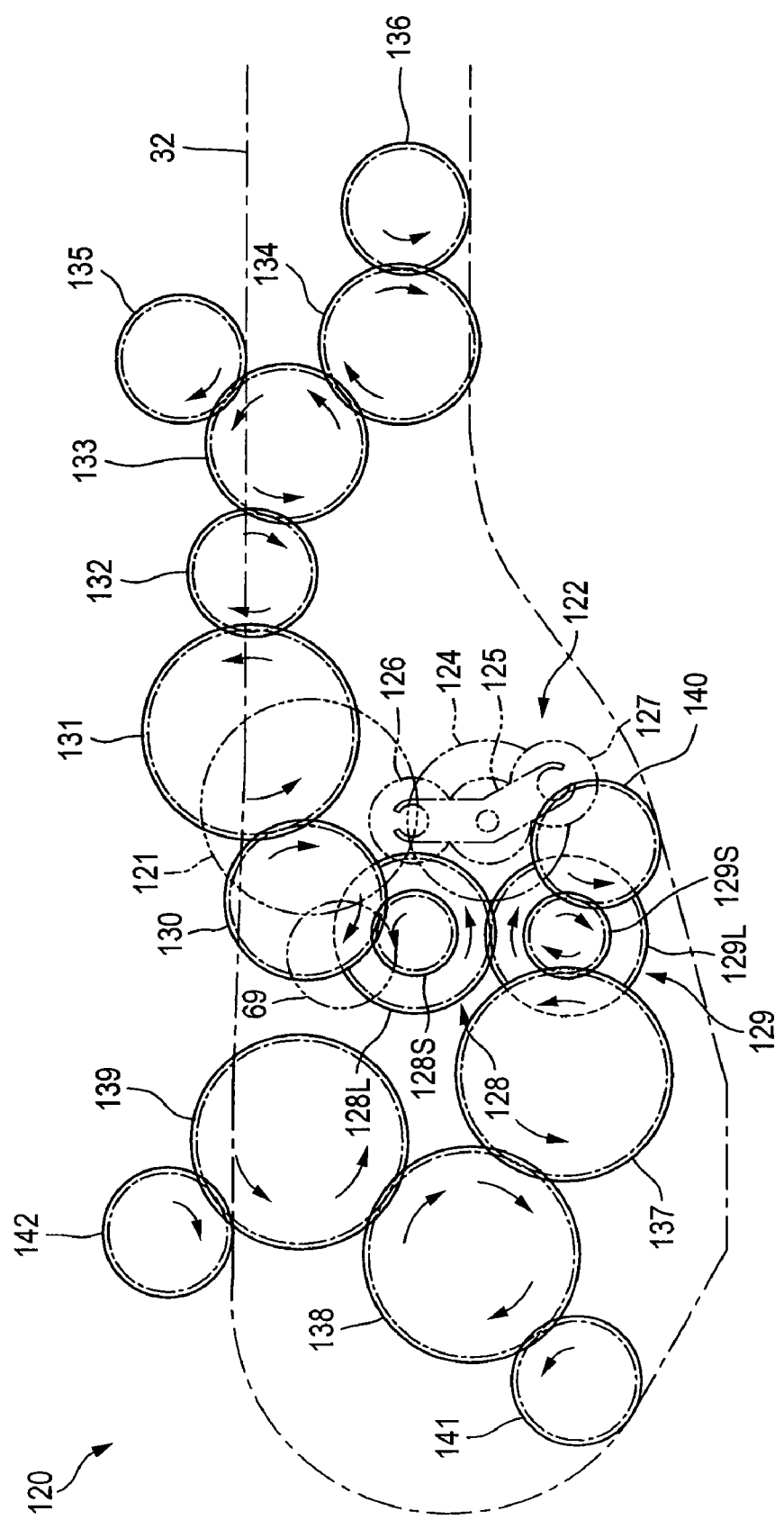
FIG. 15 is a diagram illustrating a configuration of the driving power transmission mechanism.

FIGS. 13 to 15 illustrate the driving power transmission mechanism 120 from the motor 67 to the feed rollers 35A, 35B, 35C, and 35D. The driving power transmission mechanism 120 transmits the driving power to the feed rollers 35A, 35B, 35C, and 35D in the feeding direction from the upstream side to the downstream side in the document feed path 32, without the rotation direction of the motor 67.

As shown in FIG. 13, a transmission gears 121 sequentially engages with the driving gear 69 disposed on the driving shaft of the motor 67, thereby transmitting the driving power to the sun-and-planet gear 122. The number of gears from the driving gear 69 to the transmission gear 121, etc. is not particularly limited, the number of transmission gears and the diameters thereof may be changed depending on the distance from the driving gear 69 to the sun-and-planet gear 122. With the CW rotation or the CCW rotation of the motor 67, the driving power is transmitted so as to allow the transmission gear 121 to rotate in the CCW direction or the CW direction.

In the sun-and-planet gear 122, a support arm 125 is rotatably disposed to be coaxial with an axis 124 of a sun gear 123 and two planet gears 126 and 127 engaging with the sun gear 123 are pivotally supported by the support arm 125.

The sun gear 123 is a two-stepped gear having a large-diameter gear 123L and a small-diameter gear 123S coaxial and integral with each other. The planet gears 126 and 127 pivotally supported by the support arm 125 engage with the gear 123S of the sun gear 123. When the sun gear 123 rotates, the planet gears 126 and 127 engaging with the gear 123S also rotate. With the rotation of the sun gear 123, the support arm 125 rotates in the same direction. That is, when the sun gear 123 rotates, the planet gears 126 and 127 rotate on their own axes and revolve around the sun gear 123.

The transmission gear 121 engages with the gear 123L of the sun gear 123 of the sun-and-planet gear 122. By allowing the transmission gear 123 to rotate in a predetermined direction with the driving power transmitted from the motor 67, the sun gear 123 rotates in a predetermined direction. For example, as shown in FIG. 13, when the driving gear 69 rotates in the CCW direction, the transmission gear 1212 rotates in the CW direction, the sun gear 123 rotates in the CCW direction, and the planet gears 126 and 127 revolve in the CCW direction.

As shown in FIG. 13, a transmission gear 128 and a transmission gear 129 are disposed adjacent to the sun-and-planet gear 122. The transmission gear 128 is a two-stepped gear having a large-diameter gear 128L and a small-diameter gear 128S coaxial and integral with each other. Similarly, the transmission gear 129 is a two-stepped gear having a large-diameter gear 129L and a small-diameter gear 129S coaxial and integral with each other. The planet gear 126 of the sun-and-planet gear 122 can engage with or disengage from the gear 128L of the transmission gear 128. The planet gear 127 of the sun-and-planet gear 122 can engage with or disengage from the gear 129L of the transmission gear 128. The gear 128L and the gear 129L engage with each other.

As shown in FIG. 13, the planet gear 126 engages with the gear 128L of the transmission gear 128 with the CCW rotation of the planet gears 126 and 127. On the other hand, the planet gear 127 disengages from the transmission gear 129. By allowing the planet gear 126 revolving in the CCW direction to engage with the transmission gear 128, the revolving of the planet gears 126 and 127 are stopped. The planet gear 126 rotates in the CW direction with the driving power transmitted from the sun gear 123. Accordingly, the transmission gear 128 rotates in the CCW direction. The transmission gear 129 engaging with the transmission gear 128 rotates in the CW direction.

As shown in FIG. 14, when the driving gear 69 rotates in the CW direction, the transmission gear 121 rotates in the CCW direction, the sun gear 123 rotates in the CW direction, and the planet gears 126 and 127 revolve in the CW direction. The planet gear 127 engages with the gear 129L of the transmission gear 129 with the CW rotation of the planet gears 126 and 127. On the other hand, the planet gear 126 disengages from the transmission gear 128. By allowing the planet gear 127 revolving in the CW direction to engage with the transmission gear 129, the revolving of the planet gears 126 and 127 are stopped. The planet gear 127 rotates in the CCW direction with the driving power transmitted from the sun gear 123. Accordingly, the transmission gear 129 rotates in the CW direction. The transmission gear 128 engaging with the transmission gear 129 rotates in the CCW direction. In this way, whether the driving gear 69 rotates in the CW direction or in the CCW direction, the driving power of the CCW rotation is transmitted to the transmission gear 128 and the driving power of the CW rotation is transmitted to the transmission gear 129.

FIG. 15 illustrates the transmission of the driving power from the transmission gears 128 and 129 to the feed rollers 35A, 35B, 35C, and 35D and the discharge roller 36. Five transmission gears 130, 131, 132, 133, and 134 sequentially engage with the gear 128S of the transmission gear 128. A driven gear 135 disposed on the axis of the feed roller 35A engages with the transmission gear 133 and a driven gear 136 disposed on the axis of the discharge roller 36 engages with the transmission gear 134. As described above, the transmission gear 128 rotates in the CCW direction regardless of the rotation direction of the driving gear 69, the driving power is sequentially transmitted from the transmission gear 128 to the five transmission gears 130, 131, 132, 133, and 134, the driven gear 135 rotates in the CW direction by receiving the driving power, and thus the driven 136 rotates in the CCW direction. With the rotation of the driven gear 135 in the CW direction, the feed roller 35A rotates in the feeding direction. With the rotation of the driven gear 136 in the CCW direction, the discharge roller 36 rotates in the feeding direction.

Three transmission gears 137, 138, and 139 sequentially engage with the gear 129S of the transmission gear 129. A driven gear 140 disposed on the axis of the feed roller 35D engages with the gear 129S, a driven gear 141 disposed on the axis of the feed roller 35C engages with the transmission gear 138, and a driven gear 142 disposed on the axis of the feed roller 35B engages with the transmission gear 139. As described above, the transmission gear 129 rotates in the CW direction regardless of the rotation direction of the driving gear 69 and the driving power is sequentially transmitted from the transmission gear 129 to the three transmission gears 137, 138, and 139. The driven gears 140 and 141 rotate in the CW direction by receiving the driving power and the driven gear 142 rotates in the CW direction. With the rotation of the driven gears 140 and 141 in the CCW direction, the feed roller 35D and 35C rotate in the feeding direction. With the rotation of the driven gear 142 in the CW direction, the feed roller 35B rotates in the feeding direction. In this way, regardless of the rotation direction of the driving gear 69, the driving power in the feeding direction is delivered to the feed rollers 35A, 35B, 35C, and 35D and the discharge roller 36. In addition, the gear construction from the transmission gears 128 and 129 to the driven gears 135, 136, 140, 141, and 142 is not particularly limited, but the number of transmission gears and diameters thereof may be properly changed depending on the distances from the transmission gears to the driven gears.

Figure 16:
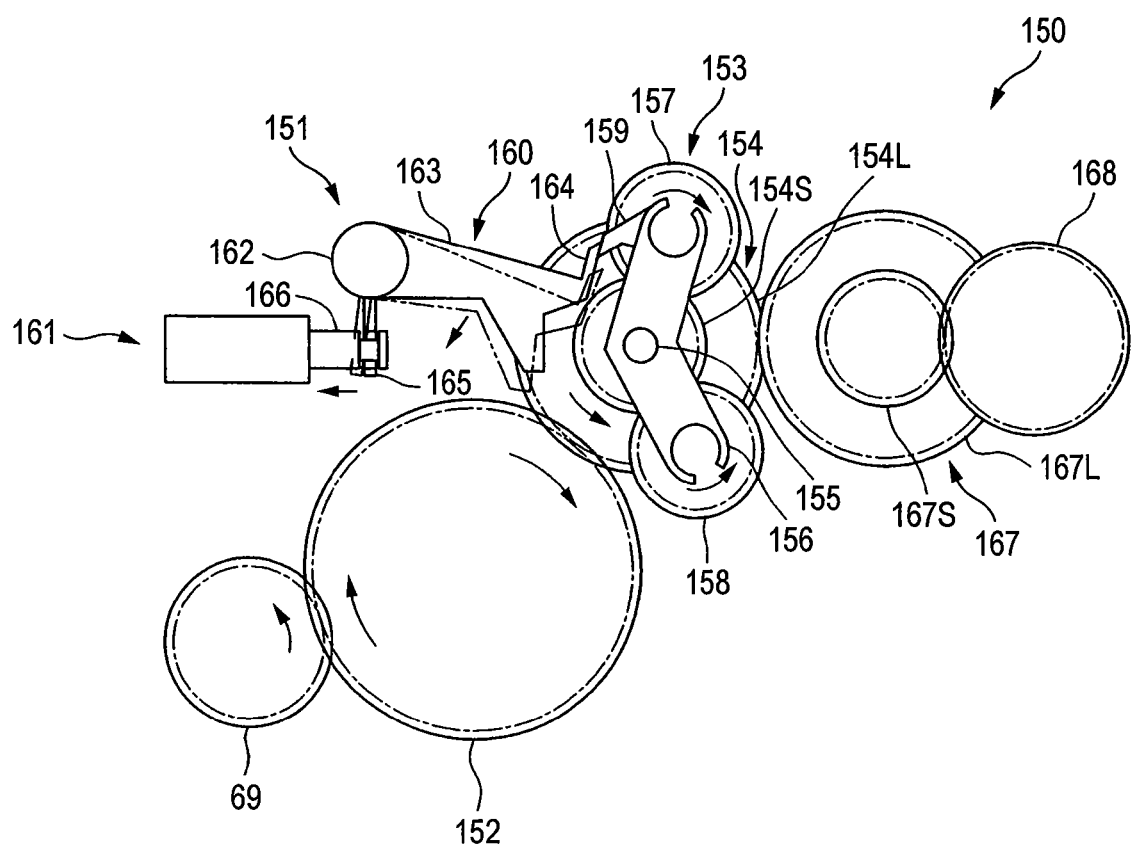
FIG. 16 is a diagram illustrating a configuration of a driving power transmission mechanism.
Figure 17:
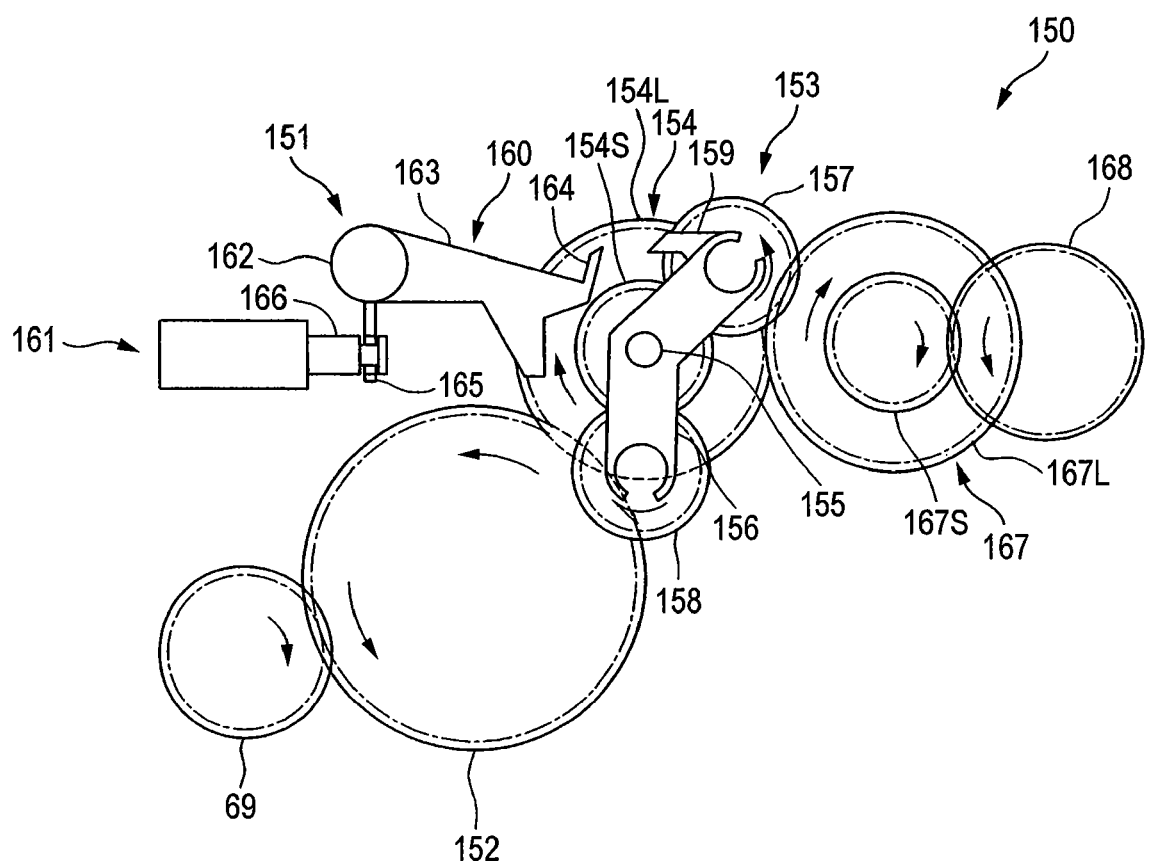
FIG. 17 is a diagram illustrating a configuration of the driving power transmission mechanism.
Figure 18:
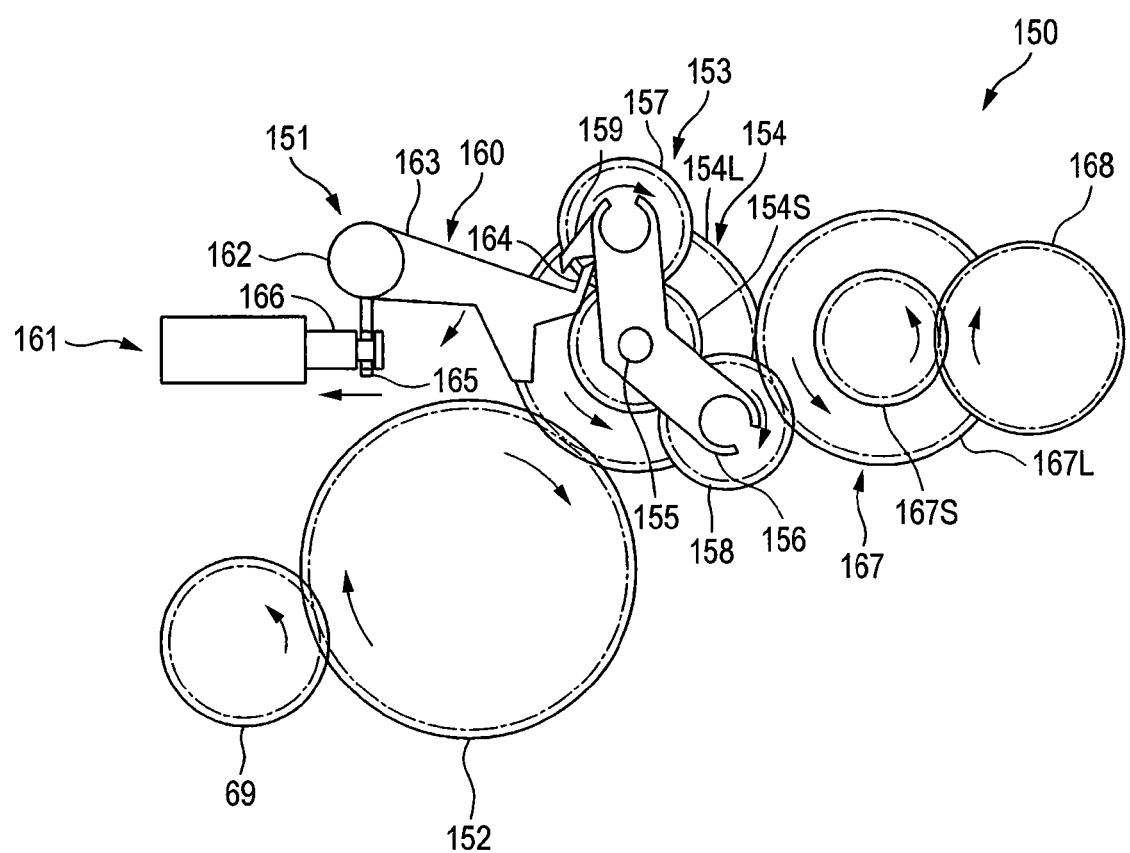
FIG. 18 is a diagram illustrating a configuration of the driving power transmission mechanism.

FIGS. 16 to 18 illustrate a driving power transmission mechanism 150 and a driving power cutting mechanism 151 to the reversible roller 43 from the motor 67. The driving power transmission mechanism 150 transmits the driving power in the entrance direction or the return direction to the reversible roller 43 on the basis of the rotation direction of the motor 67. The driving power cutting mechanism 151 cuts off the transmission of the driving power from the motor 67 to the reversible roller 43 when the rotation direction of the motor 67 is changed from the return direction of the reversible roller 43 to the entrance direction. In addition, the entrance direction is a direction in which the document is inserted into the bidirectional feed path 39 from the document feed path 32 and the return direction is a direction in which the document is returned from the bidirectional feed path 39 to the document feed path 32.

As shown in FIG. 16, the transmission gear 152 engages with the driving gear 69 disposed on the driving shaft of the motor 67 and thus the driving power is transmitted to the sun-and-planet gear 153. In addition, the configuration from the driving gear 69 to the transmission gear 152 is not particularly limited and the number of transmission gears or the diameters thereof may be changed depending on the distance from the driving gear 69 to the sun-and-planet gear 153. The driving power is transmitted so that the transmission gear 152 rotates in the CCW direction or the CW direction with the CW rotation or the CCW rotation of the motor.

In the sun-and-planet gear 153, a support arm 156 is rotatably disposed coaxial with an axis 155 of a sun gear 154 and two planet gears 157 and 158 engaging with the sun gear 154 are pivotally supported by the support arm 156.

The sun gear 154 is a two-stepped gear in which a large-diameter gear 154L and a small-diameter gear 154S are constructed to be coaxial and integral. The support arm 156 is disposed rotatably on the axis 155 and pivotally supports the planet gears 157 and 158. The planet gears 157 and 158 pivotally supported by the support arm 156 engage with the gear 154S of the sun gear 154. When the sun gear 154 rotates, the planet gears 157 and 158 engaging with the gear 154S also rotates. With the rotation of the sun gear 154, the support arm 156 rotates in the same direction. That is, when the sun gear 154 rotates, the planet gears 157 and 158 rotate on their own axes and revolve around the sun gear 154.

A locking projection 159 is formed in the vicinity of the front end of the support arm 156 which pivotally supports the planet gear 157. By locking the locking projection 159 to the driving power cutting mechanism 151, the support arm 156 rotating in the CCW direction about the axis 155 of the sun gear 154 is stopped at a predetermined position. As shown in FIG. 16, the posture where the support arm 156 is locked to the driving power cutting mechanism 151 is a disengagement posture to be described later.

The driving power cutting mechanism 151 includes a locking member 160 and a switch-back solenoid 161. The locking member 160 includes an arm portion 163 extending in the diameter direction toward the support arm 156 from the shaft 162, a locking claw 164 formed in a claw shape at the end of the arm portion 163, a power receiving portion 165 extending in the diameter direction from the shaft 162. The locking claw 164 can engage with the locking projection 159 of the support arm 156 and disengages with the locking projection 159 by allowing the arm portion 163 to rotate about the shaft 162. The power receiving portion 165 is connected to a shaft 166 of the switch-back solenoid 161. In the switch-back solenoid 161, an electromagnetic force acts with a supply of power so as to linearly drive the shaft 166 in a direction retreating to the main body and the electromagnetic force disappears by cutting off the supply of power so as to resiliently return the shaft 166 in a direction advancing from the main body. The driving power of the shaft 166 is transmitted to the power receiving portion 165 and the locking member 160 rotates about the shaft 162 to a predetermined posture.

In the state where the switch-back solenoid 161 is turned off, as indicated by a solid line in FIG. 16, the locking member 160 has a posture in which the locking claw 164 can engage with the locking projection 159 of the support arm 156. The locking member 160 can rotate in the CW direction from the engagement posture and maintains the engagement posture without any application of an external force because it is urged by a spring or the like. The locking projection 159 rotates with the rotation of the support arm 156 and the rotation direction thereof is substantially in the diameter direction of the locking member 160 with the engagement posture. Accordingly, even when the rotary power of the support arm 156 is transmitted to the locking member 160 through the locking projection 159, the locking member 160 does not rotates from the engagement posture against the urging force of the spring or the like. In the state where the switch-back solenoid 160 is turned on, as indicated by a two-dot chained line in FIG. 16, the locking member 160 is in the posture in which the locking claw 164 disengages with the locking projection 159.

As shown in FIG. 16, the transmission gear 152 engages with the gear 154L of the sun gear 154 of the sun-and-planet gear 153. By allowing the transmission gear 152 to rotate in a predetermined direction with the driving power transmitted from the motor 67, the sun gear 154 rotates in a predetermined direction. For example, as shown in FIG. 16, when the driving gear 69 rotates in the CCW direction, the transmission gear 152 rotates in the CW direction and the sun gear 154 rotates in the CCW direction. Accordingly, the planet gears 157 and 158 revolve in the CCW direction. Since the support arm 156 rotates with the revolving of the planet gears 157 and 158, the locking projection 159 of the support arm 156 is positioned to engage with the locking claw 164. At this time, when the switch-back solenoid 161 is turned off, as shown in FIG. 16, the locking claw 164 engages with the locking projection 159, thereby regulating the rotation of the support arm 156. In this state, both planet gears 157 and 158 disengage from the transmission gear 167. The posture of the support arm 156 in which both planet gears 157 and 158 disengage from the transmission gear 167 is referred to as a disengagement posture in this specification. By allowing the locking claw 164 to engage with the locking projection 159, the CCW rotation of the support arm 156 is regulated until the switch-back solenoid is turned on and thus the support arm 156 is maintained in the disengagement posture.

As shown in FIG. 16, a transmission gear 167 is disposed at a position adjacent to the sun-and-planet gear 153. The transmission gear 167 can engage with or disengage from the planet gears 157 and 158 of the sun-and-planet gear 153. The transmission gear 167 is a two-stepped gear having a large-diameter gear 167L and a small-diameter gear 167S which are coaxial and integral with each other. The planet gears 157 and 158 can engage with or disengage from the large-diameter gear 167L. The small-diameter gear 167S engages with a driven gear 168 disposed on the shaft of the reversible roller 43. The gear configuration from the transmission gear 167 to the driven gear 168 is not particularly limited, but the number of transmission gears or the diameters thereof may be properly changed depending on the distance from the transmission gear 167 to the driven gear 168.

As shown in FIG. 17, when the driving gear 69 rotates in the CW direction, the transmission gear 152 rotates in the CCW direction and the sun gear 154 rotates in the CW direction. Accordingly, the planet gears 157 and 158 revolve in the CW direction. The support arm 156 rotates with the revolving of the planet gears 157 and 158. When the support arm 156 rotates in the CW direction, the locking projection 159 disengages from the locking claw 164. Accordingly, even when the switch-back solenoid 161 is turned off, the support arm 159 can rotate in the CW direction. The planet gear 157 engages with the transmission gear 167 with the CW rotation of the planet gears 157 and 158.

By allowing the planet gear 157 revolving in the CW direction to engage with the transmission gear 167, the revolving of the planet gear 157 is stopped. The planet gear 157 rotates in the CCW direction with the driving power transmitted from the sun gear 154. Accordingly, the transmission gear 167 rotates in the CW direction and the driven gear 168 rotates in the CCW direction. With the CCW rotation of the driven gear 168, the reversible roller 43 rotates in the return direction.

In the state shown in FIG. 16, when the switch-back solenoid 161 is turned on, the locking member 160 rotates and the locking claw 164 disengages from the locking projection 159. Accordingly, the support arm 156 can rotates in the CCW direction and thus the planet gears 157 and 158 revolve in the CCW direction. As shown in FIG. 18, by allowing the planet gear 158 revolving in the CCW direction to engage with the transmission gear 167, the revolving of the planet gear 158 is stopped. The planet gear 158 rotates in the CW direction with the driving power transmitted from the sun gear 154. Accordingly, the transmission gear 167 rotates in the CCW direction and the driven gear 168 rotates in the CW direction. With the CW rotation of the driven gear 168, the reversible roller 43 rotates in the entrance direction. Only when the locking claw 164 is allowed to disengage with the locking projection 159, the switch-back solenoid 161 can be turned on. Even when the switch-back solenoid 161 is turned off after the support arm 156 rotationally moves from the disengagement posture, the locking claw 164 does not engage with the locking projection 159.

By switching the rotation of the driving gear 67 from the CCW direction to the CW direction, the support arm 156 can rotate from the state shown in FIG. 18 in which the transmission gear 167 engages with the plane gear 158. By means of the CW rotation of the support arm 156, the state shown in FIG. 17 in which the transmission gear 167 engages with the planet gear 157 is obtained. By switching the rotation of the driving gear 67 from the CW direction to the CCW direction, the support arm 156 rotates in the CCW direction from the state shown in FIG. 17 and is changed to the disengagement posture in which the locking claw 164 and the locking projection 159 engage with each other as shown in FIG. 16.

Figure 19:
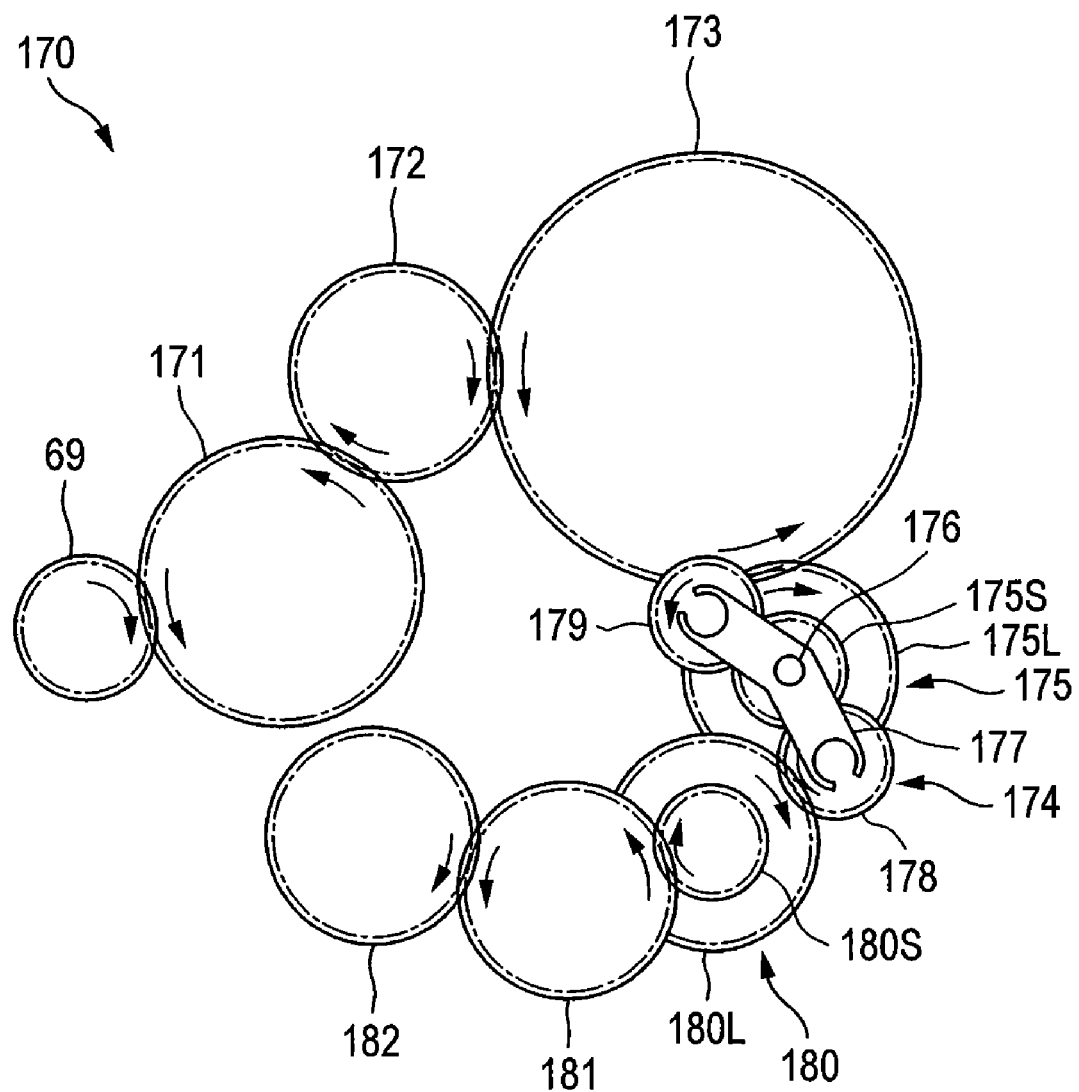
FIG. 19 is a diagram illustrating a configuration of a driving power transmission mechanism.
Figure 20:
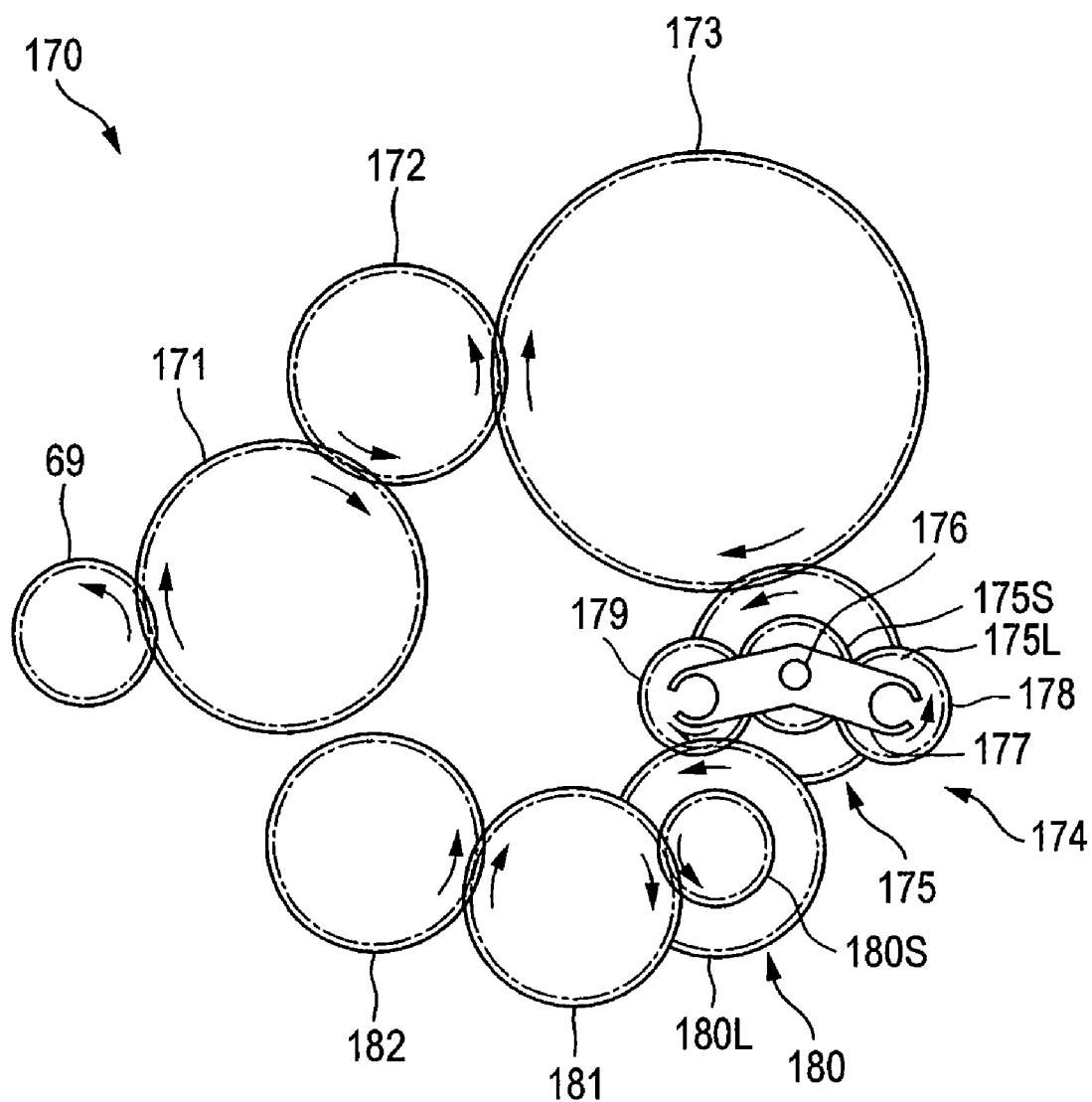
FIG. 20 is a diagram illustrating a configuration of the driving power transmission mechanism.

FIGS. 19 and 20 illustrate a driving power transmission mechanism 170 transmitting the driving power from the motor 67 to the guide flap 50. The driving power transmission mechanism 170 changes the posture of the guide flap 50 to a first guiding posture or a second guiding posture on the basis of the rotation direction of the motor 67.

As shown in FIG. 19, transmission gears 171, 172, and 173 sequentially engages with the driving gear 69 disposed on the driving shaft of the motor 67, thereby transmitting the driving power to the sun-and-planet gear 174 from the transmission gear 173. The number of transmission gears 171, 172, and 173 is not particularly limited but the number of transmission gears or the diameters thereof may be properly changed depending on the distance from the driving gear 69 to the sun-and-planet gear 174. With the transmission of the CW rotation or the CCW rotation of the motor 67, the driving power is transmitted so as to allow the transmission gear 173 to rotate in the CCW direction or the CW direction.

In the sun-and-planet gear 174, a support arm 177 is rotatably disposed to be coaxial with an axis 176 of a sun gear 175 and two planet gears 178 and 179 engaging with the sun gear 175 are pivotally supported by the support arm 177.

The sun gear 175 is a two-stepped gear having a large-diameter gear 175L and a small-diameter gear 175S which are coaxial and integral with each other. The planet gears 178 and 179 pivotally supported by the support arm 177 engage with the gear 175S of the sun gear 175. When the sun gear 175 rotates, the planet gears 178 and 179 engaging with the gear 175S also rotates. With the transmission of the rotation of the sun gear 175, the support arm 177 rotates in the same direction. That is, when the sun gear 175 rotates, the planet gears 178 and 179 rotate on their own axes and revolve around the sun gear 175.

The transmission gear 173 engages with the sun gear 175 of the sun-and-planet gear 174. By allowing the transmission gear 173 to rotate in a predetermined direction with the driving power transmitted from the motor 67, the sun gear 175 rotates in a predetermined direction. For example, as shown in FIG. 19, when the driving gear 69 rotates in the CW direction, the transmission gear 173 rotates in the CCW direction, the sun gear 175 rotates in the CW direction, and the planet gears 178 and 179 rotate in the CW direction.

As shown in FIG. 19, a transmission gear 180 and a transmission gear 181 are disposed adjacent to the sun-and-planet gear 174. The transmission gear 180 is a two-stepped gear having a large-diameter gear 180L and a small-diameter gear 180S which are coaxial and integral with each other. The planet gears 178 and 179 can engage with or disengage from the large-diameter gear 180L of the transmission gear 180. The transmission gear 181 engages with the gear 180S of the transmission gear 180 and the transmission gear 181 engages with a driven gear 182 disposed on the axis of the guide flap 50

As shown in FIG. 19, the planet gear 178 engages with the gear 180L of the transmission gear 180 with the CW rotation of the planet gears 178 and 179. On the other hand, the planet gear 179 disengages from the transmission gear 180. By allowing the planet gear 179 revolving in the CW direction to engage with the transmission gear 180, the revolving of the planet gears 178 and 179 is stopped. The planet gear 178 rotates in the CCW direction with the driving power transmitted from the sun gear 175. Accordingly, the transmission gear 180 rotates in the CW direction. The transmission gear 181 engaging with the transmission gear 180 rotates in the CCW direction and the driven gear 182 engaging with the transmission gear 181 rotates in the CW direction. With the CW rotation of the driven gear 182, the guide flap 50 rotates to move upwardly and to have the first guiding posture.

As shown in FIG. 20, when the driving gear 69 rotates in the CCW direction, the transmission gear 173 rotates in the CW direction, the sun gear 175 rotates in the CCW direction, and the planet gears 178 and 179 revolve in the CCW direction. The planet gear 179 engages with the gear 180L of the transmission gear 180 with the CCW rotation of the planet gears 178 and 179. On the other hand, the planet gear 178 disengages from the transmission gear 180. By allowing the planet gear 179 revolving in the CCW direction to engage with the transmission gear 180, the revolving of the planet gears 178 and 179 are stopped. The planet gear 179 rotates in the CW direction with the driving power transmitted from the sun gear 175. Accordingly, the transmission gear 180 rotates in the CCW direction. The transmission gear 181 engaging with the transmission gear 180 rotates in the CW direction and the driven gear 182 engaging with the transmission gear 181 rotates in the CCW direction. With the CCW rotation of the driven gear 182, the guide flap 50 rotates to move downwardly and to have the second guiding posture.

Although not shown in the figures, a sliding clutch is disposed between the shaft on which the driven gear 182 and the guide flap 50. The rotation of the shaft is transmitted to the guide flap 50 by means of the sliding clutch. A clutch plate slides by receiving a load greater than a predetermined torque and thus the sliding clutch transmits the driving power. As shown in FIG. 4, the guide flap 50 moves between the first guiding posture and the second guiding posture and is regulated not to rotate over the postures by abutting on the guide member or the like. Accordingly, after the guide flap 50 is in the first guiding posture or the second guiding posture, the sliding clutch slides by regulating the rotation of the guide flap 50 and the shaft on which the driven gear 182 is disposed can further rotate in the state where the guide flap 50 is maintained in the first guiding posture or the second guiding posture. The gear configuration from the transmission gear 180 to the driven gear 182 is not particularly limited, but the number of transmission gears or the diameters thereof may be properly changed depending on the distances from the transmission gear 180 to the driven gears 182.

Hereinafter, an image scanning operation of the image scanner 1 will be described.

The image scanner 1 may be used as the FBS or may employ the ADF 3. Since the FBS is not particularly related to the invention, detailed description thereof will be omitted. When the ADF 3 is used, the document cover 4 is closed with respect to the document placing table 2. The opening and closing of the document cover 4 is sensed by a sensor disposed in the document cover 4 and when the document cover 4 is closed, the ADF 3 is usable. A document Gn to be scanned is placed on the document input tray 30. The document Gn is placed on the document input tray 30 in a state where a scanning side (first side) is directed upward, that is, in a face-up state. The number of documents Gn may be one or more. For example, when a plurality of documents Gn having the same size are scanned, the documents are placed on the document input tray 30 to overlap with each other in a state where the first side of the first document G1 is directed upward, that is, in the face-up state.

When the command for starting the scanning operation is input to the image scanner 1, the motor 67 is driven to rotate the pickup roller 33, the separation roller 34, the feed rollers 35A, 35B, 35C, and 35D, the discharge roller 36, and the reversible roller 43 at predetermined times. The arm 29 is lowered and thus the pickup roller 33 is pressed on the document G1 on the document input tray 30. Then, the documents are separated sheet by sheet from the uppermost document G1 directly receiving the rotation power of pickup roller 33 and the separation roller 34 and are transferred to the document feed path 32. The fed document Gn is guided to the scanning position by the document feed path 32 and the image thereof is scanned by the image scanning unit 22 waiting below the scanning position. The document Gn of which the image has been scanned is unloaded onto the document discharge tray 31. In the image scanning operation, the feed path of the document Gn varies in a single-sided scanning and a double-sided scanning. It is determined depending on the single-sided scanning mode (single-sided scanning feeding mode) or the double-sided scanning mode (double-sided scanning feeding mode) set in advance before the command for starting the scanning operation is input whether a single side or both sides of the document Gn should be scanned. The input single-sided scanning mode or double-sided scanning mode is stored as feeding mode information in the RAM 63 of the control unit 60.

Figure 21:
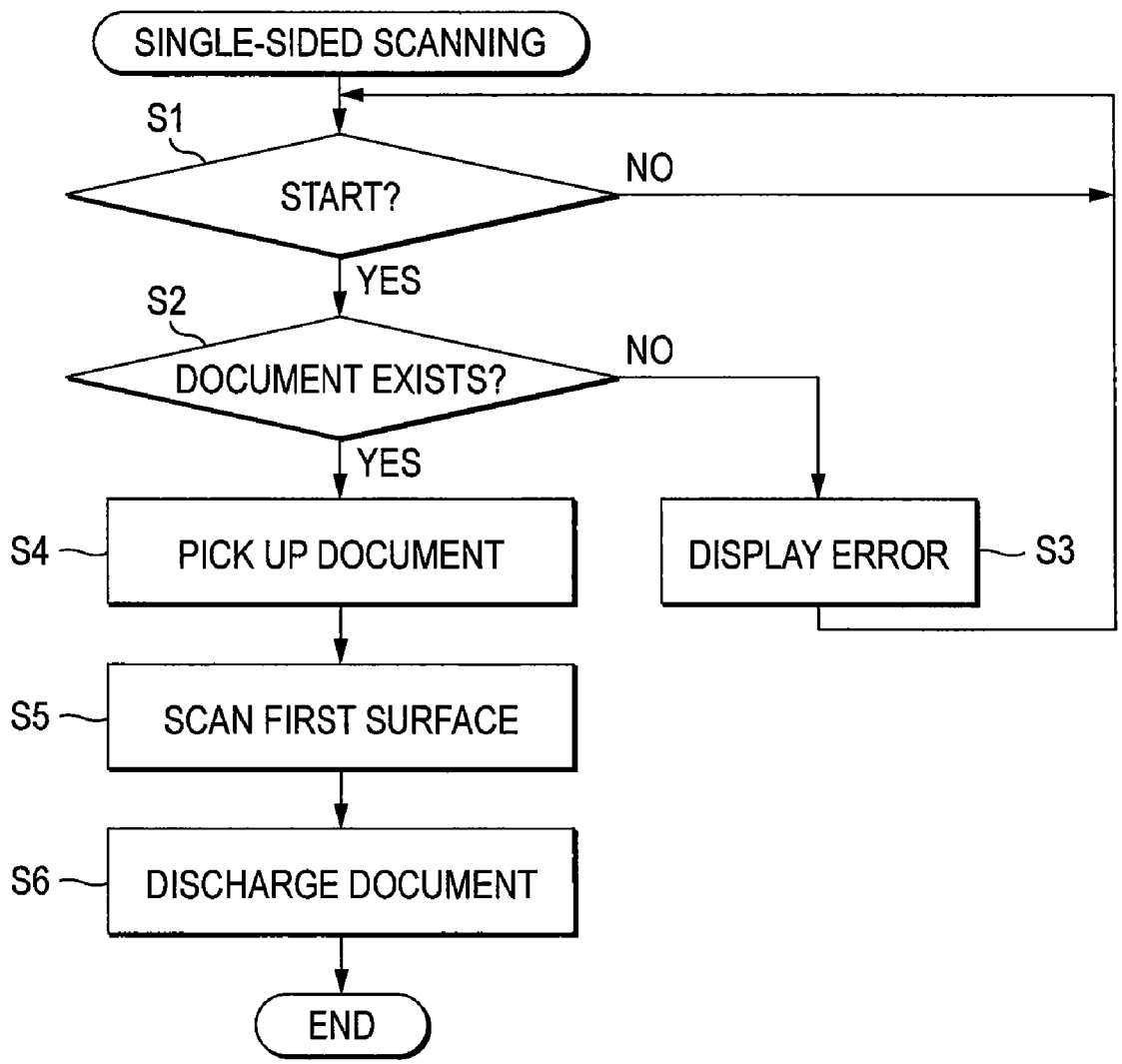
FIG. 21 is a flowchart illustrating an operation of a single-sided scanning mode.
Figure 22:
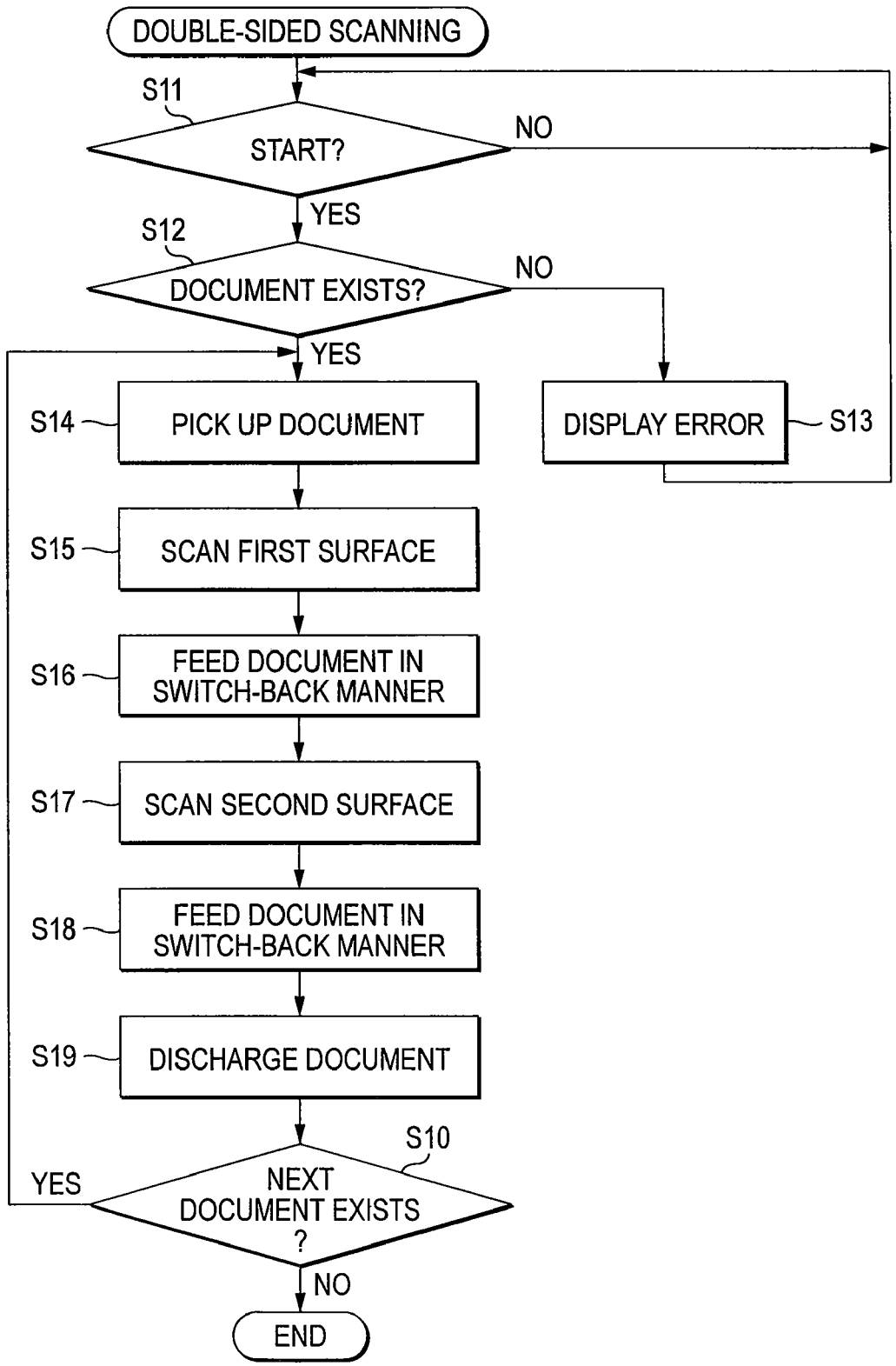
FIG. 22 is a flowchart illustrating an operation of a double-sided scanning mode.
Figure 23:
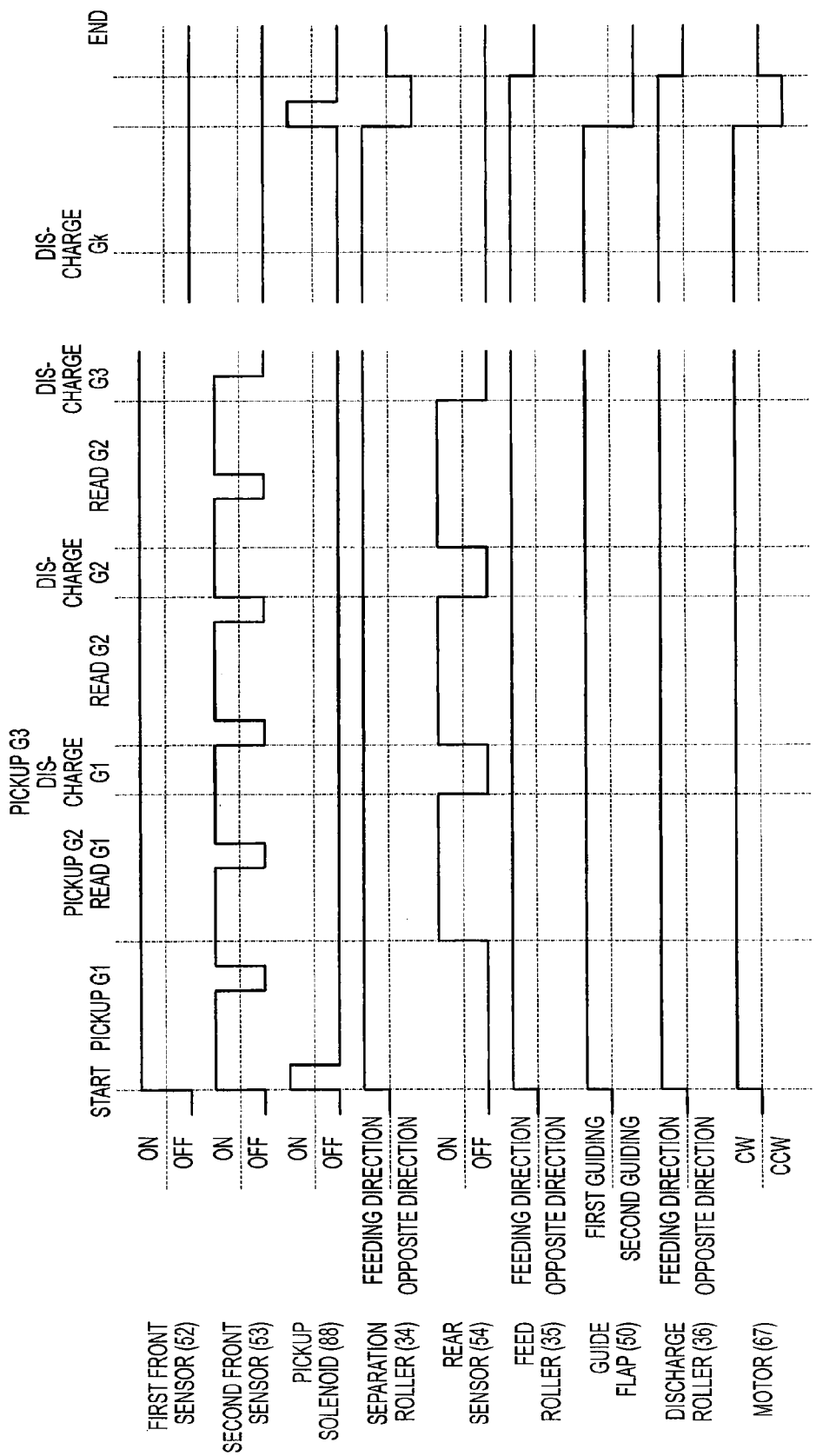
FIG. 23 is a time diagram illustrating the single-sided scanning mode.
Figure 24:
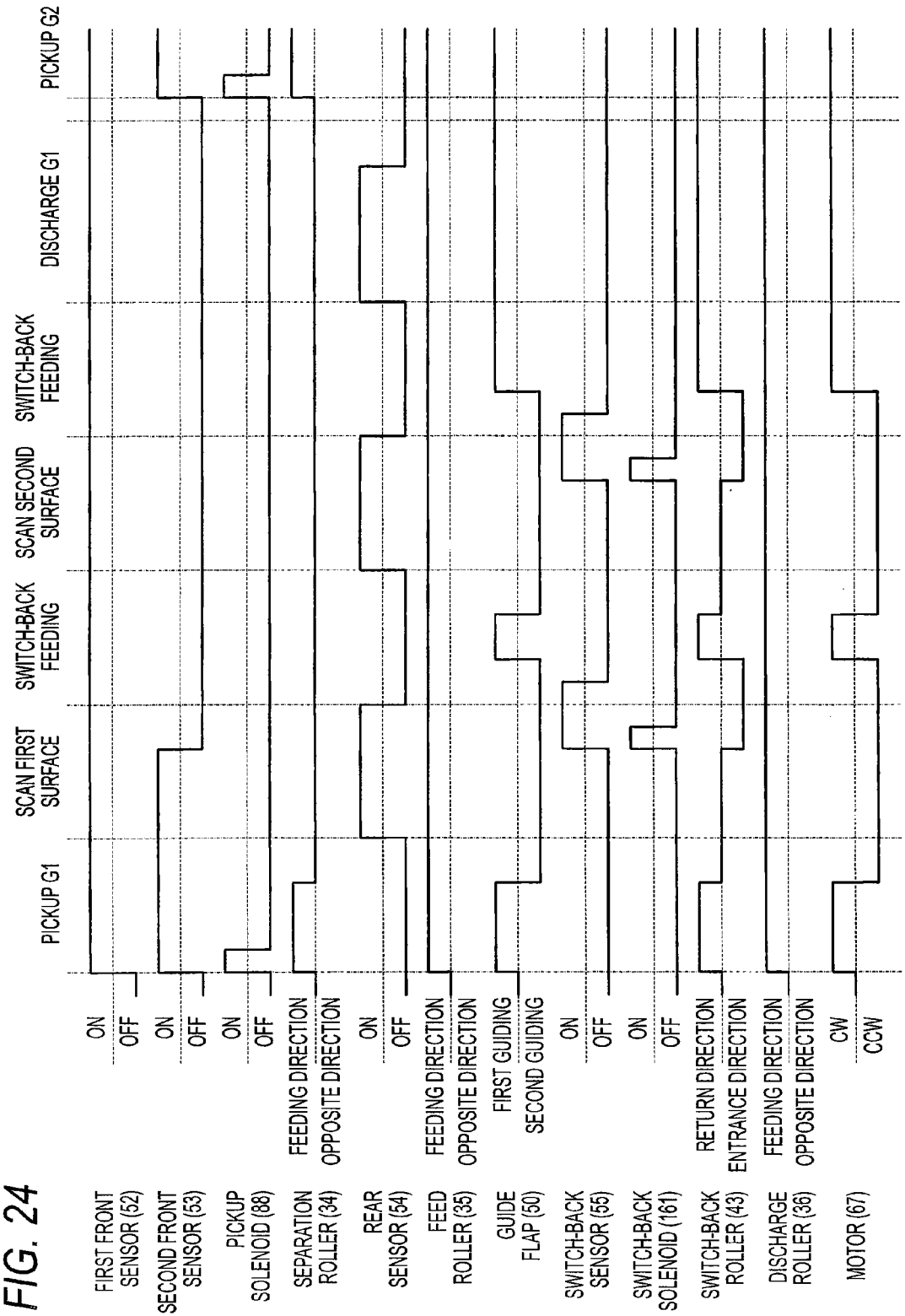
FIG. 24 is a time diagram illustrating the double-sided scanning mode.

FIG. 21 is a flowchart illustrating an operation of the image scanner 1 in the single-sided scanning mode. FIG. 22 is a flowchart an operation of the image scanner 1 in the double-sided scanning mode. FIG. 23 is a time chart illustrating the operation of the image scanner 1 in the single-sided scanning mode. FIG. 24 is a time chart illustrating the operation of the image scanner 1 in the single-sided scanning mode. FIGS. 25 to 30 are schematic diagrams illustrating feeding statuses of the document Gn in the single-sided scanning mode. FIGS. 31 to 37 are schematic diagram illustrating feeding statuses of the document Gn in the double-sided scanning mode. In the figures, the side indicated by "1" in the document Gn is the first side first scanned at the time of double-sided scanning, the side indicated by "2" is the second side later scanned, and the first side and the second side are front and back sides of the document.

Figure 25:
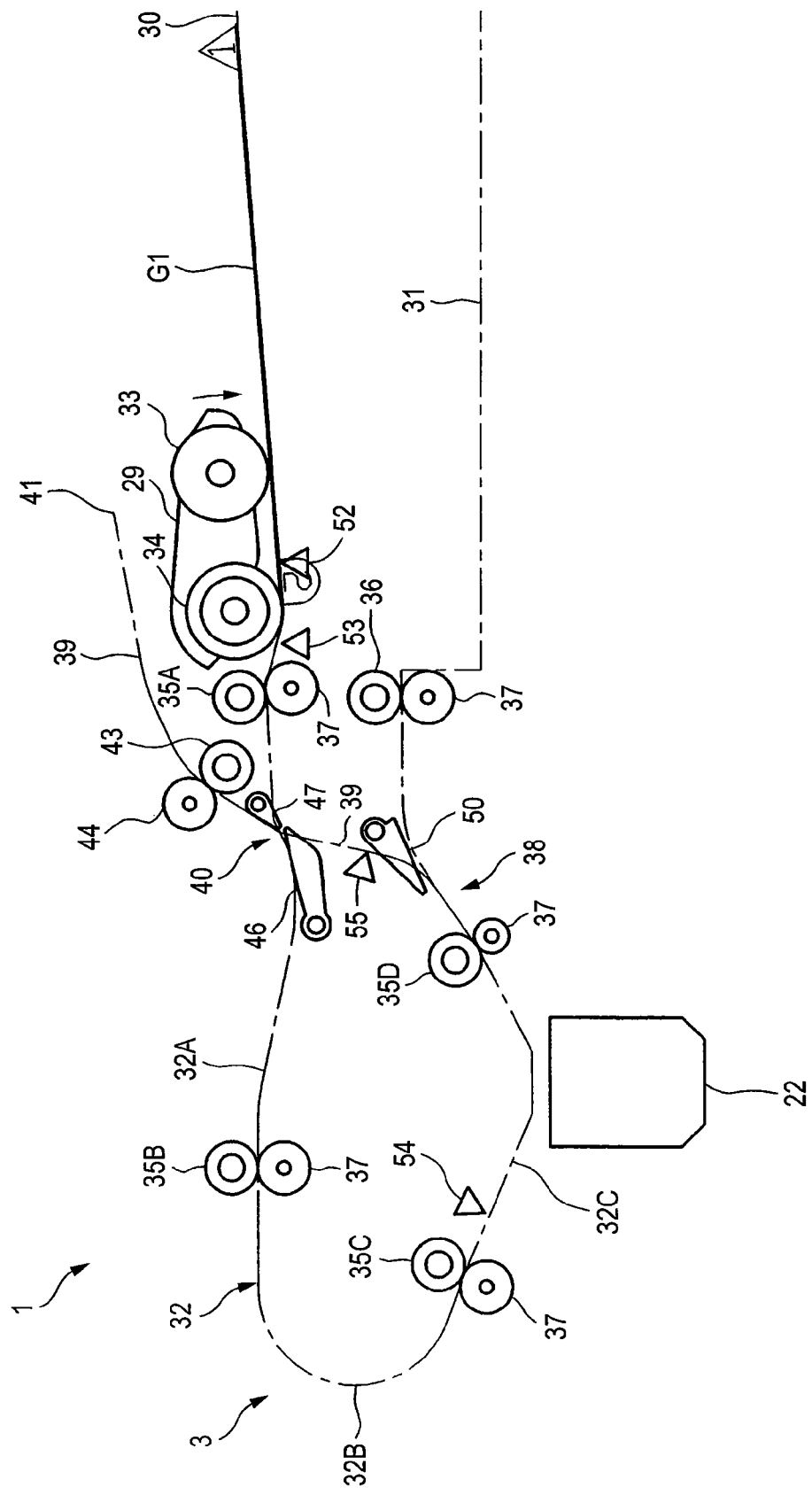
FIG. 25 is a schematic diagram illustrating an image scanning operation in the single-sided scanning mode.

Before starting the single-sided scanning operation, as shown in FIG. 25, the guide flap 50 is disposed in the first guiding posture, that is, at a position where the feed path at the connection position 38 is continuous from the scanning position side of the document feed path 32 to the document discharge tray 31 side. In the state where it dose not abut on the document Gn, the guide flap 46 is in the third guiding posture, that is, at a position where the feed path at the intersection position 40 is continuous from the document input tray 30 side to the scanning position side and in the state where it does not abut on the document Gn, the guide flap 47 is in the fifth guiding posture, that is, at a position where the feed path at the intersection position 40 is continuous from the end 41 side of the bidirectional feed path 39 to the scanning position side of the document feed path 32.

When a command for starting the scanning operation is input to the image scanner 1 (S1: Y), it is determined by the first front sensor 52 whether a document Gn is placed on the document input tray 30 (S2). When it is determined that no document Gn is placed on the document input tray 30 (S2: N), the control unit 60 displays "no document" on the display unit of the image scanner 1 (S3). When it is determined that a document Gn is placed on the document input tray 30, the motor 67 rotates in the CW direction. In addition, in this aspect, it is described that the motor 67 rotates in the CW direction at the time of staring the scanning operation. However, it is not limited whether the motor 67 is allowed to rotate in the CW direction or in the CCW direction and the rotation direction of the motor 67 is a relative concept.

The control unit 60 controls the motor 67 to rotated in the CW direction and turns on the pickup solenoid 88. Accordingly, as shown in FIGS. 7 and 8, the sun-and-planet gear 75 of the driving power transmission mechanism 70 disengages from the locking mechanism 86 and allows the planet gears 79 and 80 to revolve in the CCW direction on the basis of the rotation of the sun gear 76, thereby transmitting the driving power to the transmission gear 94. Accordingly, the driven gear 95 rotates in the CW direction. With the CW rotation of the driven gear 95, the driving power is transmitted to the arm 29 and thus the arm 29 is lowered. Accordingly, the pickup roller 33 is pressed on the document G1 on the document input tray 30. The CW rotation of the driven gear 95 is transmitted to the pickup roller 33 and the separation roller 34 through the driving power transmission mechanism 110 and the document G1 enters the document feed path 32 by allowing the pickup roller 33 and the separation roller 34 to rotate in the feeding direction. When a plurality of documents Gn is placed on the document input tray 30, the document G1 at the uppermost side and a document G2 right below may be loaded together, but the document G2 is hindered by the separation pad disposed at the opposed position of the separation roller 34. In this way, the pickup of the document G1 is performed (S4).

In the document feed path 32, the driving power of the motor 67 is transmitted to the feed rollers 35A, 35B, 35C, and 35D through the driving power transmission mechanism 120 and thus the rollers rotate in the feeding direction so as to feed the document Gn from the upstream side to the downstream side in the document feed path 32. The document G1 fed from the document input tray 30 to the document feed path 32 is nipped between the feed roller 35A and the pinch roller 37 and receives the rotary power, whereby the document is fed to the intersection position 40 through the document feed path 32. The second front sensor 53 is turned on by feeding the document G1 to the document feed path 32.

Figure 26:
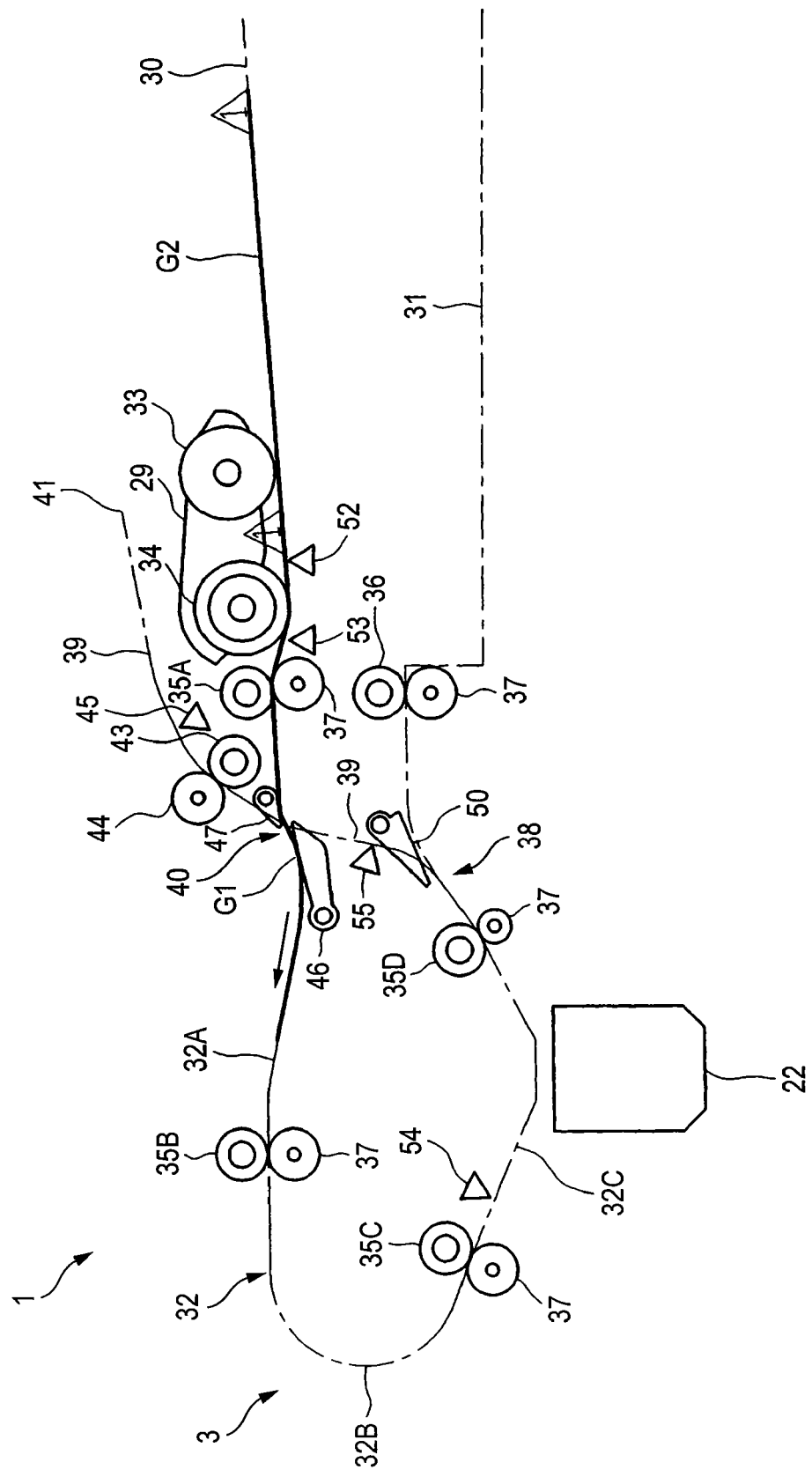
FIG. 26 is a schematic diagram illustrating an image scanning operation in the double-sided scanning mode.

Since the guide flap 47 deactivates the feed path to the intersection position 40 from the document input tray 30 in the document feed path 32, the document G1 fed to the intersection position 40 abuts on the guide flap 47. As shown in FIG. 26, the guide flap 47 is pressed to rotate by the document G1 fed in the document feed path 32 and is changed to the sixth guiding posture from the fifth guiding posture. Accordingly, the feed path from the document input tray 30 side to the scanning position side in the document feed path 32 is activated and the feed path to the end 41 side of the bidirectional feed path 39 is deactivated. The feed path to the connection position 38 of the bidirectional feed path 39 is deactivated by the guide flap 46. Accordingly, the document G1 reaching the intersection position 40 from the input tray 30 side in the document feed path 32 is guided to the guide flap 46 and the guide flap 47 and is fed to the scanning position side in the document feed path 32 without entering the bidirectional feed path 39.

Figure 27:
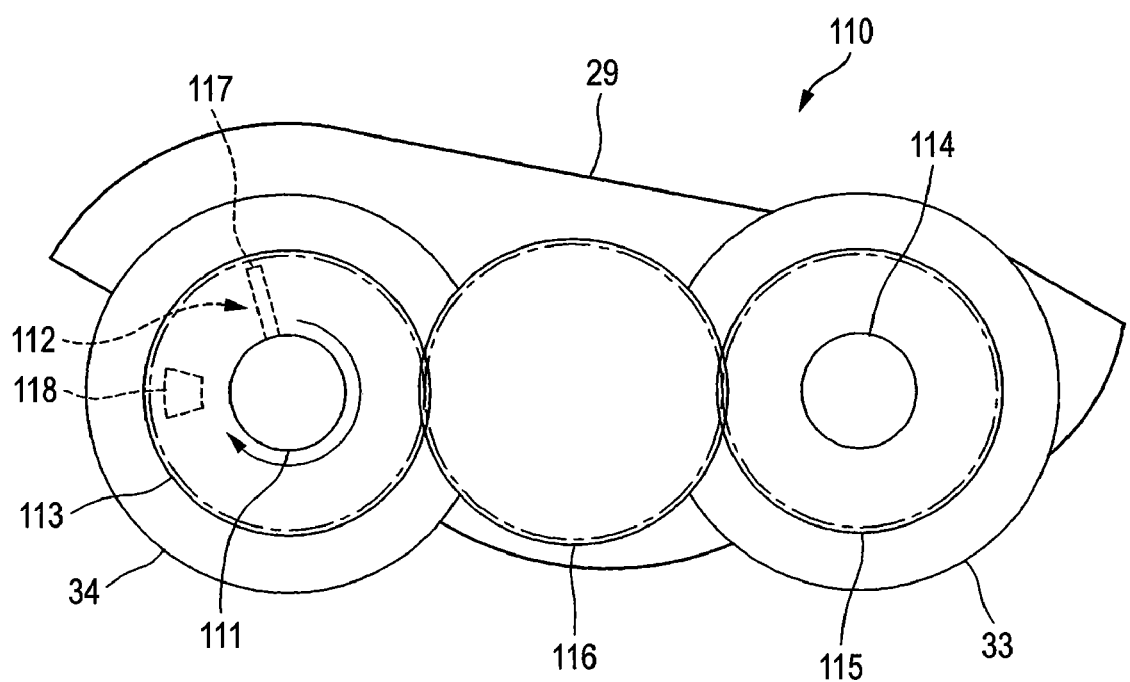
FIG. 27 is a diagram illustrating a state where a separation roller revolves.

The rotation speed of the feed rollers 35A, 35B, 35C, and 35D and the discharge roller 36 rotating with the driving power transmitted from the motor 67 through the driving power transmission mechanism 120 is set higher than the rotation speed of the separation roller 34 rotating with the driving power transmitted from the motor 67 through the driving power transmission mechanisms 70 and 110. The document G1 fed to the document feed path 32 from the document input tray 30 is nipped and fed by the feed roller 35A and the pinch roller 37 while being pressed on the separation roller 34, as shown in FIG. 26. As shown in FIG. 12, the separation 34 is allowed to rotate in the feeding direction by about one turn by the one-turn clutch 112. Accordingly, as shown in FIG. 27, the separation roller 34 pressed on the document G1 rotates with the document G1 fed at a predetermined speed by the feed roller 35A and rotates so as to advance in the feeding direction from the shaft 111.

Figure 28:
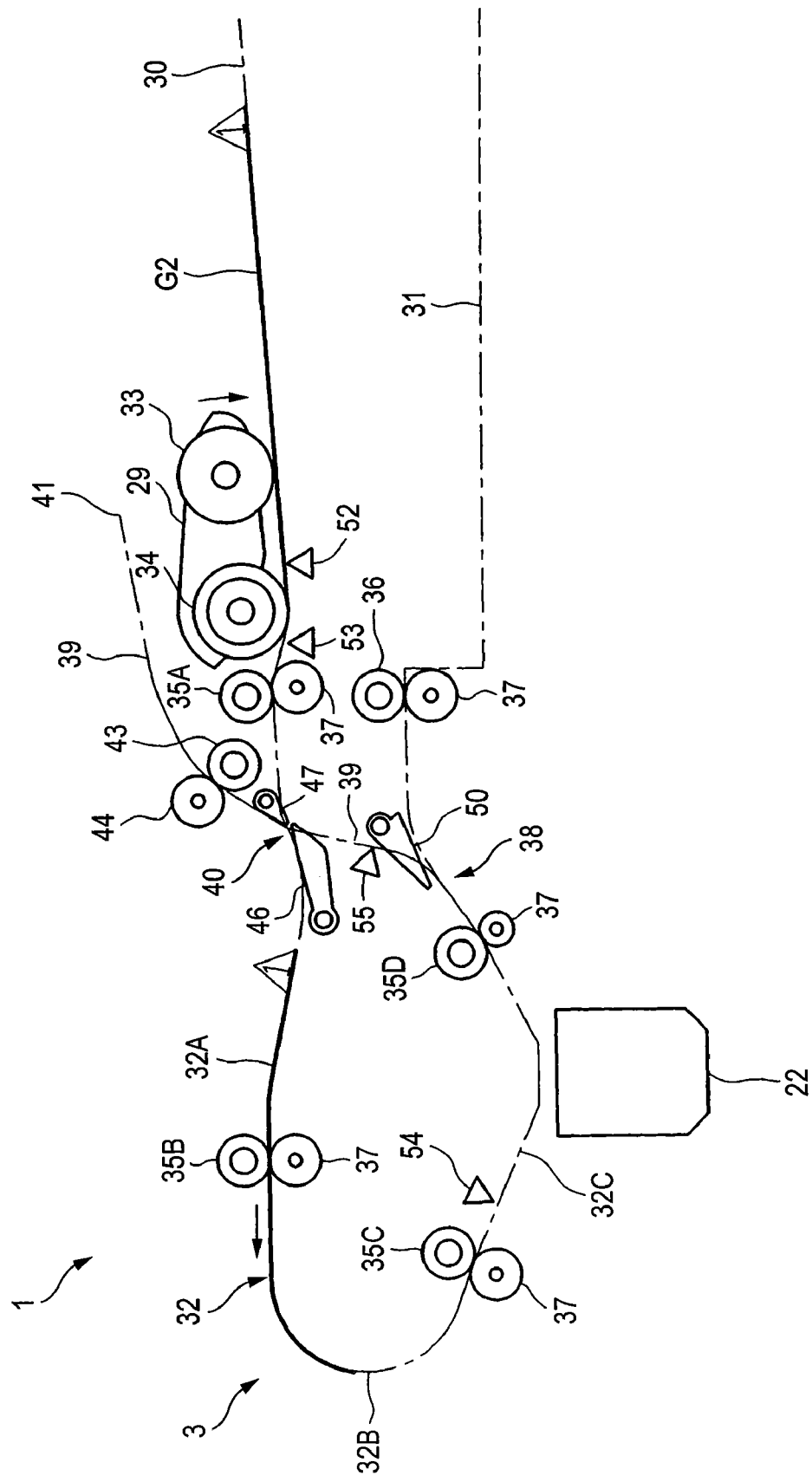
FIG. 28 is a schematic diagram illustrating an image scanning operation in the single-sided scanning mode.
Figure 29:
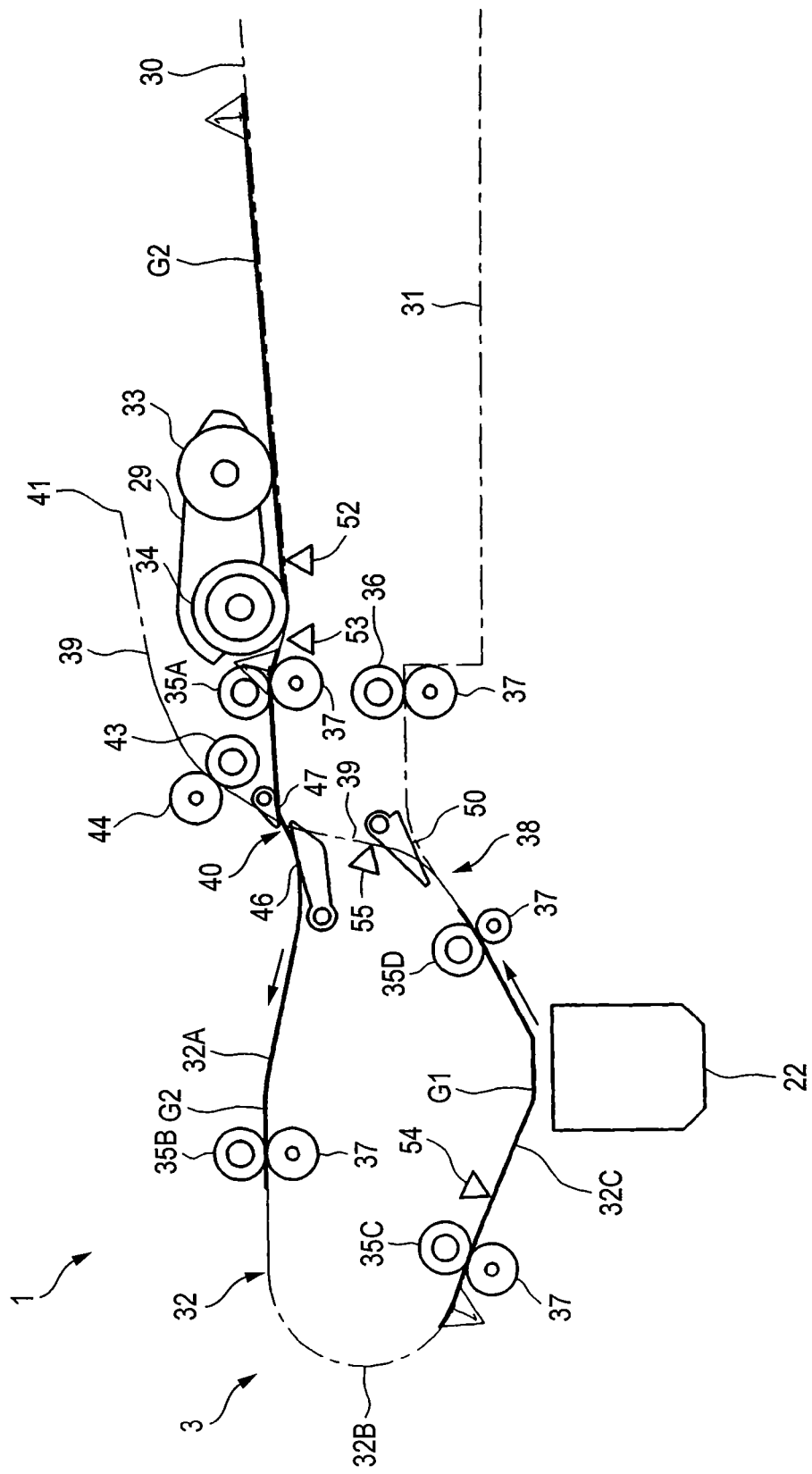
FIG. 29 is a schematic diagram illustrating an image scanning operation in the single-sided scanning mode.

As shown in FIG. 28, by completely feeding the first sheet document G1 to the document feed path 32 from the document input tray 30, the document G1 is separated from the separation roller 34. Accordingly, the rotation of the separation roller 34 rotating with the document G1 is stopped. As shown in FIG. 27, the locking piece 118 of the separation roller 34 advances in the feeding direction to the pin 117 of the shaft 111 by means of the rotation of the separation roller 34. The driving power is transmitted to the shaft 111 from the motor 67, the separation roller 34 does not rotate until the pin 117 rotates up to the position for engaging with the locking piece 118. Accordingly, the second sheet of document G2 pressed on the separation roller 34 is not feed to the document feed path 32 until the separation roller 34 rotates. The document G1 fed to the document feed path 32 is fed along the document feed path 32 by means of the rotation of the feed rollers 35A and 35B. Accordingly, as shown in FIG. 28, a predetermined gap is formed in the feeding direction between the first sheet of document G1 and the second sheet of document G2 When the shaft 111 rotates until the pin 117 engages with the locking piece 118, the rotation of the shaft 111 is transmitted to the separation roller 34 through the pin 117 and the locking piece 118 and thus the separation roller 34 rotates in the feeding direction. Therefore, as shown in FIG. 29, the second sheet of document G2 is fed to the document feed path 32. In this way, it is possible to continuously the documents Gn to the document feed path 32 at a high speed and with a predetermined gap, without driving the pickup solenoid 888 for each document Gn. The second front sensor 53 is turned off by transmitting the trailing end of the document G1 as shown in FIG. 28 and then is turned on by transmitting the leading end of the document G2 as shown in FIG. 29.

As shown in FIG. 29, the document G1 is fed to be inverted downwardly by the curved portion 32B of the document feed path 32 and the rear sensor 54 detects the leading end in the feeding direction of the document G1 and thus is turned on. The leading end in the feeding direction of the document G1 reaches the scanning position in a predetermined time after it is sensed by the rear sensor 54. When the leading end in the feeding direction of the document G1 reaches the scanning position, the control unit 60 activates the image scanning unit 22 to scan the image of the document G1 (S5). The document G1 passes through the scanning position in a state where the first side thereof is opposed to the image scanning unit 22 and the image on the first side of the document G1 is scanned by the image scanning unit 22. The rear sensor 54 is turned off when it senses the trailing end in the feeding direction of the document G1. The control unit 60 ends the image scanning operation of the document G1 using the image scanning unit 22 in a predetermined time after the rear sensor 54 is turned off.

Figure 30:
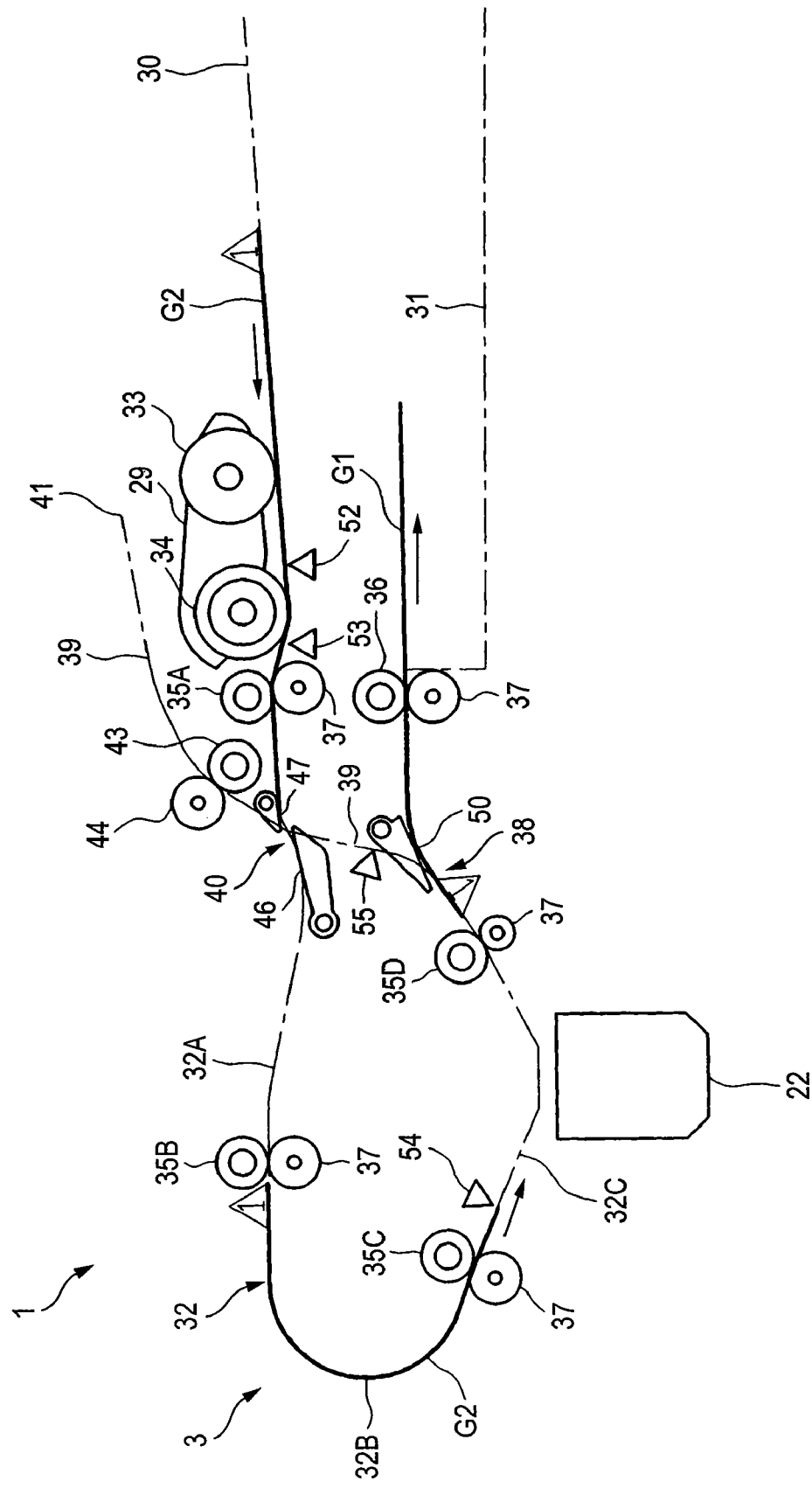
FIG. 30 is a schematic diagram illustrating an image scanning operation in the single-sided scanning mode.

Since the motor 67 rotates in the CW direction, as shown in FIG. 30, the guide flap 50 maintains the first guiding posture. The guide flap 50 guides the document G1 at the connection position 38 to the document discharge tray 31 side in the document feed path 32. The discharge roller 36 and the pinch roller 37 nip and discharge the document G1 to the document discharge tray 31 (S6). When the rear sensor 54 is turned on by sensing the leading end in the feeding direction of the second sheet of document G2, the control unit 60 activates the image scanning unit 22 in a predetermined time to scan the image of the document G2. By allowing the separation roller 34 having been stopped for a predetermined time after it is rotated by the document G2, the third sheet of document G3 is fed to the document feed path 32. By repeating this operation, the ADF 3 sequentially feeds the documents G1, G2, G3, . . . on the document input tray 30 to the document feed path 32, allows the image scanning unit 22 to scan the images of the documents G1, G2, G3, . . . , and then sequentially discharges the scanned documents G1, G2, G3, . . . to the document discharge tray 31.

As shown in FIG. 23, after the final document Gk placed on the document input tray 30 is discharged from the document feed path 32, the control unit 60 switches the rotation of the motor 67 to the CW rotation to the CCW rotation and turns on the pickup solenoid 88. It is determined whether the document Gk place on the document input tray 30 is the final document or not, depending on the on/Off state of the first front sensor 52 when the second front sensor 53 is turned off by sensing the trailing end of the document Gk. When the first front sensor 52 is in the of Off state, it is determined that the document Gk is the final document placed on the document input tray 30 and when the first front sensor is in the On state, it is determined that a next document exist on the document input tray 30. By switching the rotation of the motor 67 from the CW rotation to the CCW rotation and turning on the pickup solenoid 88, as shown in FIG. 11, the driven gear 95 rotates in the CCW direction with the driving power transmitted from the sun-and-planet gear 75 and the shaft 111 rotates in a direction opposite to the feeding direction. The rotation of the shaft 111 is transmitted to the arm 29 and the arm 29 is raised, thereby separating the pickup roller 33 from the guide surface of the document feed path 32. Accordingly, the document Gn to be scanned next time can be inserted until it abuts on the separation roller 34 through the lower side of the pickup roller 33. Thereafter, the control unit 60 stops the motor 67 and the image scanning operation in the single-sided scanning mode is ended.

Next, a double-sided scanning operation will be described. Before feeding the document Gn, as shown in FIG. 25 for describing the single-sided scanning mode, the guide flap 50 is in the first guiding posture, that is, at a position where the feed path at the connection position 38 is continuous from the scanning position side of the document feed path 32 to the document discharge tray 31 side. The guide flap 46 is in the third guiding posture, that is, at a position where the feed path at the intersection position 40 is continuous from the document input tray 30 side in the document feed path 32 to the scanning position side and the guide flap 47 is in the fifth guiding posture, that is, at a position where the feed path at the intersection position 40 is continuous from the end 41 side of the bidirectional feed path 39 to the scanning position side of the document feed path 32.

When a command for starting the scanning operation is input to the image scanner 1 (S11), it is determined by the first front sensor 52 whether a document Gn is placed on the document input tray 30 (S12). When it is determined that no document Gn is placed on the document input tray 30 (S12: N), the control unit 60 displays "no document" on the display unit of the image scanner 1 (S13). When it is determined that a document Gn is placed on the document input tray 30, the motor 67 rotates in the CW direction. The command for the CW rotation of the motor 67 is stared as the rotation direction information in the RAM 63.

The control unit 60 controls the motor 67 to rotated in the CW direction and turns on the pickup solenoid 88. Accordingly, as shown in FIGS. 7 and 8, the sun-and-planet gear 75 of the driving power transmission mechanism 70 disengages from the locking mechanism 86 and allows the planet gears 79 and 80 to revolve in the CCW direction on the basis of the rotation of the sun gear 76, thereby transmitting the driving power to the transmission gear 94. Accordingly, the driven gear 95 rotates in the CW direction. With the CW rotation of the driven gear 95, the driving power is transmitted to the arm 29 and thus the arm 29 is lowered. Accordingly, the pickup roller 33 is pressed on the document G1 on the document input tray 30. The CW rotation of the driven gear 95 is transmitted to the pickup roller 33 and the separation roller 34 through the driving power transmission mechanism 110 and the document G1 enters the document feed path 32 by allowing the pickup roller 33 and the separation roller 34 to rotate in the feeding direction. When a plurality of documents Gn is placed on the document input tray 30, the document G1 at the uppermost side and a document G2 right below may be loaded together, but the document G2 is hindered by the separation pad disposed at the opposed position of the separation roller 34. In this way, the pickup of the document G1 is performed (S14).

In the document feed path 32, the driving power of the motor 67 is transmitted to the feed rollers 35A, 35B, 35C, and 35D through the driving power transmission mechanism 120 and thus the rollers rotate in the feeding direction so as to feed the document Gn from the upstream side to the downstream side in the document feed path 32. The document G1 fed from the document input tray 30 to the document feed path 32 is nipped between the feed roller 35A and the pinch roller 37 and receives the rotary power, whereby the document is fed to the intersection position 40 through the document feed path 32. The second front sensor 53 is turned on by feeding the document G1 to the document feed path 32.

Since the guide flap 47 deactivates the feed path to the intersection position 40 from the document input tray 30 in the document feed path 32, the document G1 fed to the intersection position 40 abuts on the guide flap 47. As shown in FIG. 26 for describing the single-sided scanning mode, the guide flap 47 is pressed to rotate by the document G1 fed in the document feed path 32 and is changed to the sixth guiding posture from the fifth guiding posture. Accordingly, the feed path from the document input tray 30 side to the scanning position side in the document feed path 32 is activated and the feed path to the end 41 side of the bidirectional feed path 39 is deactivated. The feed path to the connection position 38 of the bidirectional feed path 39 is deactivated by the guide flap 46. Accordingly, the document G1 reaching the intersection position 40 from the input tray 30 side in the document feed path 32 is guided to the guide flap 46 and the guide flap 47 and is fed to the scanning position side in the document feed path 32 without entering the bidirectional feed path 39.

As described in the single-sided scanning mode, since the circumferential speeds of the feed rollers 35A, 35B, 35C, and 35D and the discharge roller 36 are higher than the circumferential speed of the separation roller 34, the separation roller 34 idly rotates by the document G1 nipped and fed by the feed roller 35A and the pinch roller 37 while pressing the separation roller 34. Accordingly, a predetermined gap is generated in the feeding direction between the first sheet of document G1 and the second sheet of document G2. At the time of feeding the document G2, that is, before the idly rotating separation roller 34 rotates again, the control unit 60 switches the rotation of the motor 67 from the CW rotation to the CCW rotation.

In order to change the rotation of the motor 67 from the CW rotation to the CCW rotation, the CPU 61 of the control unit 60 outputs a command for stop to the motor 67 and then outputs the command for CCW rotation. The history of the command for stop and the command for CCW rotation along with the previously output command for CW rotation are stored as the rotation direction information in the RAM 63. The control unit 60 can determine an elapsed time after the second front sensor 53 is turned on by sensing the leading end of the document G1 or turned off by sensing the trailing end of the document G1, or a time when the rotation of the motor 67 is changed on the basis of the amount of rotation of the motor 67.

When the rotation of the motor 67 is switched from the CW rotation to the CCW rotation, as shown in FIG. 10, the support arm 78 of the sun-and-planet gear 75 is locked by the locking mechanism 86 and is maintained in the disengagement posture. Accordingly, the transmission of the driving power to the driven gear 95 is cut off and thus the shaft 111 pivotally supporting the separation roller 34 is stopped.

Figure 31:
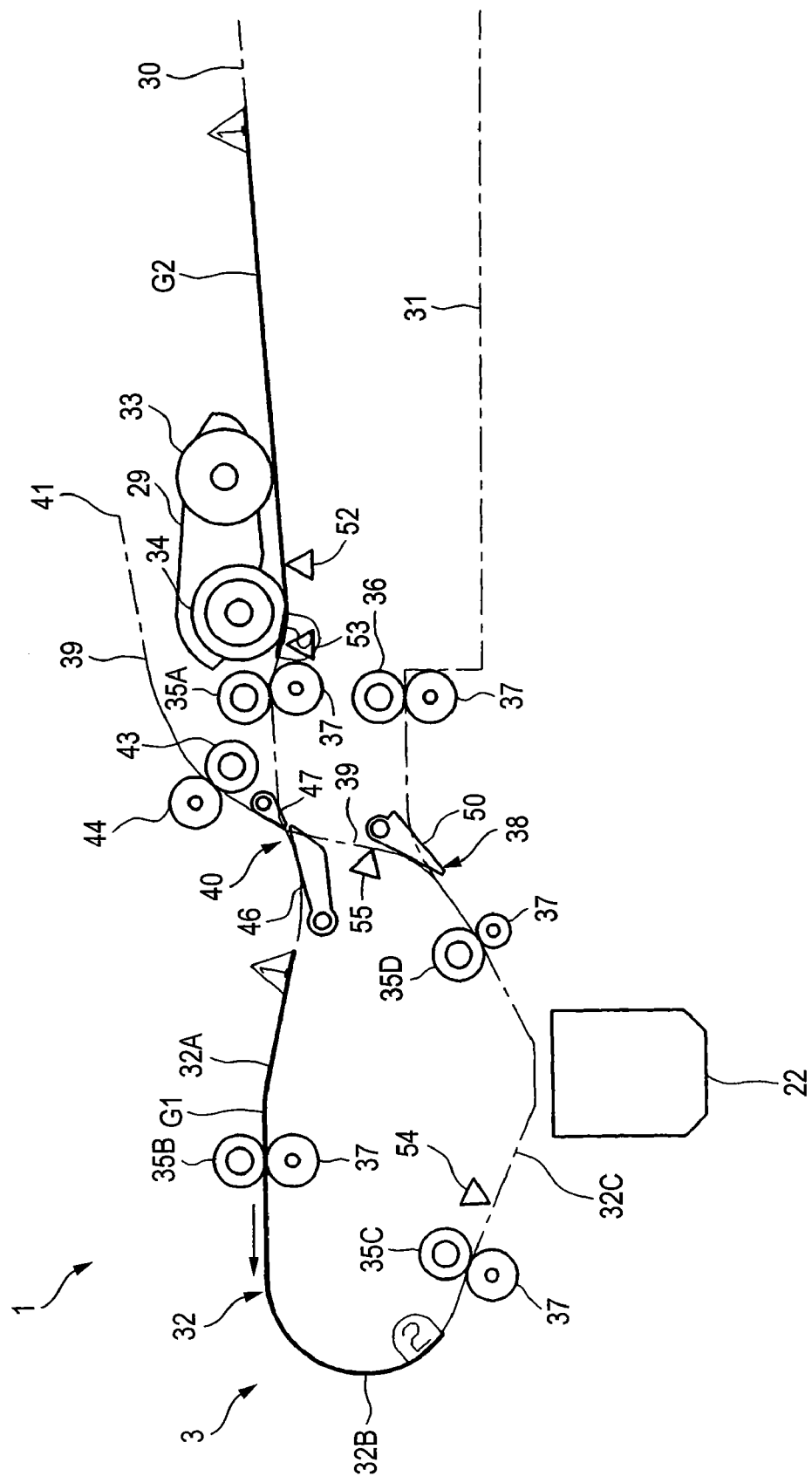
FIG. 31 is a schematic diagram illustrating an image scanning operation in the double-sided scanning mode.

As shown in FIGS. 13 to 15, whether the rotation of the motor 67 is the CW rotation or the CCW rotation, the driving power of the feeding direction is transmitted to the feed rollers 35A, 35B, 35C, and 35D and the discharge roller 36. Accordingly, as shown in FIG. 31, even after the rotation of the motor 67 is switched, the document G1 is fed to the scanning position along the document feed path 32 by the feed rollers 35B and the like.

In the driving power transmission mechanism 150, the driving power cutting mechanism 151 maintains the sun-and-planet gear 153 in the disengagement posture by switching the rotation of the motor 67 from the CW rotation to the CCW rotation, thereby cutting off the transmission of the driving power to the driven gear 168. Accordingly, the reversible roller 43 is stopped. The driving power transmission mechanism 170 changes the posture of the guide flap 50 to the second guiding posture by switching the rotation of the motor 67 from the CW rotation to the CCW rotation. By allowing the trailing end of the document G1 to pass through the intersection position 40, the guide flap 47 is returned to the fifth guiding posture from the sixth guiding posture.

Figure 32:
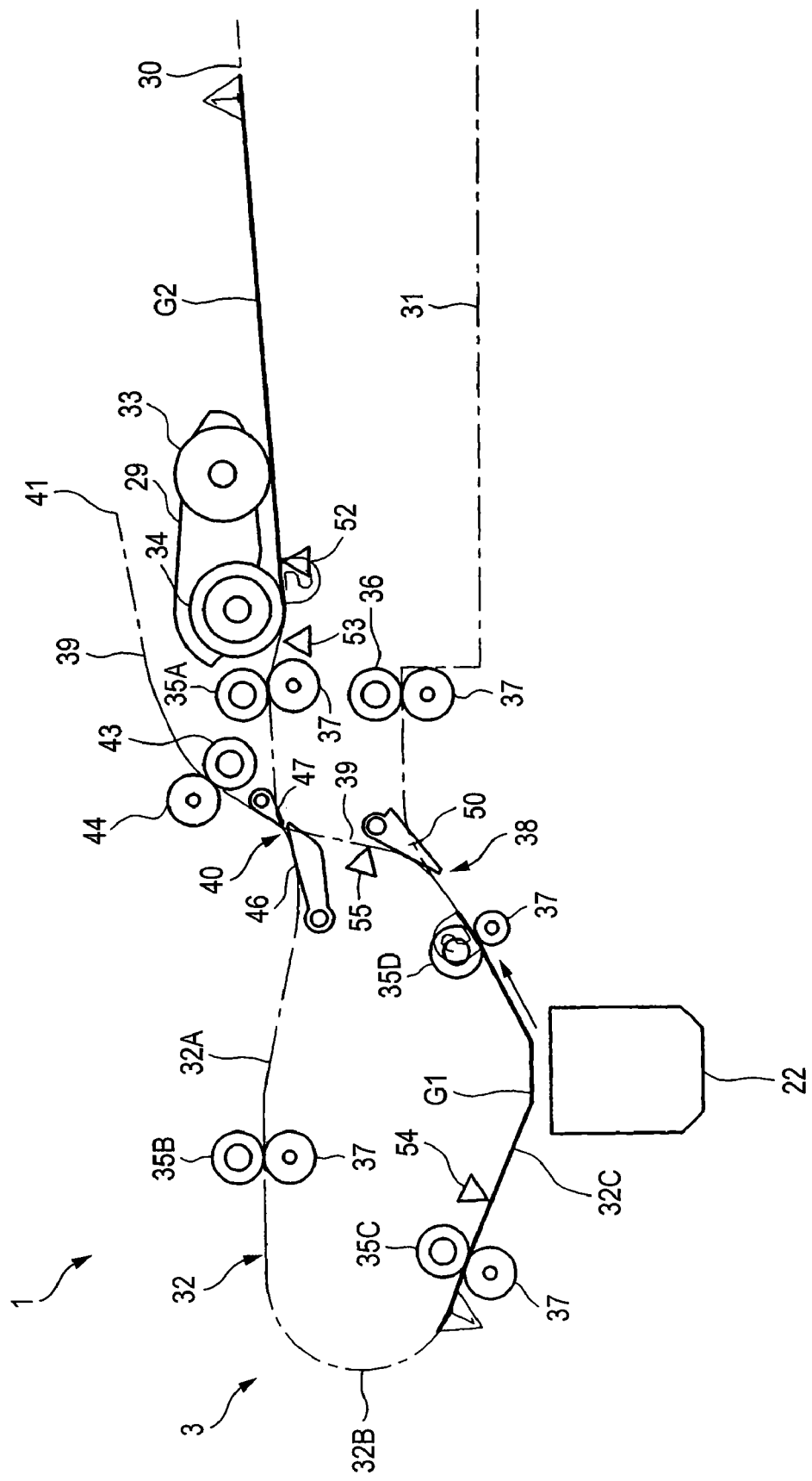
FIG. 32 is a schematic diagram illustrating an image scanning operation in the double-sided scanning mode.

As shown in FIG. 32, the document G1 is fed to be inverted downwardly by the curved portion 32B of the document feed path 32 and the rear sensor 54 is turned on by sensing the leading end in the feeding direction of the document G1. The history of the On/Off state of the rear sensor 54 is stored as the scanning status information in the RAM 63 of the control unit 60. The leading end of the document G1 reaches the scanning position in a predetermined time after it is sensed by the rear sensor 54. When the leading end in the feeding direction of the document G1 reaches the scanning position, the control unit 60 activates the image scanning unit 22 to scan the image of the document G1 (S15). The document G1 passes through the scanning position in a state where the first side thereof is opposed to the image scanning unit 22 and the image on the first side of the document G1 is scanned by the image scanning unit 22. The rear sensor 54 is turned off when it senses the trailing end in the feeding direction of the document G1. The control unit 60 ends the image scanning operation of the first side of the document G1 using the image scanning unit 22 in a predetermined time after the rear sensor 54 is turned off. The image data of the first side of the document G1 scanned by the image scanning unit 22 are stored in a predetermined area of the RAM 63. The control unit 60 stores the image data in the RAM 63 and stores a variable indicating that the image scanning of the first side is ended in a predetermined area of the RAM 63. The variable indicates "scanning end of the first side" and "scanning end of the second side" and is used as the scanning status information.

Figure 33:
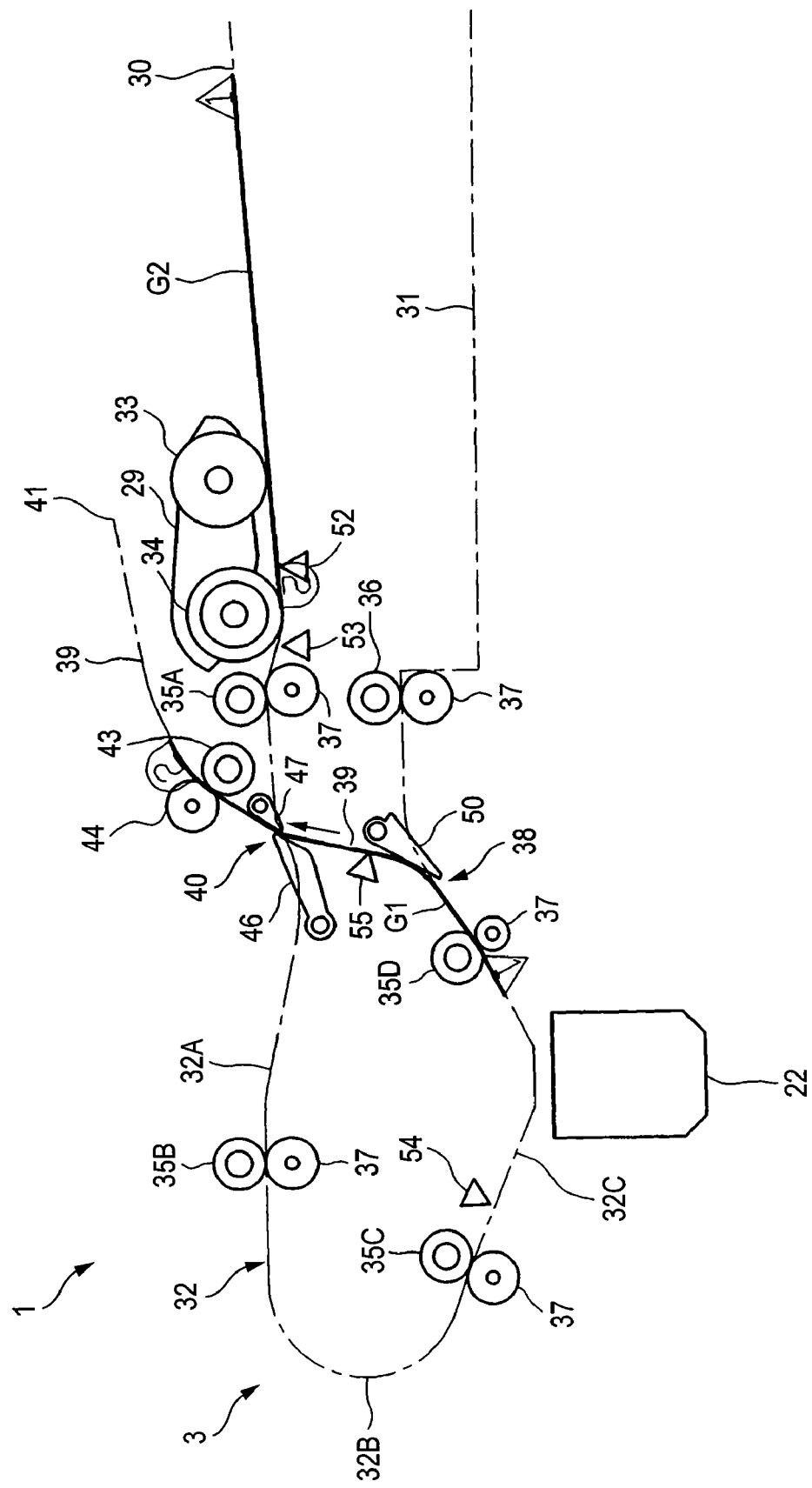
FIG. 33 is a schematic diagram illustrating an image scanning operation in the double-sided scanning mode.

As shown in FIG. 33, the leading end in the feeding direction of the document G1 of which the first side is scanned is guided by the guide flap 50 to enter the bidirectional feed path 39 from the document feed path 32 through the connection position 38. The switch-back sensor 55 is turned on by sensing the leading end in the feeding direction of the document G1 entering the bidirectional feed path 39. The history of the On/Off state of the switch-back sensor 55 is stored as the scanning status information in the RAM 63 of the control unit 60. In response to the On state of the switch-back sensor 55, the control unit 60 turns on the switch-back solenoid 161. Accordingly, when the document G1 enters the bidirectional feed path 39, the locking of the support arm 156 of the sun-and-planet gear 153 is unlocked by the driving power cutting mechanism 151 and the sun-and-planet gear 153 to which the driving power of the CCW rotation is transmitted from the motor 67 transmits the driving power of the CW rotation to the driven gear 168 as shown in FIG. 18, thereby allowing the reversible roller 43 to rotate in the entrance direction.

Since the guide flap 46 deactivates the feed path from the bidirectional feed path 39 to the intersection position 40, the leading end in the feeding direction of the document G1 entering the bidirectional feed path 39 abuts on the guide flap 46 when it reaches the intersection position 40. As shown in FIG. 33, the guide flap 46 rotates to be pressed upwardly by the leading end in the feeding direction of the document G1 fed in the bidirectional feed path 39 and is changed to the fourth guiding posture from the third guiding posture. Accordingly, the feed path from the connection position 38 side of the bidirectional feed path 39 to the end 41 side of the bidirectional feed path 39 is activated and the feed path to the scanning position of the document feed path 32 is deactivated. The feed path to the document input tray 30 side of the document feed path 32 is previously deactivated by the guide flap 47. Accordingly, the leading end in the feeding direction of the document G1 reaching the intersection position 40 from the connection position 38 side of the bidirectional feed path 39 is guided by the guide flap 46 and the guide flap 47 and is fed to the bidirectional feed path 39 without entering the document feed path 32. The leading end in the feeding direction of the document G1 is nipped by the reversible roller 43 and the pinch roller 44 and is fed to the end 41 side of the bidirectional feed path 39 with the rotation in the entrance direction of the reversible roller 43.

Figure 34:
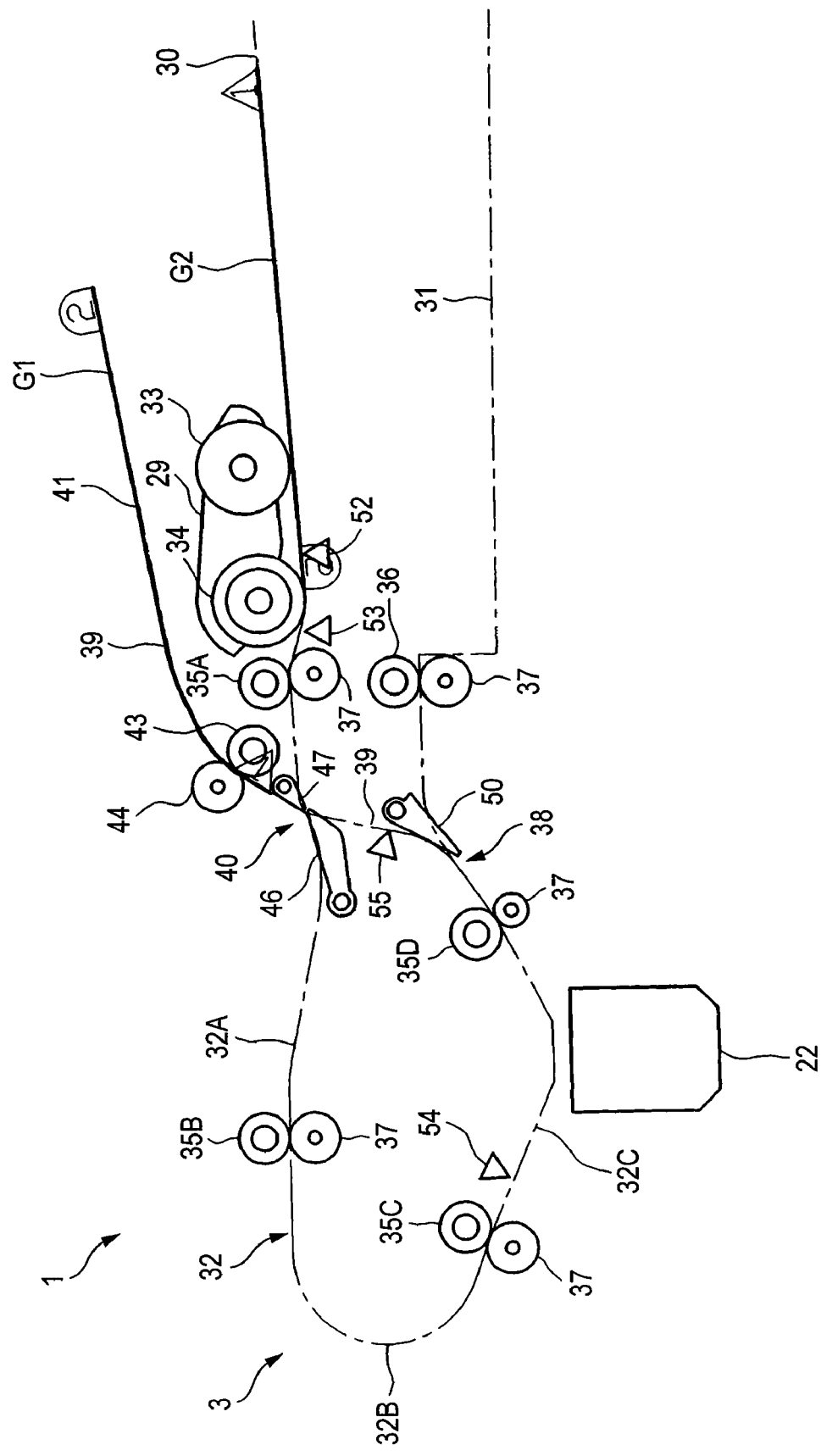
FIG. 34 is a schematic diagram illustrating an image scanning operation in the double-sided scanning mode.

As shown in FIG. 34, after the trailing end in the feeding direction of the document G1 completely enters the end 41 side through the intersection position 40 of the bidirectional feed path 39, the control unit 60 switches the rotation of the motor 67 from the CCW rotation to the CW rotation. In order to switch the rotation of the motor 67 from the CCW rotation to the CW rotation, the CPU 61 of the control unit 60 outputs the command for stop to the motor 67 and then outputs the command for CW rotation. The command for stop and the command for CW rotation along with the command previously output for driving the motor 67 are stored as the rotation direction information in the RAM 63.

The switch-back sensor 55 is turned off by sensing the trailing end of the document G1 fed along the bidirectional feed path 39 and then the trailing end of the document G1 passes through the intersection position 40 in a predetermined time. Accordingly, the control unit 60 determines that the trailing end in the feeding direction of the document G1 completely enters the end side 41 through the intersection position 40 of the bidirectional feed path 39 on the basis of the detection signal of the switch-back sensor 55 and the feeding distance or the feeding time of the feed roller 35D and the reversible roller 43. By switching the rotation of the motor 67, the document G1 nipped by the reversible roller 43 and the pinch roller 44 so as to protrude from the end 41 is returned to the intersection position 40.

When a part of the document G1 protrudes from the end 41 of the bidirectional feed path 39 to the outside of the ADF 3, the protruding part of the document G1 is supported by the document supporting portion 42. As the document G1 becomes more apart from the guide flap 46 through the intersection position 40, the guide flap 46 rotates downwardly and is returned to the third guiding posture.

By switching the rotation of the motor 67 from the CCW rotation to the CW rotation, as shown in FIG. 17, the sun-and-planet gear 153 of the driving power transmission mechanism 150 allows the support arm 156 to rotate in the CW direction to transmit the driving power of the motor 67 to the driven gear 168, thereby allowing the driven gear 168 to rotate in the CCW direction. Accordingly, the reversible roller 43 rotates in the return direction. With this rotation, the document G1 is fed in a switch-back manner so as to be returned to the intersection position 40 through the bidirectional feed path 39 (S16).

As shown in FIGS. 13 to 15, whether the rotation of the motor 67 is the CW rotation or the CCW rotation, the driving power transmission mechanism 120 transmits the driving power of the feeding direction to the feed rollers 35A, 35B, 35C, and 35D and the discharge roller 36. Accordingly, as shown in FIG. 31, even after the rotation of the motor 67 is switched, the feed rollers 35A, 35B, 35C, and 35D and the discharge roller 36 rotates in the feeding direction.

In the driving power transmission mechanism 70, the locking mechanism 86 maintains the sun-and-planet gear 153 in the disengagement posture by switching the rotation of the motor 67 from the CW rotation to the CCW rotation, thereby cutting off the transmission of the driving power to the driven gear 95. Thereafter, since the pickup solenoid 88 is not activated, the sun-and-planet gear 75 is maintained in the disengagement posture in spite of the CW rotation of the motor 67. The driving power transmission mechanism 170 switches the posture of the guide flap 50 to the first guiding posture by switching the rotation of the motor 67 from the CCW rotation to the CW rotation.

Figure 35:
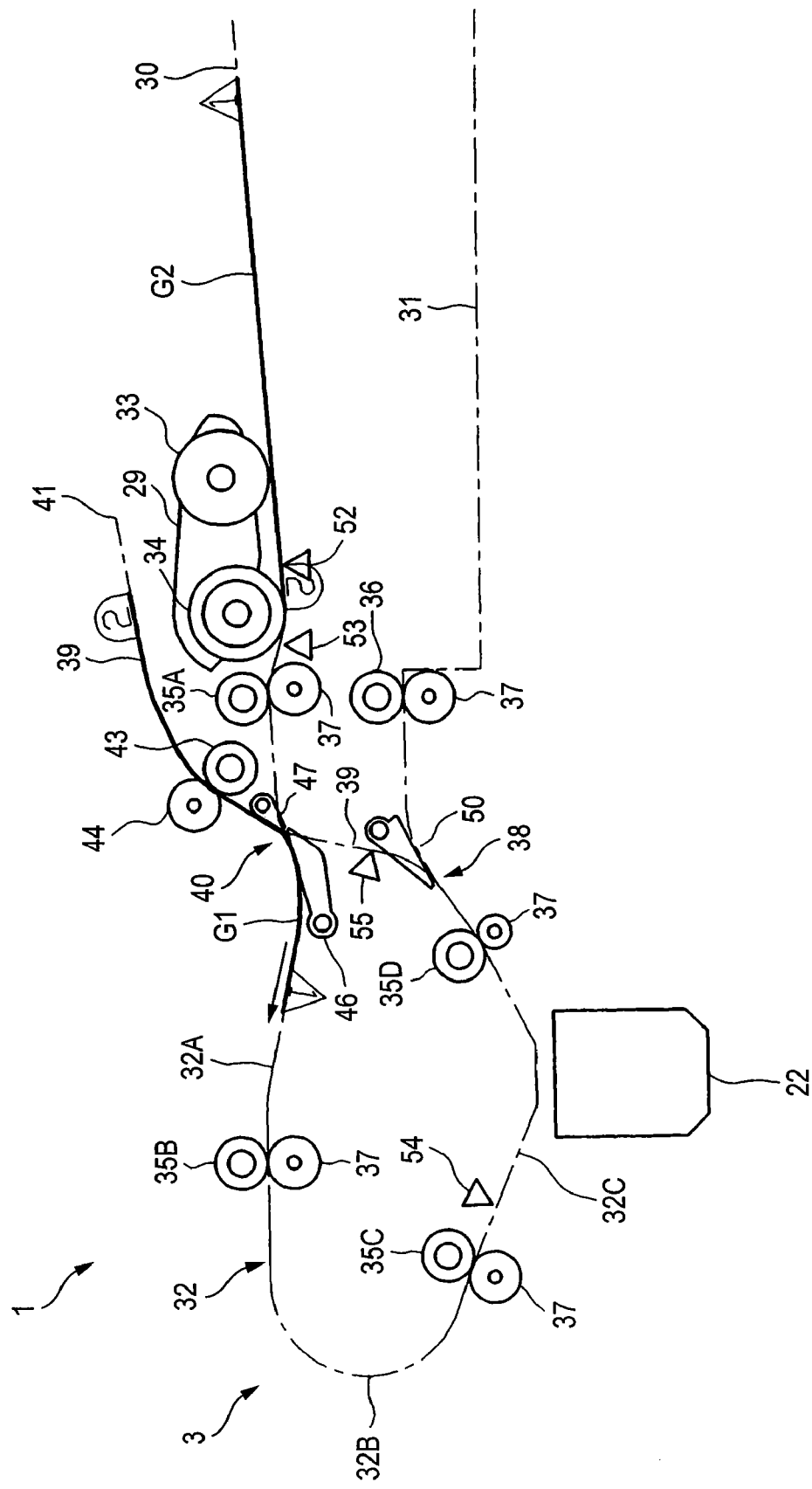
FIG. 35 is a schematic diagram illustrating an image scanning operation in the double-sided scanning mode.

As shown in FIG. 35, the document G1 returned from the bidirectional feed path 39 abuts on the guide flap 46 in the third guiding posture at the intersection position 40. The guide flap 46 is regulated so as not to rotate downwardly from the third guiding posture. Accordingly, the feed path from the end 41 side of the bidirectional feed path 39 to the scanning position side of the document feed path 32 is activated and the feed path to the connection position 38 side of the bidirectional feed path 39 is deactivated. The guide flap 47 deactivates the feed path to the input tray 30 of the document feed path 32. Accordingly, the document G1 is guided by the guide flap 46 and the guide flap 47 and is fed to the scanning position side of the document feed path 32 from the end 41 of the bidirectional feed path 39 without entering the connection position 38 side of the bidirectional feed path 38 or the input tray 30 side of the document feed path 32. Since the document G1 is returned to the upstream side in the document feed path 32 of the scanning position from the bidirectional feed path 39, the document G1 is fed again in the document feed path 32 in the state where the leading end and the trailing end are reversed from the state where the document is first fed in the document feed path 32. In this way, the document G1 is fed in a switch-back manner. The document G1 is fed in the document feed path 32 so as to oppose the second side thereof to the scanning position.

Figure 36:
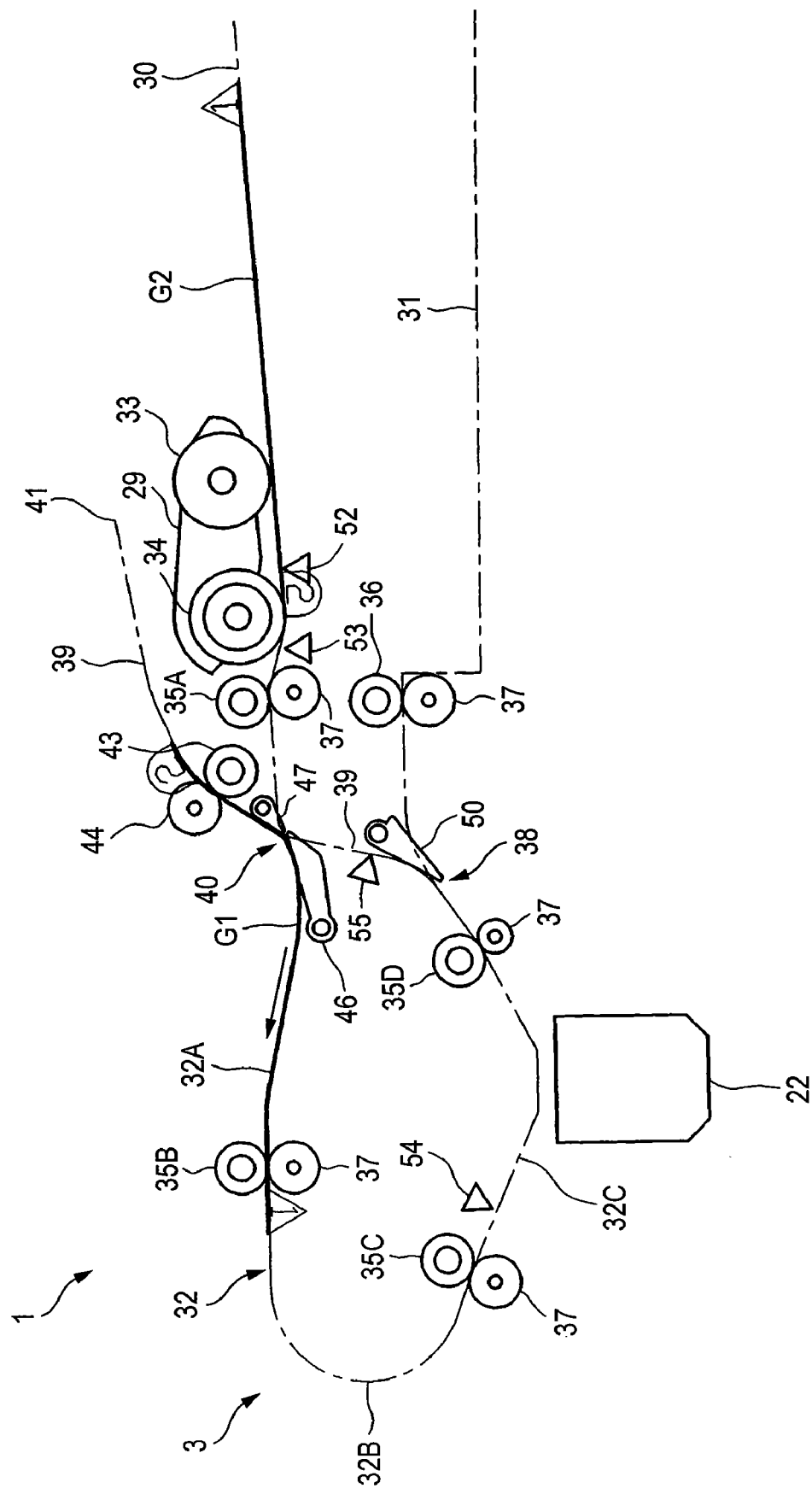
FIG. 36 is a schematic diagram illustrating an image scanning operation in the double-sided scanning mode.

As shown in FIG. 36, when the leading end in the feeding direction of the document G1 reaches a predetermined position on the upstream side of the scanning position in the document feed path 32, the control unit 60 switches the rotation of the motor 67 from the CW rotation to the CCW rotation. At this time, the command for stop and the command for CCW rotation output from the CPU 61 to the control unit 60 are stored as the scanning status information in the RAM 63. Since the driving power transmission mechanism 120 transmits the driving power of the feeding direction to the feed rollers 35A, 35B, 35C, and 35D and the discharge roller 36 regardless of the rotation direction of the motor 67, the document G1 is fed toward the scanning position in the document feed path 32 by the feed roller 35B and the like even after the rotation of the motor 67 is switched.

In the driving power transmission mechanism 150, when the rotation of the motor 67 is switched from the CW rotation to the CCW rotation, the support arm 156 of the sun-and-planet gear 153 rotates in the CCW direction and is locked to the driving power cutting mechanism 151 so as to have the disengagement posture. Accordingly, the transmission of the driving power from the sun-and-planet gear 153 to the driven gear 168 is cut off, thereby stopping the reversible roller 43. Accordingly, as shown in FIG. 36, even when the rotation of the motor 67 is switched in the state where the leading end in the feeding direction of the document G1 is nipped by the feed roller 35B and the pinch roller 37 and the trailing and in the feeding direction of the document G1 is nipped by the reversible roller 43 and the pinch roller 44, the reversible roller 43 does not rotate in the entrance direction. The reversible roller to which the transmission of the driving power from the motor 67 is cut off rotates in the return direction by the document G1 fed with the rotation of the feed roller 35B.

In the driving power transmission mechanism 70, since the pickup solenoid 88 is not activated after the locking mechanism locks the sun-and-planet gear 75 to the disengagement posture, the sun-and-planet gear 75 is maintained in the disengagement posture in spite of the CCW rotation of the motor 67. The driving power transmission mechanism 170 changes the posture of the guide flap 50 to the second guiding posture by switching the rotation of the motor 67 from the CW rotation to the CCW rotation.

Figure 37:
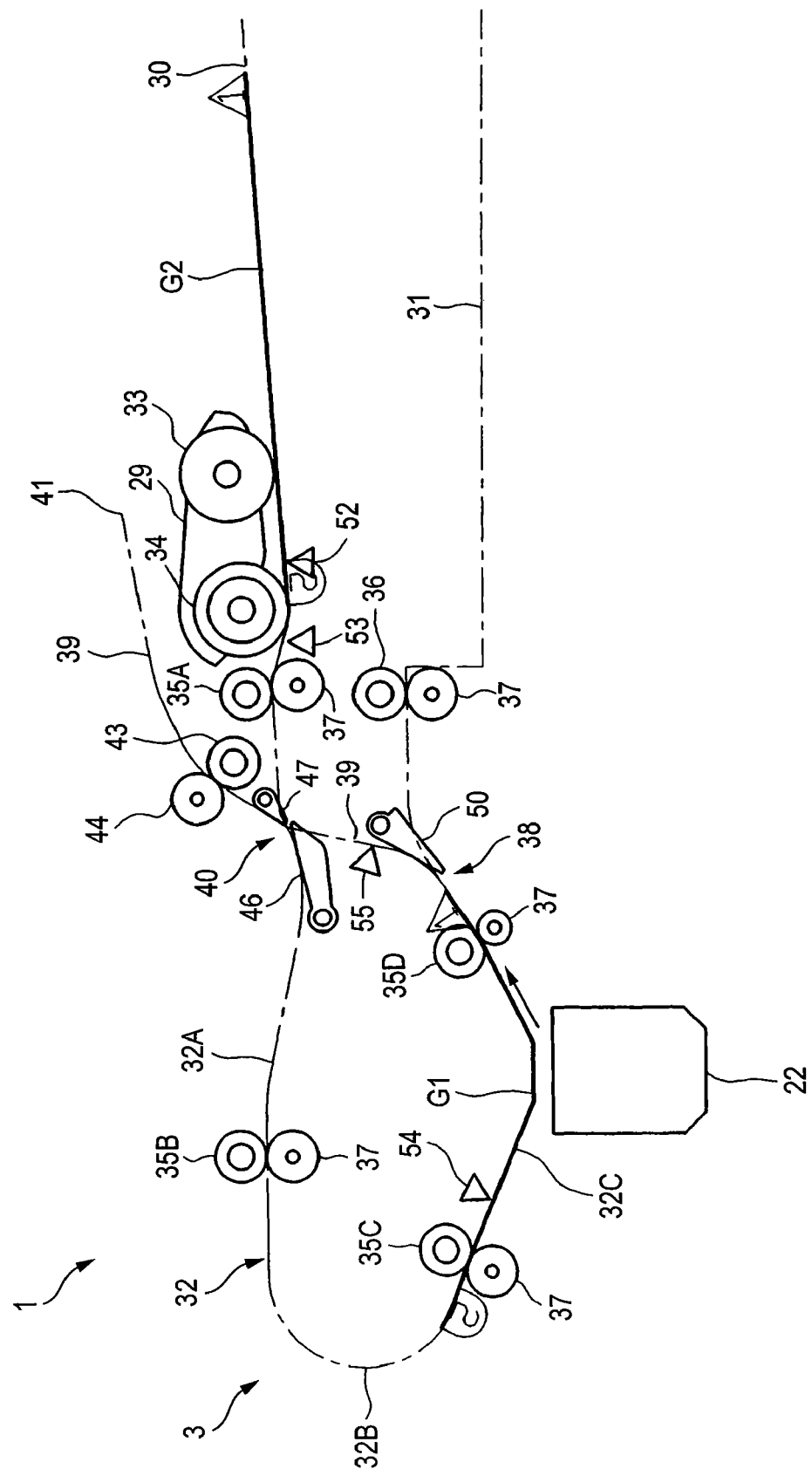
FIG. 37 is a schematic diagram illustrating an image scanning operation in the double-sided scanning mode.

When the leading end in the feeding direction of the document G1 is sensed by the rear sensor 54 and the leading end in the feeding direction reaches the scanning position, as shown in FIG. 37, the control unit 60 allows the image scanning unit 22 to perform the image scanning operation to the second side of the document G1 (S17). The leading end in the feeding direction of the document G1 of which the second side having been scanned is guided by the guide flap 50 and enters the bidirectional feed path 39 from the document feed path 32 through the connection position 38. The control unit 60 ends the image scanning operation to the first side of the document G1 using the image scanning unit 22 when the trailing end in the feeding direction of the document G1 is sensed by the rear sensor 54 and the trailing end in the feeding direction reaches the scanning position. The image data of the first side of the document G1 scanned by the image scanning unit 22 are stored in a predetermined area of the RAM 63. The control unit 60 stores the image data in the RAM 63 and stores a variable indicating that the image scanning operation to the first side is ended in a predetermined area of the RAM 63.

When the switch-back sensor 55 is turned on by sensing the leading end in the feeding direction of the document G1 entering the bidirectional feed path 39, the control unit 60 turns on the switch-back solenoid 161. Accordingly, when the document G1 enters the bidirectional feed path 39, the locking of the support arm 156 of the sun-and-planet gear 153 is released by the driving power cutting mechanism 151 and the sun-and-planet gear 153 to which the driving power of the CCW rotation is transmitted from the motor 67 transmits the driving power of the CW rotation to the driven gear 168 as shown in FIG. 18, thereby allowing the reversible roller 43 in the entrance direction.

As shown in FIG. 33, the leading end in the feeding direction of the document G1 reaching the intersection position 40 pushes up the guide flap 46 to change the posture thereof from the third guiding posture to the fourth guiding posture and enters the end 41 side of the bidirectional feed path 39 through the intersection position 40. As shown in FIG. 34, after the trailing end in the feeding direction of the document G1 completely enters the end 41 side over the intersection position 40 of the bidirectional feed path 39, the control unit 60 switches the rotation of the motor 67 from the CCW rotation to the CW rotation and allows the reversible roller 43 to rotate in the return direction, thereby returning the document G1 to the intersection position 40. At this time, the command for stop and the command for CW rotation output from the CPU 61 of the control unit 60 are stored as the scanning status information in the RAM 63. As shown in FIG. 35, the document G1 returned from the bidirectional feed path 39 is guided by the guide flap 46 and the guide flap 47 and is fed from the end 41 side of the bidirectional feed path 39 to the scanning position side of the document feed path 32. Accordingly, the document G1 is fed in the document feed path 32 in the state where the leading end and the trailing end are reversed, that is, in the state where the document is first fed to the document feed path 32 (S18).

Since the driving power transmission mechanism 120 transmits the driving power of the feeding direction to the feed rollers 35A, 35B, 35C, and 35D and the discharge roller 36 regardless of the rotation direction of the motor 67, the feed rollers 35A, 35B, 35C, and 35D and the discharge roller 36 rotate in the feeding direction. The driving power transmission mechanism 70 cuts off the transmission of the driving power to the driven gear 95 in the state where the locking mechanism 86 maintains the sun-and-planet gear 75 in the disengagement posture. The driving power transmission mechanism 170 changes the posture of the guide flap 50 to the first guiding posture by switching the rotation of the motor 67 from the CCW rotation to the CW rotation.

Thereafter, the document G1 passes through the scanning position with the first side opposed to the scanning position, is guided to the document discharge tray 31 by the guide flap 50, and then is discharged to the document discharge tray 31 with the first side downward (S19). When a next document G2 is set on the document input tray 30 (S20: Y), that is, when the first front sensor 52 is in the On state, the control unit 60 turns on the pickup solenoid 88, releases the locking of the support arm 78 of the sun-and-planet gear 75 by the locking mechanism 86, and transmits the driving power to the driven gear 95 from the motor 67 by the driving power transmitting mechanism 70, thereby allowing the separation roller 34 to rotate in the feeding direction. Accordingly, the document G2 on the document input tray 30 is fed to the document feed path 32 and the document G2 is subjected to the double-sided scanning operation as described above.

Similarly to the single-sided scanning mode, after the final document Gk placed on the document input tray 30 is discharged from the document feed path 32 to the document discharge tray 31, the control unit 60 switches the rotation of the motor 67 to the CCW rotation to the CW rotation and turns on the pickup solenoid 88. Accordingly, as shown in FIG. 11, the driven gear 95 rotates in the CCW direction with the driving power transmitted from the sun-and-planet gear 75 and the shaft 111 rotates in a direction opposite to the feeding direction. The rotation of the shaft 111 is transmitted to the arm 29 and the arm 29 is raised, thereby separating the pickup roller 33 from the guide surface of the document feed path 32. Accordingly, the document Gn to be scanned next time is returned to the initial status in which the document can be inserted until it abuts on the separation roller 34 through the lower side of the pickup roller 33. Thereafter, the control unit 60 stops the motor 67 and the image scanning operation in the double-sided scanning mode is ended.

In this aspect, the double-sided scanning operation of the image scanner 1 has been described on the premise that the documents Gn are discharged to the document discharge tray 31 in the state where the order of documents placed on the document input tray 30 is not changed. However, when it is not necessary to match the order of documents Gn placed on the document input tray 30 with the order of documents Gn discharged to the document discharge tray 31, the document Gn may be fed to the document discharge tray 31 side through the connection position 38 and then discharge the document Gn to the document discharge tray 31, without allowing the document Gn to enter the bidirectional feed path 39 again after feeding the document Gn with the second side of the document opposed to the scanning position. Accordingly, since the order of the documents Gn on the document discharge tray 31 is not maintained but the final switch-back feeding operation can be omitted, it is possible to reduce the time necessary for performing the double-sided scanning operation to the documents Gn.

In the document feeding for double-sided scanning, when the document Gn is being fed in the document feed path 32 or the bidirectional feed path 39, the feeding of the document Gn may be stopped due to errors such as an emergency stop, the turn-off, and a paper jam. The stop of feeding may be performed by the control unit 60 on the basis of the sensor detection signal due to the paper jam or the opening of the top cover 6 in the ADF 3 or may be performed by the control unit 60 on the basis of an input of an operation key 11 in the operation panel 5. When the feeding is stopped, the document Gn in feeding is stopped at one position in the document feed path 32 or the bidirectional feed path 39. When the reason for stop is settled by a jam process or the like, the control unit 60 resumes the feeding on the basis of the sensor detection signal due to the closing of the top cover 6 or the input of the operation key 11 in the operation panel 5. At the time of resuming the feeding, the document Gn in feeding may remain in the document feed path 32 or the bidirectional feed path 39. The document Gn need be discharged before a document Gn is fed from the document input tray 30. In the feeding of the document for the double-aided scanning, when the document Gn is being fed in the document feed path 32 or the bidirectional feed path 39 and an emergency stop or a compulsory end is input, the image scanning operation is stopped at that time and the document Gn in feeding is automatically discharged.

Hereinafter, the feeding resuming operation after the feeding of the document Gn is stopped by the ADF 3 will be described. FIGS. 38 to 41 are flow charts illustrating the feeding resuming operation after stop. The control unit 60 reads out the feeding mode information, the scanning status information, and the rotation direction information stored in the RAM 63 at the time of resuming the feeding. As described above, the feeding mode information indicates one of the single-sided scanning mode and the double-sided scanning mode input at the time of performing the image scanning operation. In the single-sided scanning mode, as described above, the motor 67 rotates in the CW direction in the course of the feeding and the guide flap 50 is in the first guiding posture. Accordingly, even when the document Gn is located at any position in the document feed path 32, the document Gn stopped in the document feed path 32 is discharged to the document discharge tray 31 by allowing the motor 67 at the time of resuming the feeding and feeding the document Gn by a predetermined distance. In the double-sided scanning mode, the operation for discharging the document Gn varies depending on the scanning status and the position in which the document Gn is stopped in the document feed path 32 or the bidirectional feed path 39. The operation at the time of resuming the feeding in the double-sided scanning mode will be described in detail below. The feeding resuming operation after the feeding of the document Gn is stopped includes the operation of automatically discharging the document Gn at the time of emergently stopping or compulsorily ending the feeding of the document Gn.

The scanning status information is the On/Off history of the rear sensor 54 and the switch-back sensor 55, which is stored in the RAM 63, the variable indicating "the end of first side scanning" or "the end of second side scanning", and the history of commands to the motor 67. On the basis thereon, the CPU 61 determines which of a status before first side scanning, a status during first side scanning, a status during switch-back feeding after first side scanning, a status during second side scanning, a status during switch-back feeding after second side scanning, and a status after second side feeding the feeding status is by the use of a control program stored in the ROM 62. The rotation direction information is the history of commands to the motor 67m which is stored in the RAM 63, and the CPU 61 determines the rotation direction of the motor right before the feeding is stopped by the control program stored in the ROM 62 on the basis of the history.

As described above, the document Gn fed from the document input tray 30 is sensed by the rear sensor 54 on the upstream side in the feeding direction of the scanning position. Accordingly, the control unit 60 can determine that a status until the rear sensor 54 is first turned off after the command for CW rotation of the motor 67 is the status before first side scanning, on the basis of the scanning status information stored in the RAM 63.

The rear sensor 54 is changed to the On state by sensing the leading end in the feeding direction of the document Gn and the first side of the document Gn is subjected to the image scanning operation by the image scanning unit 22. The leading end in the feeding direction of the document Gn being subjected to the image scanning of the first side enters the bidirectional feed path 39 from the document feed path 32 and is sensed by the switch-back sensor 55. When the document Gn is further fed, the rear sensor 54 is changed to the Off state by sensing the trailing end in the feeding direction of the document Gn and the switch-back sensor 55 is changed to the Off state by sensing the trailing end in the feeding direction of the document Gn. Accordingly, the control unit 60 can determine that a status until the switch-back sensor is changed to the Off state after the rear sensor 54 is changed to the On state is the status during first side scanning, on the basis of the scanning status information stored in the RAM 63.

When the first side scanning operation is ended, a variable indicating "first side scanning end" is recorded in the RAM 63. The document Gn of which the first side has been scanned enters the bidirectional feed path 39. The switch-back sensor 55 is changed to the On/Off state by sensing the leading and the trailing end in the feeding direction of the document Gn. When the document Gn is fed by a predetermined distance after the switch-back sensor 55 is changed to the Off state, the motor 67 is stopped. In this state, the document Gn is nipped by the reversible roller 43 and the pinch roller 44. With the rotation of the motor 67, the document Gn is fed in a switch-back manner, is returned to the document feed path 32 from the intersection position 40, is fed by a predetermined distance, and then is stopped to switch the rotation of the motor 67 to the CCW rotation. Accordingly, the control unit 60 can determine that the variable is the "first side scanning end" and that a status until the rotation of the motor 67 is switched from the CCW rotation to the CW rotation and then is stopped after the switch-back sensor 55 is changed to the On/Off state is the status during switch-back feeding after first side scanning, on the basis of the scanning status information stored in the RAM 63.

The document Gn returned to the document feed path 32 is sensed again by the rear sensor 54 on the upstream side in the feeding direction of the scanning position. Then, similarly to the first side scanning operation, when the document Gn being subjected to the second side scanning is fed, the rear sensor 54 is changed to the Off state by sensing the trailing end in the feeding direction of the document Gn and the switch-back sensor 55 is changed to the Off state by sensing the trailing end in the feeding direction of the document Gn. Accordingly, the control unit 60 can determine that the variable is the "first side scanning end" and a status until the switch-back sensor 55 is changed to the off state after the rear sensor 54 is changed to the On state is the status during second side scanning, on the basis of the scanning status information stored in the RAM 63.

When the second side scanning operation is ended, a variable indicating "second side scanning end" is recorded in the RAM 63. The document Gn of which the second side has been scanned enters the bidirectional feed path 39 and is fed in the switch-back manner as described above. Accordingly, the control unit 60 can determine that the variable is the "second side scanning end" and that a status until the rotation of the motor 67 is switched from the COW rotation to the CW rotation and then is stopped after the switch-back sensor 55 is changed to the On/Off state is the status during switch-back feeding after second side scanning, on the basis of the scanning status information stored in the RAM 63.

Incidentally, the status before first side scanning, the status during first side scanning, and the status during switch-back scanning after first side scanning correspond to the status during first side feeding. The status during second side scanning and the status during switch-back feeding after second side scanning correspond to the status during second side feeding.

Figure 38:
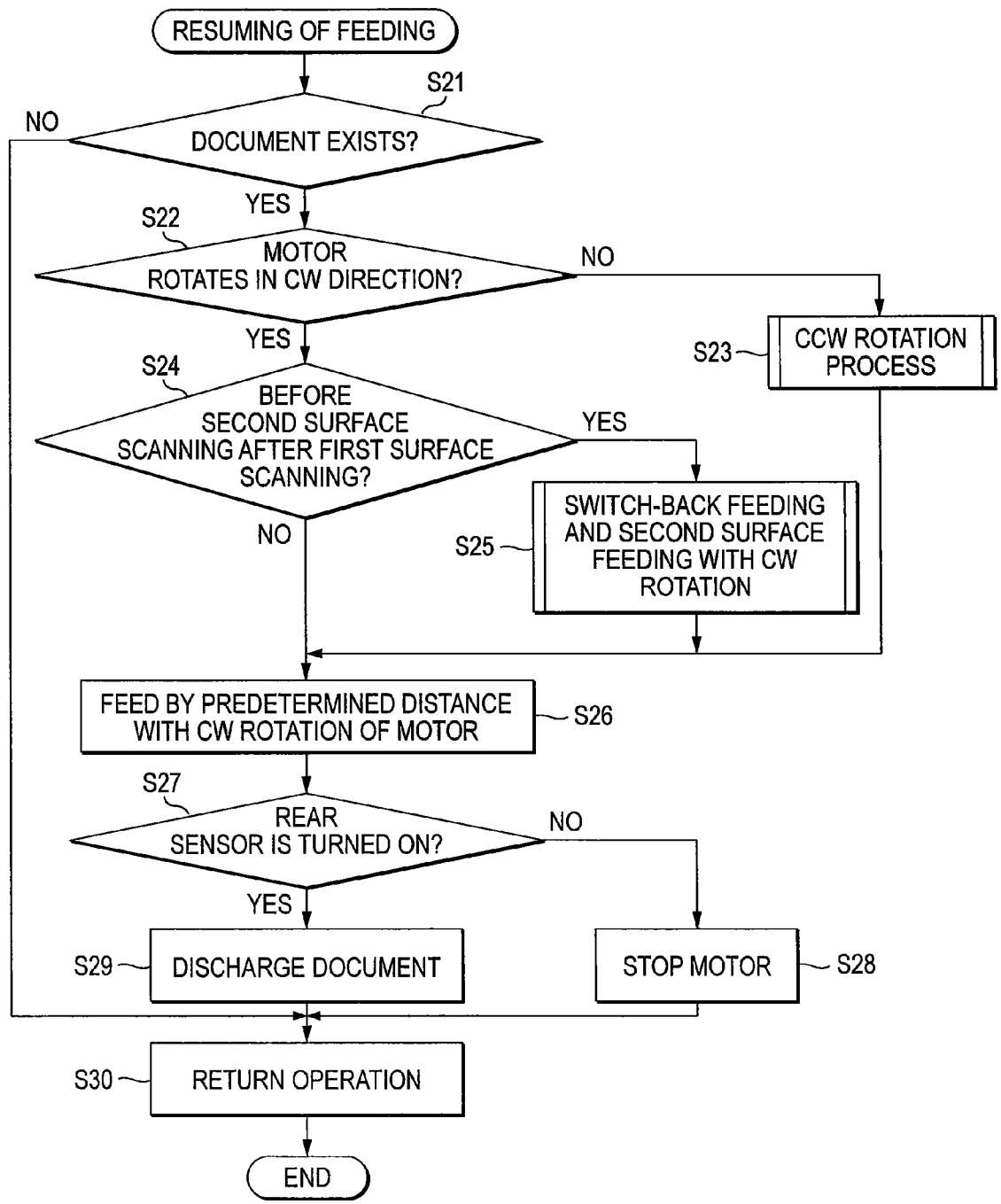
FIG. 38 is a flowchart illustrating an operation of resuming the feeding.

As shown in FIG. 38, the control unit 60 determines whether a document remains in the document feed path 32 or the bidirectional feed path 39 of the ADF 3 at the time of resuming the stopped feeding (S21). For example, when the feeding is stopped due to the emergency stop or the turn-off, it is considered that a document in feeding remains in the document feed path 32 or the bidirectional feed path 39. On the other hand, when the feeding is stopped due to the paper jam and the stopped document Gn is removed by the jam process or the like, it is considered that no document Gn remains in the document feed path 32 or the bidirectional feed path 39.

When a document in feeding remains in the document feed path 32 or the bidirectional feed path 39, any one of the second front sensor 53, the rear sensor 54, and the switch-back sensor 55 is turned on. Accordingly, the control unit 60 determines that a document remains when one of the sensors is turned on and determined that no document remains when all the sensors are turned off. Incidentally, in order to determine existence of a document at the time of resuming the feeding, an additional sensor may be provided in the document feed path 32 or the bidirectional feed path 39 in addition to the second front sensor 53, the rear sensor 54, and the switch-back sensor 55.

When determining that a document remains (S21: Y), the control unit 60 drives the motor 67 to discharge the remaining document Gn. The detailed operation thereof will be described later. On the other hand, when determining that no document remains (S21: N), the control unit 60 performs a return operation (S30). The return operation means that after the feeding of the document Gn is ended, the rotation of the motor 67 is switched from the CW rotation to the CCW rotation and the pickup solenoid 88 is turned on to raise the arm 29 and the document is returned to the initial status in which the document Gn being subjected to the image scanning can be inserted until it abuts on the separation roller 34 through the lower side of the pickup roller 33. Accordingly, when no document Gn remains in the document feed path 32 or the bidirectional feed path 39, the initial status can be rapidly returned without uselessly driving the motor 67, the feed rollers 35A to 35D, the reversible roller 43, and the like.

When determining that a document remains (S21: Y), the control unit 60 determines the rotation direction of the motor 67 right before the feeding is stopped, on the basis of the rotation direction information stored in the RAM 63. When the rotation direction of the motor 67 is the CW direction (S22: Y), it is one of the status before first side scanning, the status during switch-back feeding after first side scanning, the status during switch-back feeding after second side scanning, and the status after second side feeding. On the other hand, the rotation direction of the motor 67 is the CCW direction (S22: N), all the scanning statuses can be considered.

When the rotation direction of the motor 67 is the CW direction (S22: Y), the control unit 60 determines whether the feeding is in the status after first side scanning and before second side scanning (S24: N). When the variable stored in the RAM 63 indicates the "first side scanning end", the control unit 60 determines that the feeding is in the status after first side scanning and before second side scanning (S24: Y). When the variable is otherwise, the control unit determines that the feeding is not in the status after first side scanning and before second side scanning (S24: N).

When the feeding is not in the status after first side scanning and before second side scanning (S24: N), the control unit 60 determines that the scanning status is one of the status before first side scanning, the status during switch-back feeding after second side scanning, and the status after second side feeding. In the status before first side scanning, the document Gn is stopped in the status before the leading end in the feeding direction thereof reaches the rear sensor 54, when the document is picked up from the document input tray 30 and then is being fed with the transmission of the CW rotation of the motor 67 to the feed rollers 35A to 35D through the driving power transmission mechanisms 120 and 150. In the status during switch-back feeding after second side scanning, the document Gn is stopped when the document is being returned to the document feed path 32 from the bidirectional feed path 39 with the transmission of the CW rotation of the motor 67 to the feed rollers 35A to 35D and the reversible roller 43 through the driving power transmission mechanisms 120 and 150 in the switch-back feeding after the document is fed with the second side thereof opposed to the scanning position. In the status after second side feeding, the document Gn is stopped when the document is being fed in the document feed path 32 with the first side thereof opposed to the scanning position with the transmission of the CW rotation of the motor 67 to the feed rollers 35A to 35D a through the driving power transmission mechanism 120 after the second switch-back feeding is ended. In these cases, the control unit 60 allows the motor 67 to rotate in the CW direction (S26). Accordingly, the feeding of the document Gn is resumed from the status during feeding due to the CW rotation.

With the transmission of the CW rotation of the motor 67, the feed rollers 35A to 35D rotate in the feeding direction and the reversible roller 43 rotates in the return direction. With the transmission of the CW rotation of the motor 67, the guide flap 50 is in the first guiding posture. When the document Gn is fed in the document feed path 32 by a predetermined distance with the first side thereof opposed to the scanning position, the document is sensed by the rear sensor 54. When the rear sensor 54 is turned on (S27: Y) the control unit 60 can determine that the stopped document Gn is normally fed. When the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S29). Accordingly, the document Gn stopped in the document feed path 32 in the status before first side scanning, the status during switch-back feeding after second side scanning, or the status after second side feeding due to the stop of feeding can be discharged to the document discharge tray 31 with the first side thereof downward. Thereafter, the control unit 60 performs the same return operation as described above (S30). Accordingly, the ADF 3 is returned to the initial state.

Figure 39:
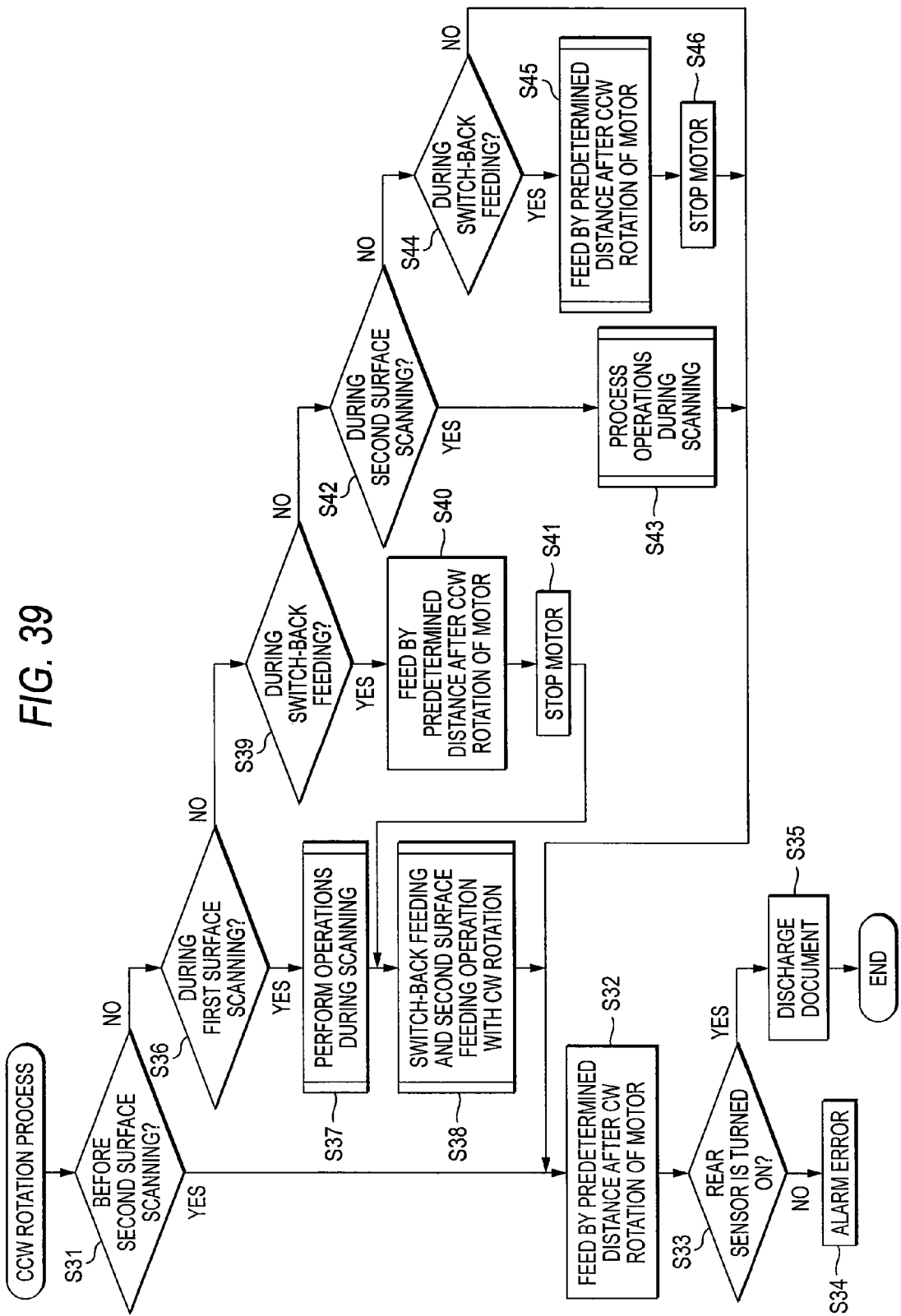
FIG. 39 is a flowchart illustrating a CCW rotating operation.

When determining that a document remains (S21: Y) and that the rotation direction of the motor 67 right before the stop of feeding is the CCW direction (S22: N), the control unit performs the CCW rotation operation (S23). FIG. 39 is a flowchart illustrating the CCW rotation operation. First, the control unit 60 determines whether the document Gn is in the status before first side scanning, on the basis of the scanning status information stored in the RAM 63 (S31).

When the document Gn is in the status before first side scanning, it can be determined that the document Gn is stopped in the status before the leading end in the feeding direction reaches the rear sensor 54, when the document is picked up from the document input tray 30 and then is being fed with the transmission of the CW rotation of the motor 67 to the feed rollers 35A to 35D through the driving power transmission mechanism 120. In this case, the control unit 60 allows the motor 67 to rotate in the CW direction (S32). The feed rollers 35A to 35D rotate in the feeding direction with the transmission of the CW rotation of the motor 67 and the document Gn is fed in the feeding direction in the document feed path 32. With the transmission of the CW rotation of the motor 67, the guide flap 50 is in the first guiding posture.

When the document Gn is fed in the document feed path 32 by a predetermined distance, the document is sensed by the rear sensor 54. When the rear sensor 54 is turned on (S33: Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S35). Accordingly, the document Gn stopped in the document feed path 32 in the status before first side scanning due to the stop of feeding can be discharged to the document discharge tray 31 with the first side thereof downward.

After performing the CCW rotation operation (S23), the control unit 60 performs the CW rotation operation to the motor 67 (S26). Since the document Gn is already discharged to the document discharge tray 31, the rear sensor 54 is not turned on even when the motor 67 rotates in the CW direction by a predetermined distance (S27: N). In this case, the control unit 60 stops the rotation of the motor 67 (S28) and performs the return operation (S30).

When determining that the document Gn is not in the status before first side scanning (S31: N), the control unit subsequently determines whether the document is in the status during first side scanning (S36). When the document is in the status during first side scanning (S36: Y), it can be determined that the document Gn is picked up from the document input tray 30 and then is stopped when it is being fed with the first side opposed to the scanning position. In this case, the control unit 60 performs an operation during scanning (S37) and then performs the switch-back feeding and second side feeding operation with the CW rotation (S38).

Figure 40:
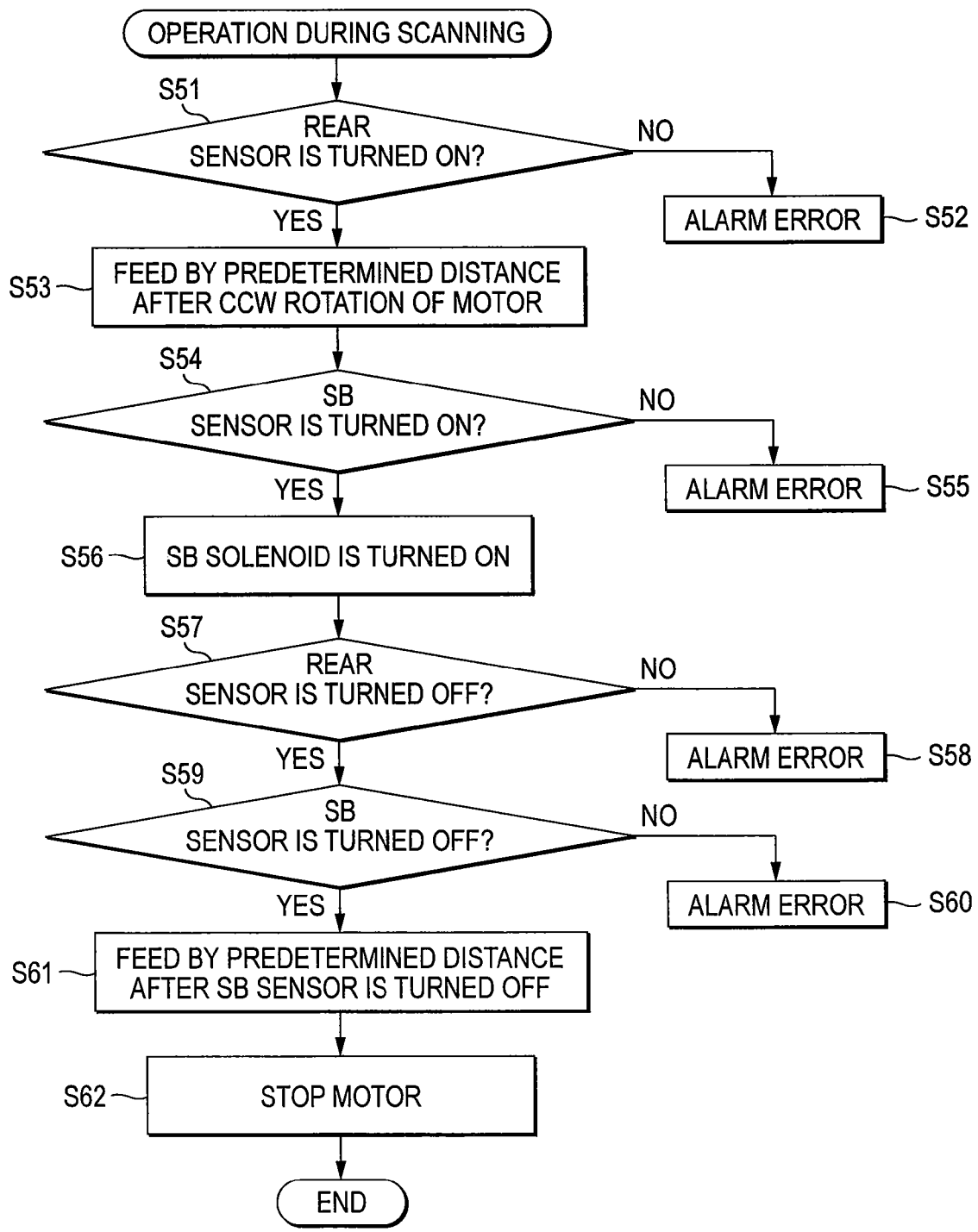
FIG. 40 is a flowchart illustrating an operation after the course of the scanning operation.

FIG. 40 is a flowchart illustrating the operation during scanning. First, the control unit 60 determines whether the rear sensor 54 is turned on (S51). Since the document Gn is stopped in the status during first side scanning, the rear sensor 54 may be turned on. Accordingly, when the rear sensor 54 is not in the On state (S51: N), the control unit 60 determines that some failure occurs and performs an error alarm (S52) by displaying an error on the liquid crystal display unit 12 of the operation panel or ringing an error alarm.

When the rear sensor 54 is in the On state (S51: Y), the control unit 60 allows the motor 67 to rotate in the CCW direction in order to guide the document Gn located at the scanning position to the bidirectional feed path 39. The feed rollers 35A to 35D feed the document Gn in the feeding direction with the transmission of the CCW rotation of the motor 67. The guide flap 50 maintains the second guiding posture. When the feeding is stopped in the status during first side scanning of the document Gn, the leading end in the feeding direction of the document Gn passes through at least the scanning position and is being fed toward the connection position 38. Even if the feeding is stopped in the state where the leading end in the feeding direction of the document Gn is entering the bidirectional feed path 39 from the connection position 38, the control unit 60 allows the motor 67 to rotate in the CCW direction and resumes the feeding from the state where the guide flap 50 is in the second guiding posture. Accordingly, the guide flap 50 is changed to the first guiding posture, thereby preventing damaging the document Gn during the stop of feeding. In this way, whether the leading end in the feeding direction of the document Gn of which the feeding is stopped in the status during first side scanning reaches the connection position 38, the document Gn is fed to the bidirectional feed path 39 as shown in FIG. 33.

The leading end in the feeding direction of the document Gn fed to the bidirectional feed path 39 is sensed by the switch-back sensor 55. When the switch-back sensor 55 is not turned on (S54: N), the control unit 60 determines that some failure occurs and performs an error alarm (S55) by displaying an error on the liquid crystal display unit 12 of the operation panel or ringing an error alarm. When the switch-back sensor 55 is turned on (S54: Y), the control unit 60 turns on the switch-back solenoid 161 (S56). Accordingly, as shown in FIG. 18, the driving power is transmitted to the reversible roller 43 from the motor 67 through the driving power transmission mechanism 150 and thus the reversible roller 43 rotates in the entrance direction.

The leading end in the feeding direction of the document Gn entering the end 41 side of the bidirectional feed path 39 from the intersection position 40 is nipped by the reversible roller 43 and the pinch roller 44 and then is further fed toward the end 41. When the rear sensor 54 is turned off (S57: Y) by sensing the trailing end in the feeding direction of the document Gn and the switch-back sensor 55 is turned off (S59: Y) by sensing the trailing end in the feeding direction of the document Gn, the control unit 60 feeds the document Gn by a predetermined distance (S61) and then stops the motor 67 (S62). Accordingly, as shown in FIG. 34, the document Gn is stopped in the status where the trailing end in the feeding direction completely enters the end 41 side of the bidirectional feed path 39 through the intersection position 40 and the document Gn is nipped by the reversible roller 43 and the pinch roller 44. In this course of feeding, when the rear sensor 54 is not turned off (S57: N) or when the switch-back sensor 55 is not turned on (S59: N), the control unit 60 determines that some failure occurs and thus performs an error alarm (S58, S60). Thereafter, the control unit 60 performs the switch-back feeding and second side feeding operation with the CW rotation.

Figure 41:
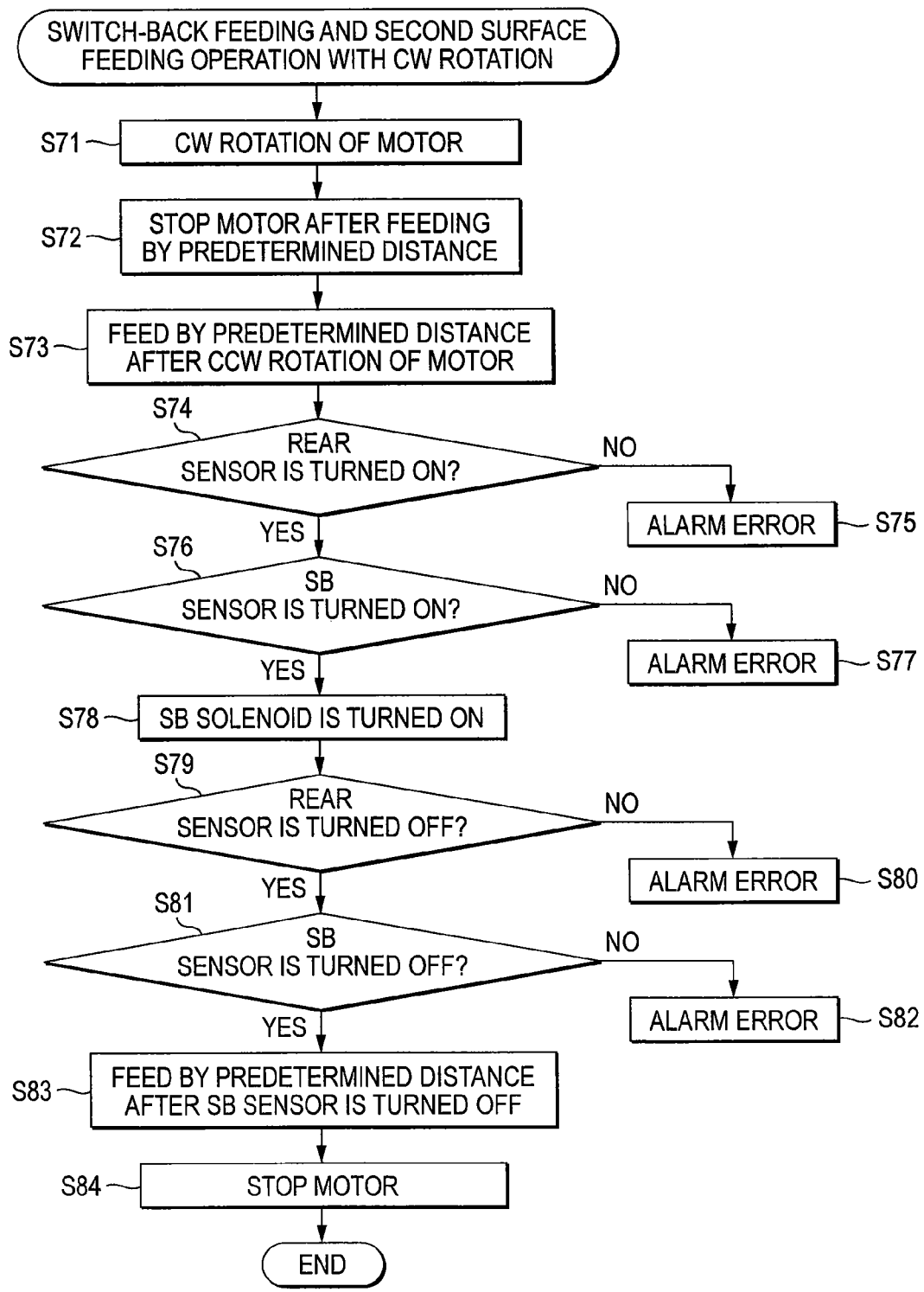
FIG. 41 is a flowchart illustrating a switch-back feeding and second side feeding operation with the CCW rotation.

FIG. 41 is a flowchart illustrating the switch-back feeding and second side feeding operation with the CW rotation. First, the control unit 60 allows the motor 67 to rotate in the CW direction (S71). Accordingly, the reversible roller 43 rotates in the return direction and thus the document Gn is fed in the switch-back manner and is returned to the document feed path 32 from the intersection position as shown in FIG. 35. As a result, the leading end and the trailing end of the document Gn are reversed and the document Gn is returned to the document feed path 32 with the second side thereof opposed to the scanning position. By continuously performing the CW rotation, the leading end in the feeding direction of the returned document Gn is nipped by the feed roller 35B and the pinch roller 37 and is fed in the document feed path 32.

The control unit 60 feeds the document Gn by a predetermined distance with the CW rotation and then stops the rotation of the motor 67 (S72). The control unit 60 allows the motor 67 to rotate in the CCW direction (S73). By switching the rotation of the motor 67 from the CW rotation to the CCW rotation, as shown in FIG. 16, the transmission of the driving power to the reversible roller 43 through the driving power transmission mechanism 150 is cut off. Even when the rotation direction of the motor 67 is switched, the feed rollers 35A to 35D rotate in the feeding direction. Accordingly, the document Gn returned to the document feed path 32 is fed by the feed rollers 35A to 35D to which the driving power of the motor 67 is transmitted. The guide flap 50 is changed to the second guiding posture with the transmission of the CCW rotation of the motor 67.

When the document Gn is fed in the document feed path 32 by a predetermined distance, the document is sensed by the rear sensor 54 to turn on the rear sensor 54 (S74: Y). The fed document Gn is guided by the guide flap 50 and is fed to the bidirectional feed path 39. The leading end in the feeding direction of the document fed to the bidirectional feed path 39 is sensed by the switch-back sensor 55 to turn on the switch-back sensor 55 (S76: Y). In the course of feeding, when the rear sensor 54 is not turned on (S74: N) or when the switch-back sensor 55 is not turned on (S76: N), the control unit determines that some failure occurs and performs an error alarm (S75, S77).

When the switch-back sensor 55 is turned on (S76: Y), the control unit 60 turns on the switch-back solenoid 161 (S78). Accordingly, as shown in FIG. 18, the driving power is transmitted to the reversible roller 43 from the motor 67 through the driving power transmission mechanism 150 and thus the reversible roller 43 rotates in the entrance direction.

The leading end in the feeding direction of the document Gn entering the end 41 side of the bidirectional feed path 39 from the intersection position 40 is nipped by the reversible roller 43 and the pinch roller 44 and then is further fed toward the end 41. When the rear sensor 54 is turned off (S79: Y) by sensing the trailing end in the feeding direction of the document Gn and the switch-back sensor 55 is turned off (S81: Y) by sensing the trailing end in the feeding direction of the document Gn, the control unit 60 feeds the document Gn by a predetermined distance (S83) and then stops the motor 67 (S84). Accordingly, the document Gn is stopped in the status where the trailing end in the feeding direction completely enters the end 41 side of the bidirectional feed path 39 through the intersection position 40 and the document Gn is nipped by the reversible roller 43 and the pinch roller 44. In this course of feeding, when the rear sensor 54 is not turned off (S79: N) or when the switch-back sensor 55 is not turned on (S81: N), the control unit 60 determines that some failure occurs and thus performs an error alarm (S80, S82). Thereafter, the control unit 60 allows the motor 67 to rotate in the CW direction (S32).

When the control unit 60 allows the motor 67 to rotate in the CW direction (S32), the reversible roller 43 rotates in the return direction and the feed rollers 35A to 35D rotate in the feeding direction. Accordingly, the leading end and the trailing end are reversed and then the document Gn is returned to the document feed path 32 from the intersection position 40. As a result, the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S33: Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S35). Accordingly, the document Gn stopped in the document feed path 32 in the status during first side scanning due to the stop of feeding can be discharged to the document discharge tray 31 with the first side thereof downward.

When determining that the document Gn is not in the status during first side scanning (S36: N), the control unit determines whether the document is in the status during switch-back feeding after first side scanning (S39). When the document is in the status during switch-back feeding (S39: Y), it can be determined that the document Gn is stopped when it is being fed in the switch-back manner in the bidirectional feed path 39 after it is fed with the first side opposed to the scanning position. Since the rotation direction of the motor 67 right before the stop of feeding (S22: N), it can be determined that the document Gn is stopped when it enters the bidirectional feed path 39 in the status during switch-back feeding.

The control unit 60 feeds the document Gn by a predetermined distance by allowing the motor 67 to rotate in the CCW direction (S40). The switch-back sensor 55 is already turned on/off by sensing the leading end and the trailing end in the feeding direction of the document Gn, and the control unit 60 turns on the switch-back solenoid 161 in response to the On state of the switch-back sensor 55 and transmits the driving power to the reversible roller 43 from the motor 67 through the driving power transmission mechanism 150. Accordingly, the reversible roller 43 rotates in the entrance direction with the transmission of the CCW rotation of the motor 67. The feed rollers 35A to 35D feed the document Gn in the feeding direction. The second guide flap 50 maintains the second guiding posture.

The control unit 60 stops the motor 67 after feeding the document Gn by a predetermined distance by allowing the motor 67 to rotate in the CCW direction (S41). Accordingly, the trailing end in the feeding direction of the document Gn completely enters the end 41 side of the bidirectional feed path 39 through the intersection position 40 and is stopped in the state where the reversible roller 43 and the pinch roller 44 nip the document Gn. Thereafter, the control unit 60 performs a switch-back feeding and second side feeding operation with the CW rotation (S38).

Since the switch-back feeding and second side feeding operation with the CW rotation is the same as described above, the detailed description will be omitted. By means of the operation, the document Gn is fed in the switch-back manner, is returned to the document feed path 32 from the intersection position 40, is fed in the document feed path 32 with the second side opposed to the scanning position, and is fed again to the bidirectional feed path 39. Then, the trailing end in the feeding direction completely enters the end 41 side of the bidirectional feed path 39 through the intersection position 40 and the document is stopped in the state where it is nipped by the reversible roller 43 and the pinch roller 44.

Subsequently, when the control unit 60 allows the motor 67 to rotate in the CW direction (S32), the reversible roller 43 rotates in the return direction and the feed rollers 35A to 35D rotate in the feeding direction. Accordingly, the leading end and the trailing end are reversed and then the document Gn is returned to the document feed path 32 from the intersection position 40. As a result, the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S33:Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S35). Accordingly, the document Gn stopped in the document feed path 32 in the status during switch-back feeding after first side scanning due to the stop of feeding can be discharged to the document discharge tray 31 with the first side thereof downward.

When determining that the document Gn is not in the status during switch-back feeding after first side scanning (S39: N), the control unit 60 subsequently determines whether the document is in the status during second side scanning (S42). When the document is in the status during second side scanning (S42: Y), it can be determined that the document is stopped when it is being fed with the second side opposed to the scanning position after the document Gn is fed in the switch-back manner after scanning the first side. In this case, the control unit 60 performs an operation during scanning (S43).

Since the operations during scanning are the same as described above, the detailed description will be omitted. By these operations, the document Gn at the scanning position enters the bidirectional feed path 39, the trailing end in the feeding direction completely enters the end 41 side of the bidirectional feed path 39 through the intersection position 40, and the reversible roller 43 and the pinch roller 44 are stopped in the state where they nip the document Gn. Accordingly, even when the feeding is stopped in the state where the leading end in the feeding direction of the document Gn is entering the bidirectional feed path 39 from the connection position 38, the control unit 60 allows the motor 67 to rotate in the CCW direction and resumes the feeding with the guide flap 50 in the second guiding posture. Accordingly, the guide flap 50 is changed to the first guiding posture, thereby preventing damaging the document Gn during the stop of feeding. In this way, whether the leading end in the feeding direction of the document Gn of which the feeding is stopped in the status during second side scanning reaches the connection position 38, the document Gn is fed to the bidirectional feed path 39.

When the control unit 60 allows the motor 67 to rotate in the CW direction (S32), the reversible roller 43 rotates in the return direction and the feed rollers 35A to 35D rotate in the feeding direction. Accordingly, the leading end and the trailing end are reversed and then the document Gn is returned to the document feed path 32 from the intersection position 40. As a result, the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S33:Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S35). Accordingly, the document Gn stopped in the document feed path 32 in the status before first side scanning due to the stop of feeding can be discharged to the document discharge tray 31 with the first side thereof downward.

When determining that the document Gn is not in the status during second side scanning (S42: N), the control unit 60 determine that the document is in the status during switch-back feeding after second side scanning (S44). When the document is in the status during switch-back feeding after second side scanning (S44: Y), it can be determined that the feeding of document is stopped in the status during switch-back feeding in the bidirectional feed path 39 after it is fed with the second side opposed to the scanning position. Since the rotation direction of the motor 67 right before the stop of feeding is the CCW rotation (S22: N), it can be determined that the document Gn is stopped when the document enters the bidirectional feed path 39 in the status during switch-back feeding.

The control unit 60 feeds the document Gn by a predetermined distance by allowing the motor 67 to rotate in the CCW direction (S45). The switch-back sensor 55 is already turned on/off by sensing the leading end and the trailing end in the feeding direction of the document Gn, and the control unit 60 turns on the switch-back solenoid 161 in response to the On state of the switch-back sensor 55 and transmits the driving power to the reversible roller 43 from the motor 67 through the driving power transmission mechanism 150. Accordingly, the reversible roller 43 rotates in the entrance direction with the transmission of the CCW rotation of the motor 67. The feed rollers 35A to 35D feed the document Gn in the feeding direction. The second guide flap 50 maintains the second guiding posture.

The control unit 60 allows the motor 67 to rotate in the CCW direction so as to feed the document Gn by a predetermined distance and then stops the motor 67 (S46). Accordingly, the document Gn is stopped in the state where the trailing end in the feeding direction completely enters the end 41 side of the bidirectional feed path 39 through the intersection position 40 and the document Gn is nipped by the reversible roller 43 and the pinch roller 44.

When the control unit 60 allows the motor 67 to rotate in the CW direction (S32), the reversible roller 43 rotates in the return direction and the feed rollers 35A to 35D rotate in the feeding direction. Accordingly, the leading end and the trailing end are reversed and then the document Gn is returned to the document feed path 32 from the intersection position 40. As a result, the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S33: Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S35). Accordingly, the document Gn stopped in the document feed path 32 in the status during switch-back feed after second side scanning due to the stop of feeding can be discharged to the document discharge tray 31 with the first side thereof downward.

When the control unit 60 determines that the document Gn is not in the status during switch-back feeding after second side scanning (S44: N), the control unit can determine that the document Gn is stopped in the status during second side feeding. When the control unit 60 allows the motor 67 to rotate in the CW direction (S32), the feed rollers 35A to 35D rotate in the feeding direction and the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S33: Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S35). Accordingly, the document Gn stopped in the document feed path 32 in the status during second side feeding due to the stop of feeding can be discharged to the document discharge tray 31 with the first side thereof downward.

In this way, according to the image scanner 1, when the control unit 60 determines, on the basis of the feeding mode information and the scanning status information, that the document Gn is in the status during first side scanning (the status before first side scanning, the status during first side scanning, the status during switch-back feeding after first side scanning) in the double-sided scanning feeding mode at the time of resuming the stopped feeding of the document Gn, the switch-back feeding is repeated two times and then the document Gn is discharged to the document discharge tray 31 from the document feed path 32. When the control unit determines that the document Gn is in the status during second side feeding (the status during second side scanning, the status during switch-back feeding after second side scanning) in the double-sided scanning feeding mode, the switch-back feeding is performed once and the document Gn is discharged to the document discharge tray 31 from the document feed path 32. When the control unit determines that the document Gn is in the status after second side feeding in the double-sided scanning feeding mode, the document Gn is discharged to the document discharge tray 31 from the document feed path 32. Accordingly, the document Gn stopped in any status can be discharged to the document discharge tray 31 with the first side downward at the time of resuming the feeding and thus the page directions of the documents Gn in the document discharge tray 31 can be arranged. Accordingly, when the scanning of the discharged document Gn is performed again, it is not necessary to arrange again the page directions of the documents Gn, which is very convenient.

When the control unit 60 determines, on the basis of the feeding mode information and the scanning status information, that the document Gn is in the status before first side scanning in the double-sided scanning feeding mode at the time of resuming the stopped feeding of the document Gn, the feeding of the document Gn is resumed so as to discharge the document to the document discharge tray 31 from the document feed path 32. Accordingly, since the document Gn is rapidly discharged without performing the switch-back feeding, the page directions of the documents Gn in the document discharge tray 31 can be arranged. Accordingly, when the scanning of the discharged document Gn is performed again, it is not necessary to arrange again the page directions of the documents Gn, which is very convenient.

After resuming the stopped feeding of the document Gn, even when the control unit 60 drives the feed rollers 35A to 35D or the reversible roller 43 so as to feed the document by a predetermined distance or more but the rear sensor 54 or the switch-back sensor 55 does not sense the document, the error alarm is performed. Accordingly, it can be seen that the failure of feeding occurs after resuming the feeding. Therefore, it can be notified that the paper jam of the document Gn is not settled in the document feed path 32 or the bidirectional feed path 39.

When the stopped feeding of the document Gn is resumed and the second front sensor, the rear sensor 54, or the switch-back sensor 55 senses no document, the control unit 60 does not resume the feeding of the document Gn, but returns the arm 29, the pickup roller 33, the separation roller 34, and the like to the initial state. Accordingly, when no document Gn exist in the document feed path 32 or the bidirectional feed path 39 at the time of resuming the feeding, it is possible to prevent the feed roller 35A to 35D and the reversible rollers from being driven uselessly. Therefore, it is possible to rapidly return the ADF 3 to the initial state after resuming the feeding.

According to the image scanner 1, when the stopped feeding of the document Gn is resumed and the control unit 60 determines, on the basis of the feeding mode information and the scanning status information, that the feeding of the document Gn is stopped in the status during first or second side scanning in the double-sided scanning feeding mode, the control unit resumes the feeding so as to guide the document Gn to the bidirectional feed path 39 with the guide flap 50 in the second guiding posture. Accordingly, it is possible to discharge the document Gn stopped due to the stop of feeding without damaging the document Gn due to the guide flap 50.

When the stopped feeding of the document Gn is resumed and the control unit 60 determines, on the basis of the feeding mode information and the scanning status information, that the feeding of the document Gn is stopped in the status during switch-back feeding after first or second side scanning in the double-sided scanning feeding mode, the control unit resumes the switch-back feeding by allowing the motor 67 to rotate in the same rotation direction as the rotation direction indicated by the rotation direction information. The switch-back feeding is performed successively to the stopped portion of the switch-back feeding and the document Gn stopped in the status during switch-back feeding after first or second side scanning is fed in the switch-back manner, thereby discharging the document to the document discharge tray 31 from the document feed path 32.

In this aspect, the document Gn is discharged to the document discharge tray 31 with the first side downward by completing the switch-back feeding of the document stopped in the status during switch-back feeding. However, when the stopped feeding is resumed, the feeding mode information read by the control unit 60 is the double-sided scanning feeding mode and the scanning status information is the status during switch-back feeding of the document Gn, the document Gn may be discharged to any one of the end 41 of the bidirectional feed path 39 and the document discharge tray 31, by allowing the motor 67 to rotated in the CW direction or the CCW direction so as to be equal to the rotation direction indicated by the read rotation direction information. For example, when the motor 67 rotates in the CW direction so as to allow the reversible roller 43 to rotate in the return direction, the document Gn returned to the document feed path 32 is discharged to the document discharge tray 31. When the motor 67 rotates in the CCW direction so as to allow the reversible roller 43 to rotate in the entrance direction, the document Gn may be discharged from the end 41 of the bidirectional feed path 39 without completing the switch-back feeding.

Hereinafter, an example that the document Gn is discharged from the end 41 of the bidirectional feed path 39 will be described. As shown in FIG. 34, after the trailing end in the feeding direction of the document G1 passes through the intersection position 40 of the bidirectional feed path 39 and completely enters the end 41 side, the control unit 60 switches the rotation of the motor 67 from the CCW rotation to the CW rotation. The trailing end of the document G1 passes through the intersection position 40 in a predetermined time after the switch-back sensor 55 is turned off by sensing the trailing end of the document G1 fed in the bidirectional feed path 39. When the control unit 60 determines that the trailing end in the feeding direction of the document G1 completely enters the end 41 side through the intersection position 40 of the bidirectional feed path 39 on the basis of the detection signal of the switch-back sensor 55 and the counted feeding distance or feeding time of the feed roller 35D and the reversible roller 43, the control unit switches the rotation of the motor 67 from the CCW rotation to the CW rotation.

Figure 42:
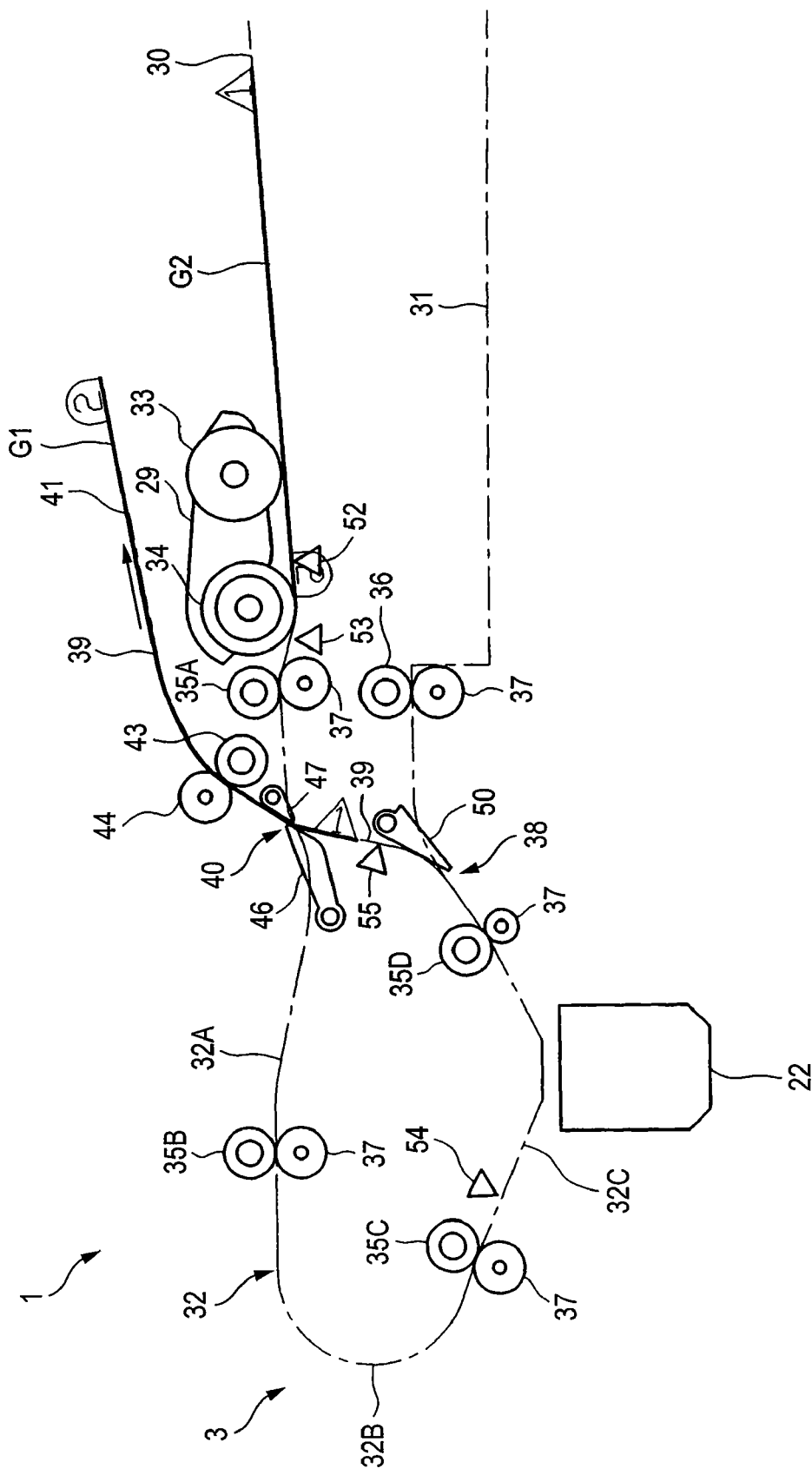
FIG. 42 is a schematic diagram illustrating an image scanning operation in the double-sided scanning mode.

As shown in FIG. 42, when the feeding of the document is stopped after the switch-back sensor 55 senses the trailing end in the feeding direction of the document G1 and before the rotation of the motor 67 is switched, the management whether the trailing end in the feeding direction of the document G1 passes through the intersection position 40 of the bidirectional feed path 39 is stopped. When the feeding of the document G1 is stopped, the control unit 60 cuts off the transmission of the driving power from the motor 67 to the reversible roller 43 so as to facilitate the jam process of removing the document G1 nipped by the reversible roller 43 and the pinch roller 44.

Specifically, when a "stop" key for stopping the feeding is pressed, the control unit 60 allows the motor 67 rotating in the CCW direction to slightly rotate in the CW direction. Accordingly, the plane gear 158 of the sun-and-planet gear 153 revolves in the CW direction and disengages from the large-diameter gear 167L of the transmission gear 167. Then, by stopping the CW rotation of the motor 67 before the planet gear 157 engages with the large-diameter gear 167L, the planet gears 157 and 158 all are in the disengagement status and thus the driving power is transmitted to the driven gear 168.

In this way, when the control unit 60 allows the motor 67 to slightly rotate in the CW direction to allow the planet gears 157 and 158 to revolve, it is difficult to accurately count the feeding distance or feeding time of the feed roller 35D and the reversible roller 43 after the switch-back sensor 55 senses the trailing end in the feeding direction of the document G1. That is, the control unit 60 need perform a complex control of calculating the feeding distance at the time of resuming the feeding including an amount of CW rotation, an amount of revolving of the planet gears 157 and 158, an error due to backlash, and the like after stopping the CW rotation of the motor 67 and the feeding failure of the document G1 due to the control error can more easily occur as the feeding distance from the switch-back sensor 55 to the reversible roller 43.

Figure 43:
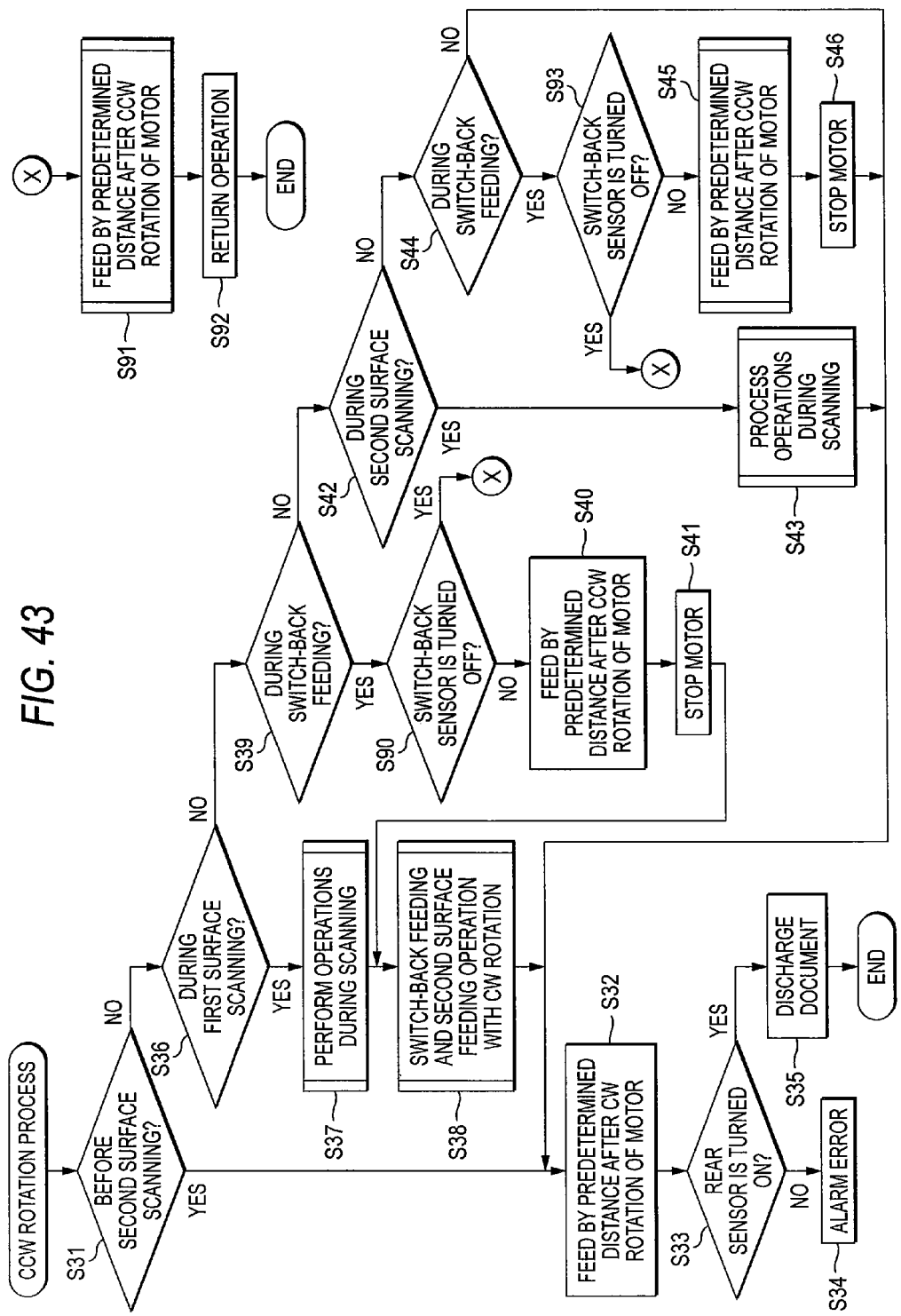
FIG. 43 is a flowchart illustrating a CCW rotating operation.

Accordingly, as shown in FIG. 43, the control unit 60 determines whether the switch-back sensor 55 is turned off (S90) after determining that the document Gn is in the status during switch-back feeding after first side scanning (S39; Y). When the switch-back sensor 55 is turned off (S90: Y), the control unit 60 can determine that the feeding of the document is stopped after the switch-back sensor 55 senses the trailing end in the feeding direction of the document G1 and before the rotation of the motor 67 is switched to the CW rotation from the CCW rotation. In this case, the control unit 60 allows the motor 67 to rotate in the CCW direction so as to feed the document G1 by a predetermined distance (S91). The predetermined distance by which the document G1 is fed is set larger than the feeding distance from the switch-back sensor 55 of the bidirectional feed path 39 to the end 41. Accordingly, the document G1 stopped at the position shown in FIG. 42 is fed in the entrance direction in the bidirectional feed path 39 by the resuming of feeding and is discharged externally from the end 41. Thereafter, the control unit 60 performs the return operation of returning the ADF 3 to the initial state (S92), similarly to the above-mentioned return operation (S30).

On the other hand, when the switch-back sensor 55 is in the On state (S90, N), as described above, the control unit 60 feeds the document Gn by a predetermined distance (S40) by allowing the motor 67 to rotate in the CCW direction. Thereafter, the control unit 60 stops the motor 67 (S41) and performs the switch-back feeding and second side feeding operation with the CW rotation (S38). In this operation, the document Gn is fed in the switch-back manner and is returned to the document feed path 32 from the intersection position 40, is fed in the document feed path 32 with the second side opposed to the scanning position, and is fed to the bidirectional feed path 39 again. Then, the trailing end in the feeding direction completely enters the end 41 side of the bidirectional feed path 39 through the intersection position 40 and the reversible roller 43 and the pinch roller 44 are stopped in the state where they nip the document Gn.

Subsequently, when the control unit 60 allows the motor 67 to rotate in the CW direction (S32), the reversible roller 43 rotates in the return direction and the feed rollers 35A to 35D rotate in the feeding direction. Accordingly, the leading end and the trailing end are reversed and then the document Gn is returned to the document feed path 32 from the intersection position 40. As a result, the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S33: Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S35). Accordingly, the document Gn stopped in the document feed path 32 in the status during switch-back feeding after first side scanning due to the stop of feeding can be discharged to the document discharge tray 31 with the first side thereof downward.

As shown in FIG. 43, the control unit 60 determines whether the switch-back sensor 55 is turned off (S93) after determining that the document Gn is in the status during switch-back feeding after first side scanning (S44: Y) as described above. When the switch-back sensor 55 is turned off (S93: Y), the control unit 60 allows the motor 67 to rotate in the CCW direction so as to feed the document G1 by a predetermined distance (S91). Accordingly, the document G1 stopped at the position shown in FIG. 42 in the status after second side scanning is fed in the entrance direction in the bidirectional feed path 39 by the resuming of feeding and is discharged externally from the end 41. Thereafter, the control unit 60 performs the return operation of returning the ADF 3 to the initial state (S92), similarly to the above-mentioned return operation (S30).

On the other hand, when the switch-back sensor 55 is in the On state (S93: N), as described above, the control unit 60 feeds the document Gn by a predetermined distance (S45) by allowing the motor 67 to rotate in the CCW direction. Thereafter, when the control unit 60 stops the motor 67 (S46), the trailing end in the feeding direction of the document Gn completely enters the end 41 side of the bidirectional feed path 39 through the intersection position 40 and the reversible roller 43 and the pinch roller 44 are stopped in the state where they nip the document Gn.

Subsequently, when the control unit 60 allows the motor 67 to rotate in the CW direction (S32), the reversible roller 43 rotates in the return direction and the feed rollers 35A to 35D rotate in the feeding direction. Accordingly, the leading end and the trailing end are reversed and then the document Gn is returned to the document feed path 32 from the intersection position 40. As a result, the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S33: Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S35). Accordingly, the document Gn stopped in the document feed path 32 in the status during switch-back feeding after second side scanning due to the stop of feeding can be discharged to the document discharge tray 31 with the first side thereof downward.

In this way, in the stop of feeding and the resuming of feeding, the control unit 60 can reliably discharge the document G1 remaining in the bidirectional feed path 39 externally without performing the management of the feeding distance or feeding time after the switch-back sensor 55 senses the trailing end in the feeding direction of the document G1.

As described above, the document Gn is discharged through the end 41 from the bidirectional feed path 39 after the trailing end of the document Gn entering the bidirectional feed path 39 is sensed by the switch-back sensor 55. However, before the trailing end of the document Gn is sensed by the switch-back sensor 55, the document Gn of which the feeding is stopped may be discharged from the end 41 of the bidirectional feed path 39.

As shown in FIG. 5, in the switch-back sensor 55, the shielding portion 58 advances from and retreats to the photo interrupter 57 with the rotation of the detector 56 and thus the photo interrupter 57 is turned on/off. The detector 56 rotates by abutting on the document Gn but the document Gn is fed until the shielding portion 58 departs from the photo interrupter 57 and is turned on after the detector 56 rotates by abutting the document Gn. Accordingly, until the switch-back sensor 55 is turned off after the trailing end of the document Gn is separated from the detector 56, a slight time lag occurs by the rotation of the detector 56. The control unit 60 monitors the feeding distance of the document Gn and determines the time when the rotation direction of the motor 67 is changed, by considering the time lag.

Figure 44:
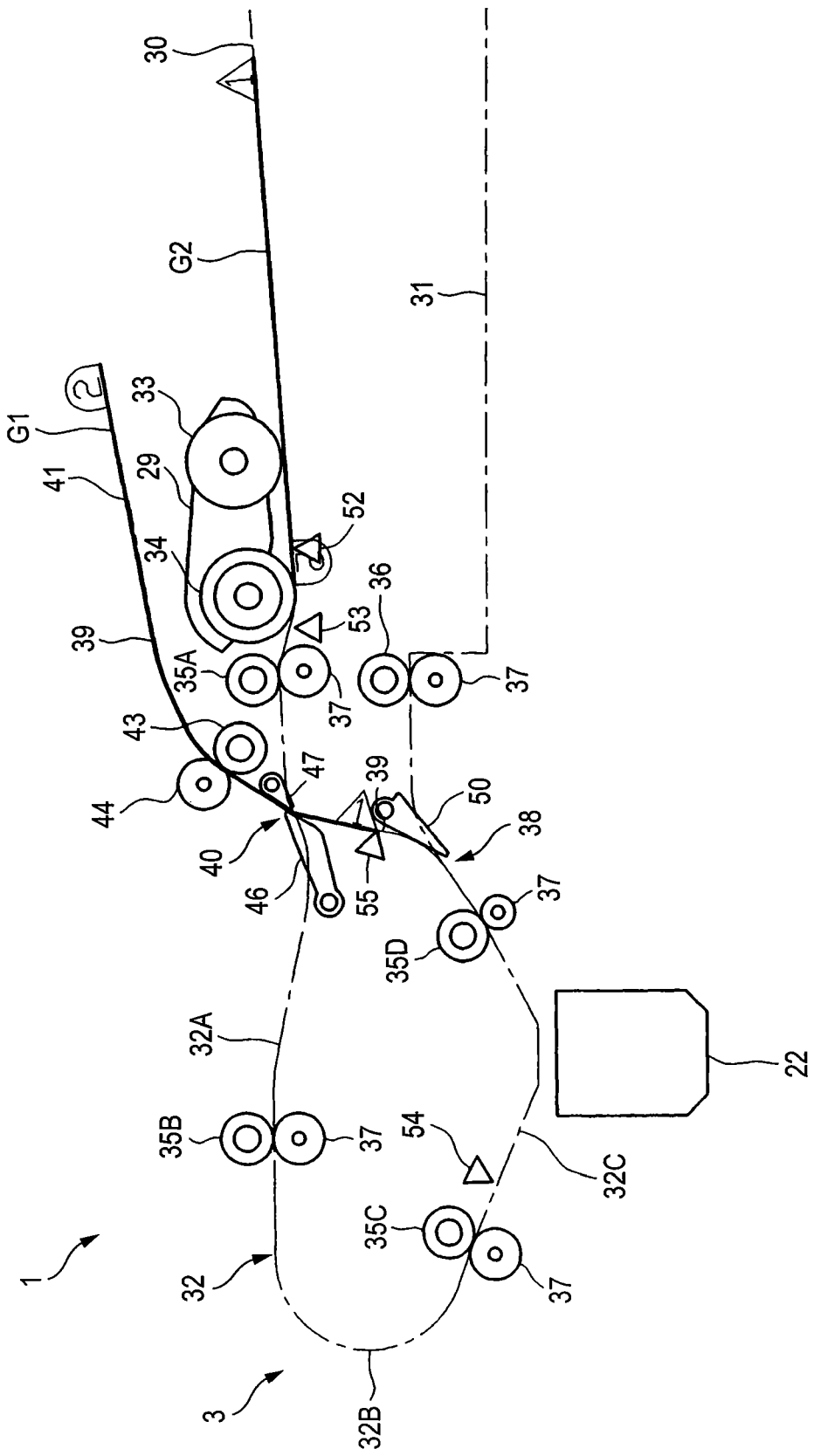
FIG. 44 is a schematic diagram illustrating an image scanning operation in the double-sided scanning mode.

As shown in FIG. 44, the trailing end of the document G1 may be stopped at the position of the switch-back sensor 55 due to the stop of feeding. That is, the trailing end of the document G1 abuts on the detector 56 of the switch-back sensor 55, but the document G1 is stopped in the state where the switch-back sensor 55 is not turned off. When the feeding is resumed in this state, the trailing end of the document G1 is sensed by the switch-back sensor 55 at once. That is, the switch-back sensor 55 is turned off at once. However, right after resuming the feeding, by considering that the rotation speed of the motor 67 is not stable and the detector 56 of the switch-back sensor 55 may rotate to the extent that the sensor is not turned off, it can be necessarily said that the document G1 is fed at a constant speed and the time lag when the trailing end is sensed by the switch-back sensor 55 occurs. Due to the variation in time lag, the rotation direction of the motor 67 may be switched before the trailing end of the document G1 passes through the intersection position 40 or the motor 67 may be stopped after the trailing end of the document G1 passes through the nip position between the reversible roller 43 and the pinch roller 44. On the contrary, when the document G1 enters the bidirectional feed path 39 and the feeding is stopped before the trailing end of the document G1 is sensed by the switch-back sensor 55, the problem due to the variation in time lag does not occur by discharging the document G1 from the bidirectional feed path 39 after the resuming of feeding.

Hereinafter, an example in which the document Gn is discharged from the end 41 of the bidirectional feed path 39 before the trailing end of the document Gn is sensed by the switch-back sensor 55 (in the status during switch-back feeding) will be described. FIGS. 45 to 48 are flowcharts illustrating operations of the resuming of feeding after the stop of feeding. The control unit 60 reads out the feeding mode information, the scanning status information, and the rotation direction information stored in the RAM 63 at the time of resuming the feeding. As described above, the feeding mode information indicates any one of the single-sided scanning mode and the double-sided scanning mode input at the time of performing the image scanning. In the single-sided scanning mode, as described above, even when the document Gn is located at any position in the document feed path 32, the document Gn stopped in the document feed path 32 is discharged to the document input tray 31 by allowing the motor 67 to rotate in the CW direction and feeding the document Gn by a predetermined distance at the time of resuming the feeding.

In the double-sided scanning mode, the operation for discharging the document Gn varies depending on the scanning status and the position in which the document Gn is stopped in the document feed path 32 or the bidirectional feed path 39. The operation at the time of resuming the feeding in the double-sided scanning mode will be described in detail below. The feeding resuming operation after the feeding of the document Gn is stopped includes the operation of automatically discharging the document Gn at the time of emergently stopping or compulsorily ending the feeding of the document Gn.

The scanning status information is the On/Off history of the rear sensor 54 and the switch-back sensor 55, which is stored in the RAM 63, the variable indicating "the end of first side scanning" or "the end of second side scanning", and the history of commands to the motor 67. On the basis thereon, the CPU 61 determines which of a status before first side scanning, a status during first side scanning, a status during switch-back feeding after first side scanning, a status during second side scanning, a status during switch-back feeding after second side scanning, and a status after second side feeding the feeding status is by the use of a control program stored in the ROM 62. The rotation direction information is the history of commands to the motor 67m which is stored in the RAM 63, and the CPU 61 determines the rotation direction of the motor right before the feeding is stopped by the control program stored in the ROM 62 on the basis of the history.

As described above, the document Gn fed from the document input tray 30 is sensed by the rear sensor 54 on the upstream side in the feeding direction of the scanning position. Accordingly, the control unit 60 can determine that a status until the rear sensor 54 is first turned off after the command for CW rotation of the rotor 67 is the status before first side scanning, on the basis of the scanning status information stored in the RAM 63.

The rear sensor 54 is changed to the On state by sensing the leading end in the feeding direction of the document Gn and the first side of the document Gn is subjected to the image scanning operation by the image scanning unit 22. The leading end in the feeding direction of the document Gn being subjected to the image scanning of the first side enters the bidirectional feed path 39 from the document feed path 32 and is sensed by the switch-back sensor 55. When the document Gn is further fed, the rear sensor 54 is changed to the Off state by sensing the trailing end in the feeding direction of the document Gn and the switch-back sensor 55 is changed to the Off state by sensing the trailing end in the feeding direction of the document Gn. Accordingly, the control unit 60 can determine that a status until the switch-back sensor is changed to the Off state after the rear sensor 54 is changed to the On state is the status during first side scanning, on the basis of the scanning status information stored in the RAM 63. In this aspect, a predetermined feeding distance until the image scanning of the document Gn is actually started or ended after the rear sensor 54 is turned on/off is not considered. However, by considering the predetermined feeding distance, the status until the rear sensor 54 is turned off and the document Gn is fed to the scanning position by a predetermined distance after the rear sensor 54 is turned on and the document Gn is fed to the scanning position by a predetermined distance may be determined as the status during first side scanning.

When the first side scanning operation is ended, a variable indicating "first side scanning end" is recorded in the RAM 63. The document Gn of which the first side has been scanned enters the bidirectional feed path 39. The switch-back sensor 55 is changed to the On/Off state by sensing the leading and the trailing end in the feeding direction of the document Gn. When the document Gn is fed by a predetermined distance after the switch-back sensor 55 is changed to the Off state, the motor 67 is stopped. In this state, the document Gn is nipped by the reversible roller 43 and the pinch roller 44. With the rotation of the motor 67, the document Gn is fed in a switch-back manner, is returned to the document feed path 32 from the intersection position 40, is fed by a predetermined distance, and then is stopped to switch the rotation of the motor 67 to the CCW rotation. Accordingly, the control unit 60 can determine that the variable is the "first side scanning end" and that a status until the rotation of the motor 67 is switched from the CCW rotation to the CW rotation and then is stopped after the switch-back sensor 55 is changed to the On/Off state is the status during switch-back feeding after first side scanning, on the basis of the scanning status information stored in the RAM 63.

The document Gn returned to the document feed path 32 is sensed again by the rear sensor 54 on the upstream side in the feeding direction of the scanning position. Then, similarly to the first side scanning operation, when the document Gn being subjected to the second side scanning is fed, the rear sensor 54 is changed to the Off state by sensing the trailing end in the feeding direction of the document Gn and the switch-back sensor 55 is changed to the Off state by sensing the trailing end in the feeding direction of the document Gn. Accordingly, the control unit 60 can determine that the variable is the "first side scanning end" and a status until the switch-back sensor 55 is changed to the Off state after the rear sensor 54 is changed to the On state is the status during second side scanning, on the basis of the scanning status information stored in the RAM 63. In this aspect, a predetermined feeding distance until the image scanning of the document Gn is actually started or ended after the rear sensor 54 is turned on/off is not considered. However, by considering the predetermined feeding distance, the status until the rear sensor 54 is turned off and the document Gn is fed to the scanning position by a predetermined distance after the rear sensor 54 is turned on and the document Gn is fed to the scanning position by a predetermined distance may be determined as the status during first side scanning.

When the second side scanning operation is ended, a variable indicating "second side scanning end" is recorded in the RAM 63. The document Gn of which the second side has been scanned enters the bidirectional feed path 39 and is fed in the switch-back manner as described above. Accordingly, the control unit 60 can determine that the variable is the "second side scanning end" and that a status until the rotation of the motor 67 is switched from the CCW rotation to the CW rotation and then is stopped after the switch-back sensor 55 is changed to the on/Off state is the status during switch-back feeding after second side scanning, on the basis of the scanning status information stored in the RAM 63.

Incidentally, the status before first side scanning, the status during first side scanning, and the status during switch-back scanning after first side scanning correspond to the status during first side feeding. The status during second side scanning and the status during switch-back feeding after second side scanning correspond to the status during second side feeding.

Figure 45:
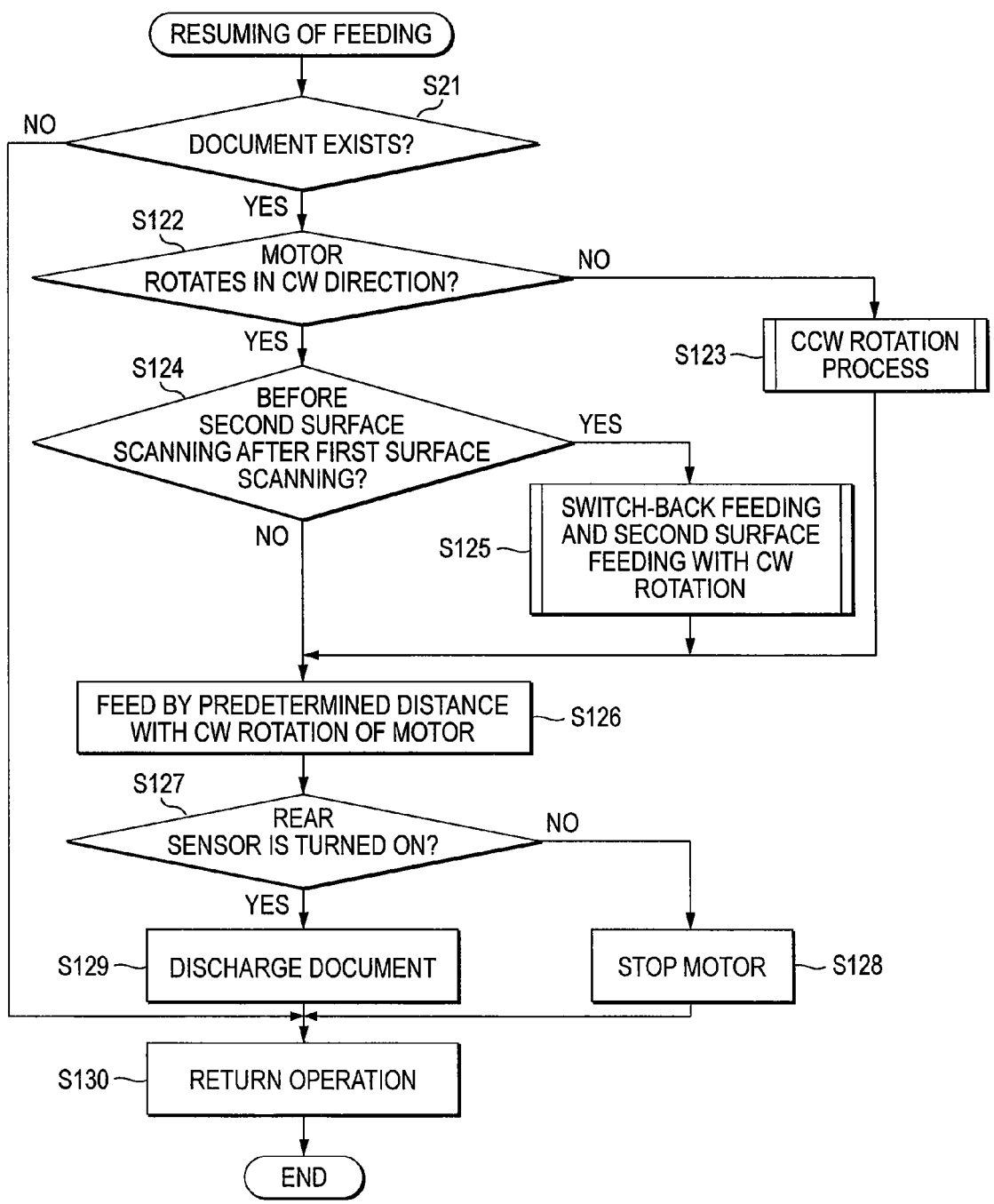
FIG. 45 is a flowchart illustrating an operation of resuming the feeding.

As shown in FIG. 45, the control unit 60 determines whether a document remains in the document feed path 32 or the bidirectional feed path 39 of the ADF 3 at the time of resuming the stopped feeding (S121). For example, when the feeding is stopped due to the emergency stop or the turn-off, it is considered that a document in feeding remains in the document feed path 32 or the bidirectional feed path 39. On the other hand, when the feeding is stopped due to the paper jam and the stopped document Gn is removed by the jam process or the like, it is considered that no document Gn remains in the document feed path 32 or the bidirectional feed path 39.

When a document in feeding remains in the document feed path 32 or the bidirectional feed path 39, any one of the second front sensor 53, the rear sensor 54, and the switch-back sensor 55 is turned on. Accordingly, the control unit 60 determines that a document remains when one of the sensors is turned on and determined that no document remains when all the sensors are turned off. Incidentally, in order to determine existence of a document at the time of resuming the feeding, an additional sensor may be provided in the document feed path 32 or the bidirectional feed path 39 in addition to the second front sensor 53, the rear sensor 54, and the switch-back sensor 55.

When determining that a document remains (S121:Y), the control unit 60 drives the motor 67 to discharge the remaining document Gn. The detailed operation thereof will be described later. On the other hand, when determining that no document remains (S121: N), the control unit 60 performs a return operation (S130). The return operation means that after the feeding of the document Gn is ended, the rotation of the motor 67 is switched from the CW rotation to the CCW rotation and the pickup solenoid 88 is turned on to raise the arm 29 and the document is returned to the initial status in which the document Gn being subjected to the image scanning can be inserted until it abuts on the separation roller 34 through the lower side of the pickup roller 33. Accordingly, when no document Gn remains in the document feed path 32 or the bidirectional feed path 39, the initial status can be rapidly returned without uselessly driving the motor 67, the feed rollers 35A to 35D, the reversible roller 43, and the like.

When determining that a document remains (S121:Y), the control unit determines the rotation direction of the motor 67 right before the feeding is stopped, on the basis of the rotation direction information stored in the RAM 63. When the rotation direction of the motor 67 is the CW direction (S122: Y), it is one of the status before first side scanning, the status during switch-back feeding after first side scanning, the status during switch-back feeding after second side scanning, and the status after second side feeding. On the other hand, the rotation direction of the motor 67 is the CCW direction (S122: N), all the scanning statuses can be considered.

When the rotation direction of the motor 67 is the CW direction (S122: Y), the control unit 60 determines whether the feeding is in the status after first side scanning and before second side scanning (S124: N). When the variable stored in the RAM 63 indicates the "first side scanning end", the control unit 60 determines that the feeding is in the status after first side scanning and before second side scanning (S124:Y). When the variable is otherwise, the control unit determines that the feeding is not in the status after first side scanning and before second side scanning (S124: N).

When the feeding is not in the status after first side scanning and before second side scanning (S124: N), the control unit 60 determines that the scanning status is one of the status before first side scanning, the status during switch-back feeding after second side scanning, and the status after second side feeding. In the status before first side scanning, the document Gn is stopped in the status before the leading end in the feeding direction thereof reaches the rear sensor 54, when the document is picked up from the document input tray 30 and then is being fed with the transmission of the CW rotation of the motor 67 to the feed rollers 35A to 35D through the driving power transmission mechanisms 120 and 150. In the status during switch-back feeding after second side scanning, the document Gn is stopped when the document is being returned to the document feed path 32 from the bidirectional feed path 39 with the transmission of the CW rotation of the motor 67 to the feed rollers 35A to 35D and the reversible roller 43 through the driving power transmission mechanisms 120 and 150 in the switch-back feeding after the document is fed with the second side thereof opposed to the scanning position. In the status after second side feeding, the document Gn is stopped when the document is being fed in the document feed path 32 with the first side thereof opposed to the scanning position with the transmission of the CW rotation of the motor 67 to the feed rollers 35A to 35D a through the driving power transmission mechanism 120 after the second switch-back feeding is ended. In these cases, the control unit 60 allows the motor 67 to rotate in the CW direction (S126). Accordingly, the feeding of the document Gn is resumed from the status during feeding due to the CW rotation.

With the transmission of the CW rotation of the motor 67, the feed rollers 35A to 35D rotate in the feeding direction and the reversible roller 43 rotates in the return direction. With the transmission of the CW rotation of the motor 67, the guide flap 50 is in the first guiding posture. When the document Gn is fed in the document feed path 32 by a predetermined distance with the first side thereof opposed to the scanning position, the document is sensed by the rear sensor 54. When the rear sensor 54 is turned on (S127: Y), the control unit 60 can determine that the stopped document Gn is normally fed. When the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S129). Accordingly, the document Gn stopped in the document feed path 32 in the status before first side scanning, the status during switch-back feeding after second side scanning, or the status after second side feeding due to the stop of feeding can be discharged to the document discharge tray 31 with the first side thereof downward. Thereafter, the control unit 60 performs the same return operation as described above (S130). Accordingly, the ADF 3 is returned to the initial state.

Figure 46:
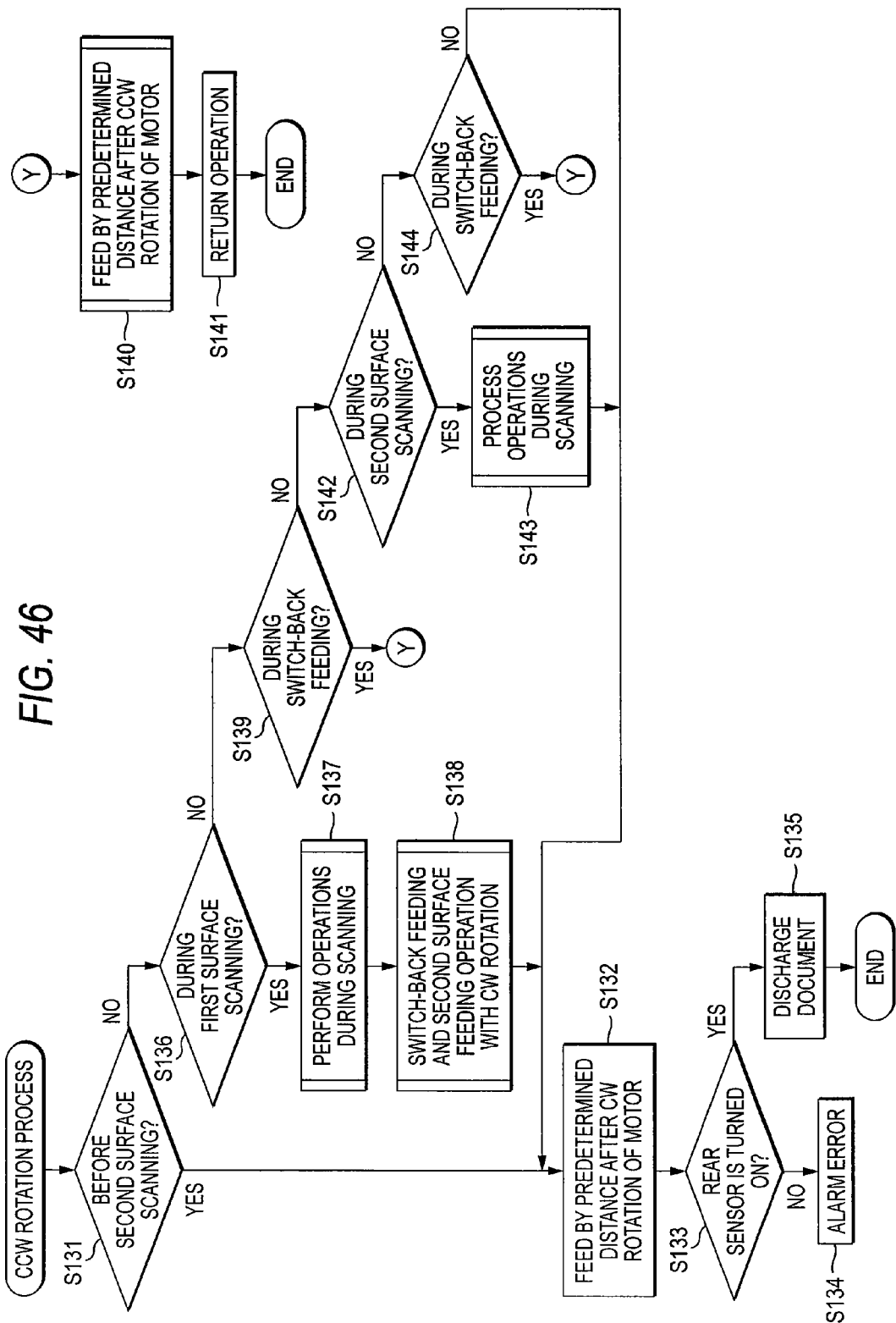
FIG. 46 is a flowchart illustrating a CCW rotating operation.

When determining that a document remains (S121:Y) and that the rotation direction of the motor 67 right before the stop of feeding is the CCW direction (S122: N), the control unit performs the CCW rotation operation (S123). FIG. 46 is a flowchart illustrating the CCW rotation operation. First, the control unit 60 determines whether the document Gn is in the status before first side scanning, on the basis of the scanning status information stored in the RAM 63 (S131).

When the document Gn is in the status before first side scanning, it can be determined that the document Gn is stopped in the status before the leading end in the feeding direction reaches the rear sensor 54, when the document is picked up from the document input tray 30 and then is being fed with the transmission of the CW rotation of the motor 67 to the feed rollers 35A to 35D through the driving power transmission mechanism 120. In this case, the control unit 60 allows the motor 67 to rotate in the CW direction (S132). The feed rollers 35A to 35D rotate in the feeding direction with the transmission of the CW rotation of the motor 67 and the document Gn is fed in the feeding direction in the document feed path 32. With the transmission of the CW rotation of the motor 67, the guide flap 50 is in the first guiding posture.

When the document Gn is fed in the document feed path 32 by a predetermined distance, the document is sensed by the rear sensor 54. When the rear sensor 54 is turned on (S133:Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S135). Accordingly, the document Gn stopped in the document feed path 32 in the status before first side scanning due to the stop of feeding can be discharged to the document discharge tray 31 with the first side thereof downward.

After performing the CCW rotation operation (S123), the control unit 60 performs the CW rotation operation to the motor 67 (S126). Since the document Gn is already discharged to the document discharge tray 31, the rear sensor 54 is not turned on even when the motor 67 rotates in the CW direction by a predetermined distance (S127: N). In this case, the control unit 60 stops the rotation of the motor 67 (S128) and performs the return operation (S130).

When determining that the document Gn is not in the status before first side scanning (S131: N), the control unit subsequently determines whether the document is in the status during first side scanning (S136). When the document is in the status during first side scanning (S136: Y), it can be determined that the document Gn is picked up from the document input tray 30 and then is stopped when it is being fed with the first side opposed to the scanning position. In this case, the control unit 60 performs an operation during scanning (S137) and then performs the switch-back feeding and second side feeding operation with the CW rotation (S138).

Figure 47:
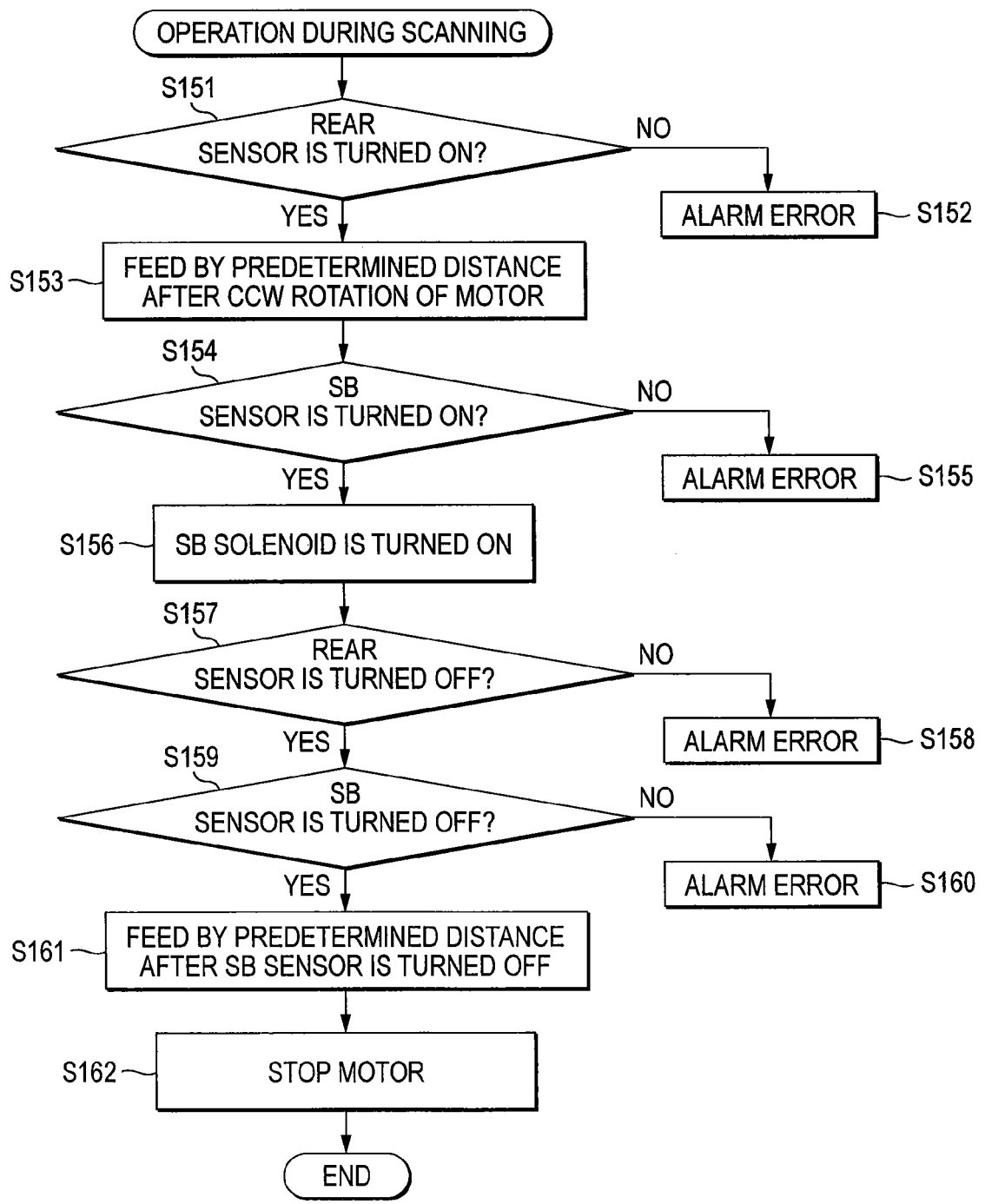
FIG. 47 is a flowchart illustrating an operation after the course of the scanning operation.

FIG. 47 is a flowchart illustrating the operation during scanning. First, the control unit 60 determines whether the rear sensor 54 is turned on (S151). Since the document Gn is stopped in the status during first side scanning, the rear sensor 54 may be turned on. Accordingly, when the rear sensor 54 is not in the On state (S151: N), the control unit 60 determines that some failure occurs and performs an error alarm (S152) by displaying an error on the liquid crystal display unit 12 of the operation panel or ringing an error alarm.

When the rear sensor 54 is in the On state (S151: Y), the control unit 60 allows the motor 67 to rotate in the CCW direction in order to guide the document Gn at the scanning position. The feed rollers 35A to 35D feed the document Gn in the feeding direction with the transmission of the CCW rotation of the motor 67. The guide flap 50 maintains the second guiding posture. When the feeding of the document Gn is stopped in the status during first side scanning, the leading end in the feeding direction of the document Gn passes through the scanning position toward the connection position 38. Accordingly, even when the feeding is stopped in the state where the leading end in the feeding direction of the document Gn is entering the bidirectional feed path 39 from the connection position 38, the control unit 60 allows the motor 67 to rotate in the CCW direction and resumes the feeding with the guide flap 50 in the second guiding posture. Accordingly, the guide flap 50 is changed to the first guiding posture, thereby preventing damaging the document Gn during the stop of feeding. In this way, whether the leading end in the feeding direction of the document Gn of which the feeding is stopped in the status during second side scanning reaches the connection position 38, the document Gn is fed to the bidirectional feed path 39 as shown in FIG. 33.

The leading end in the feeding direction of the document Gn fed to the bidirectional feed path 39 is sensed by the switch-back sensor 55. When the switch-back sensor 55 is not turned on (S154: N), the control unit 60 determines that some failure occurs and performs an error alarm (S155) by displaying an error on the liquid crystal display unit 12 of the operation panel or ringing an error alarm. When the switch-back sensor 55 is turned on (S154: Y), the control unit 60 turns on the switch-back solenoid 161 (S156). Accordingly, as shown in FIG. 18, the driving power is transmitted to the reversible roller 43 from the motor 67 through the driving power transmission mechanism 150 and thus the reversible roller 43 rotates in the entrance direction.

The leading end in the feeding direction of the document Gn entering the end 41 side of the bidirectional feed path 39 from the intersection position 40 is nipped by the reversible roller 43 and the pinch roller 44 and then is further fed toward the end 41. When the rear sensor 54 is turned off (S157: Y) by sensing the trailing end in the feeding direction of the document Gn and the switch-back sensor 55 is turned off (S159: Y) by sensing the trailing end in the feeding direction of the document Gn, the control unit 60 feeds the document Gn by a predetermined distance (S161) and then stops the motor 67 (S162). Accordingly, as shown in FIG. 34, the document Gn is stopped in the status where the trailing end in the feeding direction completely enters the end 41 side of the bidirectional feed path 39 through the intersection position 40 and the document Gn is nipped by the reversible roller 43 and the pinch roller 44. In this course of feeding, when the rear sensor 54 is not turned off (S157: N) or when the switch-back sensor 55 is not turned on (S159: N), the control unit 60 determines that some failure occurs and thus performs an error alarm (S158, S160). Thereafter, the control unit 60 performs the switch-back feeding and second side feeding operation with the CW rotation.

Figure 48:
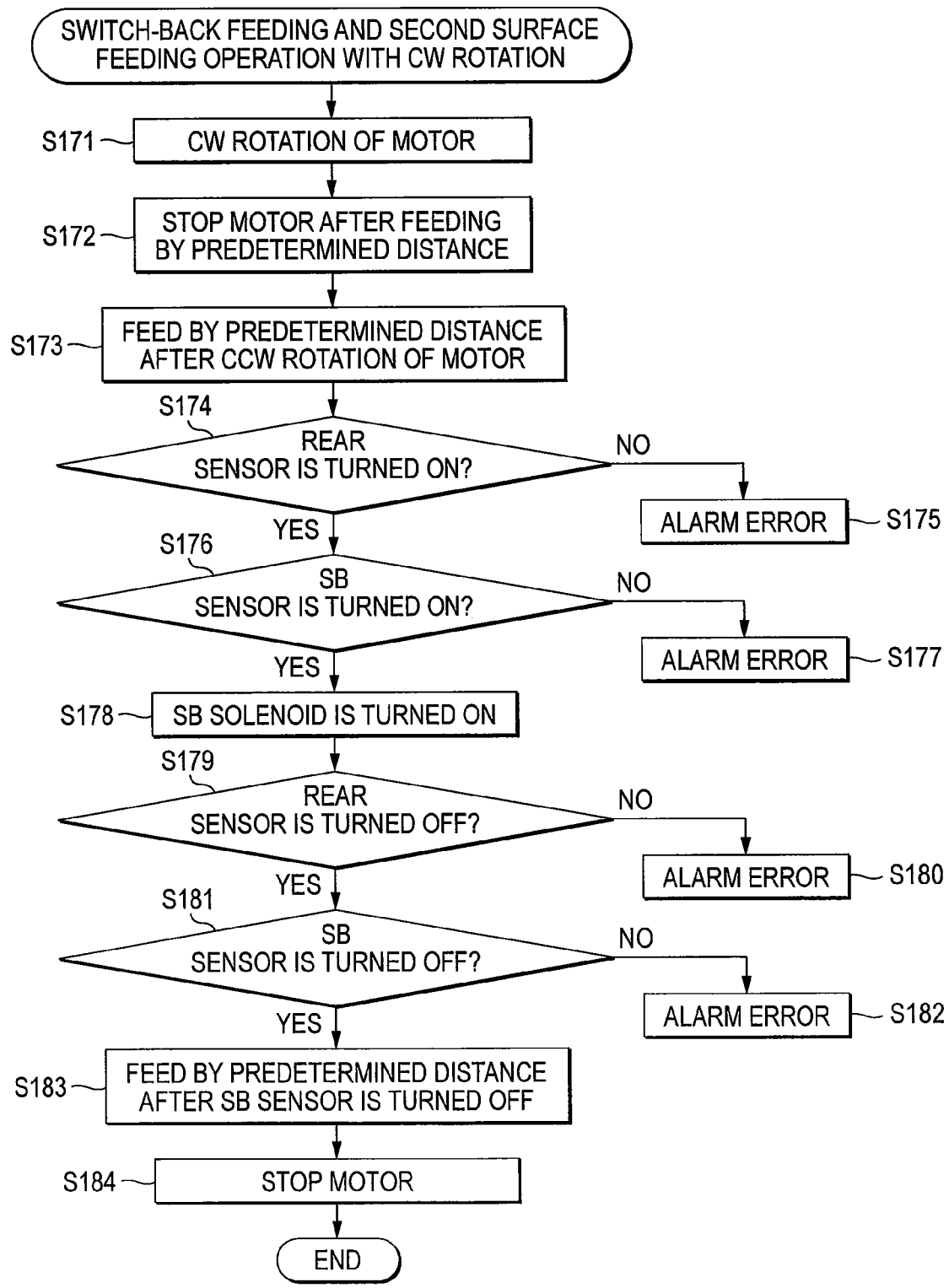
FIG. 48 is a flowchart illustrating a switch-back feeding operation and a second side feeding operation with the CCW rotating operation.
Figure 49:
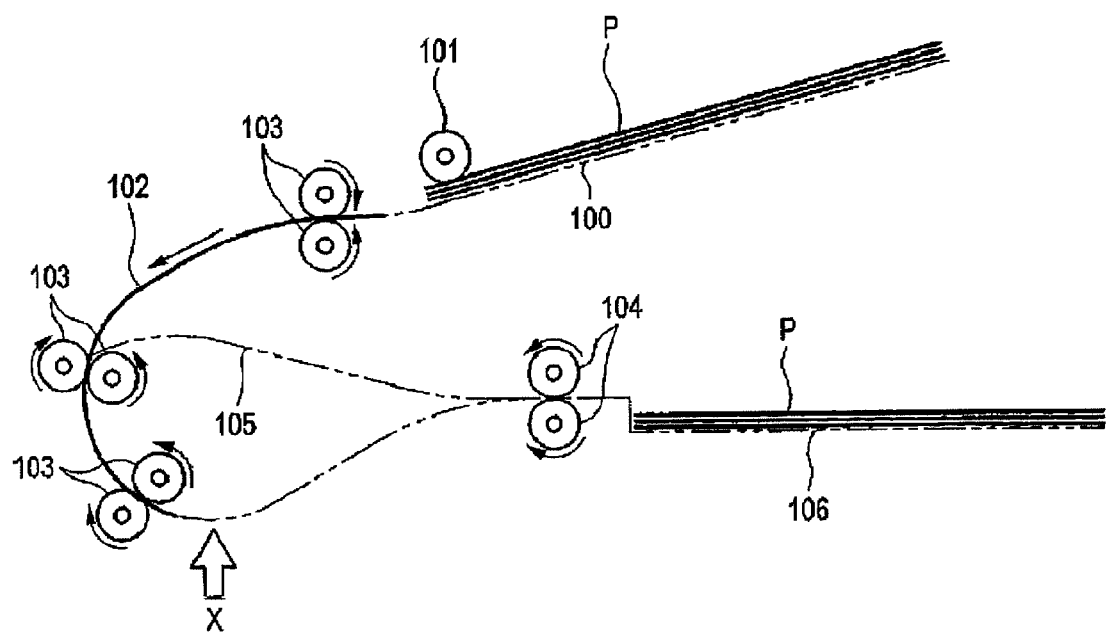
FIG. 49 is a schematic diagram illustrating a document feeding operation for double-sided scanning in a conventional document feeder.
Figure 50:
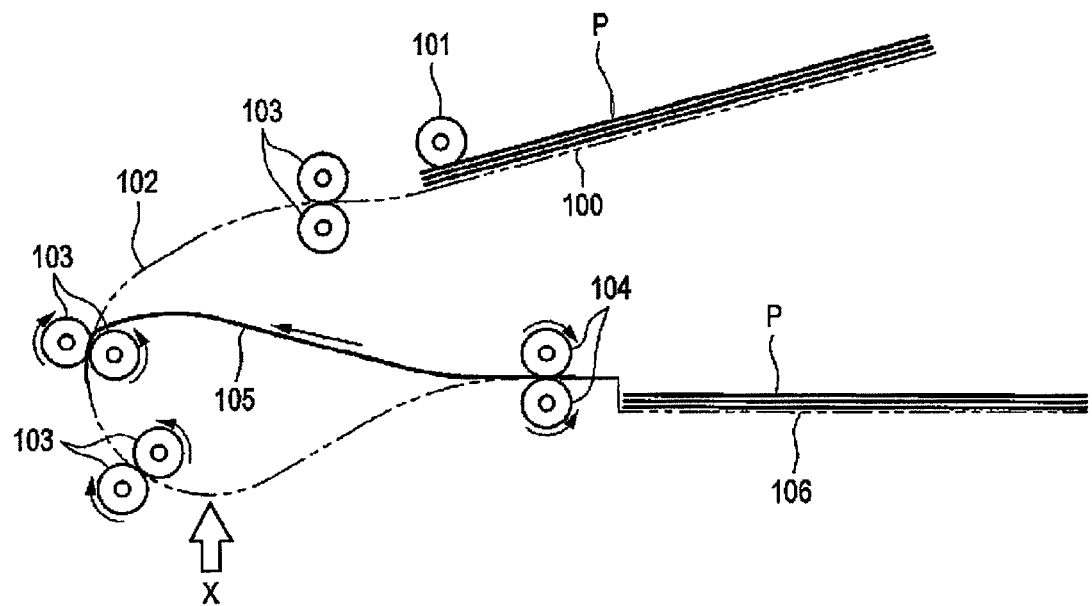
FIG. 50 is a schematic diagram illustrating a document feeding operation for double-sided scanning in a conventional document feeder.

FIG. 48 is a flowchart illustrating the switch-back feeding and second side feeding operation with the CW rotation. First, the control unit 60 allows the motor 67 to rotate in the CW direction (S171). Accordingly, the reversible roller 43 rotates in the return direction and thus the document Gn is fed in the switch-back manner and is returned to the document feed path 32 from the intersection position as shown in FIG. 35. As a result, the leading end and the trailing end of the document Gn are reversed and the document Gn is returned to the document feed path 32 with the second side thereof opposed to the scanning position. By continuously performing the CW rotation, the leading end in the feeding direction of the returned document Gn is nipped by the feed roller 35B and the pinch roller 37 and is fed in the document feed path 32.

The control unit 60 feeds the document Gn by a predetermined distance with the CW rotation and then stops the rotation of the motor 67 (S172). The control unit 60 allows the motor 67 to rotate in the CCW direction (S173). By switching the rotation of the motor 67 from the CW rotation to the CCW rotation, as shown in FIG. 16, the transmission of the driving power to the reversible roller 43 through the driving power transmission mechanism 150 is cut off. Even when the rotation direction of the motor 67 is switched, the feed rollers 35A to 35D rotate in the feeding direction. Accordingly, the document Gn returned to the document feed path 32 is fed by the feed rollers 35A to 35D to which the driving power of the motor 67 is transmitted. The guide flap 50 is changed to the second guiding posture with the transmission of the CCW rotation of the motor 67.

When the document Gn is fed in the document feed path 32 by a predetermined distance, the document is sensed by the rear sensor 54 to turn on the rear sensor 54 (S174: Y). The fed document Gn is guided by the guide flap 50 and is fed to the bidirectional feed path 39. The leading end in the feeding direction of the document fed to the bidirectional feed path 39 is sensed by the switch-back sensor 55 to turn on the switch-back sensor 55 (S176: Y). In the course of feeding, when the rear sensor 54 is not turned on (S174: N) or when the switch-back sensor 55 is not turned on (S76: N), the control unit determines that some failure occurs and performs an error alarm (S175, S177).

When the switch-back sensor 55 is turned on (S176: Y) the control unit 60 turns on the switch-back solenoid 161 (S178). Accordingly, as shown in FIG. 18, the driving power is transmitted to the reversible roller 43 from the motor 67 through the driving power transmission mechanism 150 and thus the reversible roller 43 rotates in the entrance direction.

The leading end in the feeding direction of the document Gn entering the end 41 side of the bidirectional feed path 39 from the intersection position 40 is nipped by the reversible roller 43 and the pinch roller 44 and then is further fed toward the end 41. When the rear sensor 54 is turned off (S179: Y) by sensing the trailing end in the feeding direction of the document Gn and the switch-back sensor 55 is turned off (S181: Y) by sensing the trailing end in the feeding direction of the document Gn, the control unit 60 feeds the document Gn by a predetermined distance (S183) and then stops the motor 67 (S184). Accordingly, the document Gn is stopped in the status where the trailing end in the feeding direction completely enters the end 41 side of the bidirectional feed path 39 through the intersection position 40 and the document Gn is nipped by the reversible roller 43 and the pinch roller 44. In this course of feeding, when the rear sensor 54 is not turned off (S179: N) or when the switch-back sensor 55 is not turned on (S181: N), the control unit 60 determines that some failure occurs and thus performs an error alarm (S180, S182). Thereafter, the control unit 60 allows the motor 67 to rotate in the CW direction (S132).

When the control unit 60 allows the motor 67 to rotate in the CW direction (S32), the reversible roller 43 rotates in the return direction and the feed rollers 35A to 35D rotate in the feeding direction. Accordingly, the leading end and the trailing end are reversed and then the document Gn is returned to the document feed path 32 from the intersection position 40. As a result, the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S133: Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S135). Accordingly, the document Gn stopped in the document feed path 32 in the status during first side scanning due to the stop of feeding can be discharged to the document discharge tray 31 with the first side thereof downward.

When determining that the document Gn is not in the status during first side scanning (S136: N), the control unit determines whether the document is in the status during switch-back feeding after first side scanning (S139). When the document is in the status during switch-back feeding (S139: Y), it can be determined that the document Gn is stopped when it is being fed in the switch-back manner in the bidirectional feed path 39 after it is fed with the first side opposed to the scanning position. Since the rotation direction of the motor 67 right before the stop of feeding (S122: N), it can be determined that the document Gn is stopped when it enters the bidirectional feed path 39 in the status during switch-back feeding.

In this case, the control unit 60 feeds the document Gn by a predetermined distance by allowing the motor 67 to rotate in the CCW direction (S140). At this time, it is not considered whether the switch-back sensor 55 is turned off by sensing the trailing end in the feeding direction of the document Gn. The reversible roller 43 rotates in the entrance direction with the transmission of the CCW rotation of the motor 67. The feed rollers 35A to 35D feed the document Gn in the feeding direction. The second guide flap 50 maintains the second guiding posture.

The control unit 60 allows the motor 67 to rotate in the CCW direction and thus feeds the document Gn by a predetermined distance, whereby the document Gn is discharged from the end 41 of the bidirectional feed path 39. The predetermined distance by which the document G1 is fed is set larger than the feeding distance from the rear sensor 54 of the document feed path 32 to the end 41 of the bidirectional feed path 39. Thereafter, the control unit 60 performs the return operation of returning the ADF 3 to the initial state (S141), similarly to the above-mentioned return operation (S130).

When determining that the document Gn is not in the status during switch-back feeding after first side scanning (S139: N), the control unit 60 subsequently determines whether the document is in the status during second side scanning (S142). When the document is in the status during second side scanning (S142: Y), it can be determined that the document is stopped when it is being fed with the second side opposed to the scanning position after the document Gn is fed in the switch-back manner after scanning the first side. In this case, the control unit 60 performs an operation during scanning (S143).

Since the operations during scanning are the same as described above, the detailed description will be omitted. By these operations, the document Gn at the scanning position enters the bidirectional feed path 39, the trailing end in the feeding direction completely enters the end 41 side of the bidirectional feed path 39 through the intersection position 40, and the reversible roller 43 and the pinch roller 44 are stopped in the state where they nip the document Gn. Accordingly, even when the feeding is stopped in the state where the leading end in the feeding direction of the document Gn is entering the bidirectional feed path 39 from the connection position 38, the control unit 60 allows the motor 67 to rotate in the CCW direction and resumes the feeding with the guide flap 50 in the second guiding posture. In this way, whether the leading end in the feeding direction of the document Gn of which the feeding is stopped in the status during second side scanning reaches the connection position 38, the document Gn is fed to the bidirectional feed path 39.

Subsequently, when the control unit 60 allows the motor 67 to rotate in the CW direction (S32), the reversible roller 43 rotates in the return direction and the feed rollers 35A to 35D rotate in the feeding direction. Accordingly, the leading end and the trailing end are reversed and then the document Gn is returned to the document feed path 32 from the intersection position 40. As a result, the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S133:Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S135). Accordingly, the document Gn stopped in the document feed path 32 in the status during second side scanning due to the stop of feeding can be discharged to the document discharge tray 31 with the first side thereof downward.

When determining that the document Gn is not in the status during second side scanning (S142: N), the control unit 60 determine that the document is in the status during switch-back feeding after second side scanning (S144). When the document is in the status during switch-back feeding after second side scanning (S144: Y), it can be determined that the feeding of document is stopped in the status during switch-back feeding in the bidirectional feed path 39 after it is fed with the second side opposed to the scanning position. Since the rotation direction of the motor 67 right before the stop of feeding is the CCW rotation (S122: N), it can be determined that the document Gn is stopped when the document enters the bidirectional feed path 39 in the status during switch-back feeding.

The control unit 60 feeds the document Gn by a predetermined distance by allowing the motor 67 to rotate in the CCW direction (S140). At this time, it is considered whether the switch-back sensor 55 is turned off by sensing the trailing end in the feeding direction of the document Gn. The reversible roller 43 rotates in the entrance direction with the transmission of the CCW rotation of the motor 67. The feed rollers 35A to 35D feed the document Gn in the feeding direction. The second guide flap 50 maintains the second guiding posture.

The control unit 60 allows the motor 67 to rotate in the CCW direction and thus feeds the document Gn by a predetermined distance, whereby the document Gn is discharged from the end 41 of the bidirectional feed path 39. The predetermined distance by which the document G1 is fed is set larger than the distance from the rear sensor 54 of the document feed path 32 to the end 41 of the bidirectional feed path 39. Thereafter, the control unit 60 performs the return operation of returning the ADF 3 to the initial state (S141), similarly to the above-mentioned return operation (S130).

When the control unit 60 determines that the document Gn is not in the status during switch-back feeding after second side scanning (S44: N), the control unit can determine that the document Gn is stopped in the status during second side feeding. When the control unit 60 allows the motor 67 to rotate in the CW direction (S32), the feed rollers 35A to 35D rotate in the feeding direction and the document Gn is fed in the document feed path 32 with the first side thereof opposed to the scanning position. The guide flap 50 is changed to the first guiding posture with the transmission of the CW rotation of the motor 67.

When the document Gn is fed in the document feed path 32 by a predetermined distance, the document is sensed by the rear sensor 54. When the rear sensor 54 is turned on (S133:Y), the control unit 60 can determine that the stopped document Gn is fed normally. In this case, when the control unit 60 allows the motor 67 to continuously rotate in the CW direction, the document Gn is guided to the document discharge tray 31 side through the connection position 38 by the guide flap 50 and is discharged to the document discharge tray 31 from the document feed path 32 (S135). Accordingly, the document Gn stopped in the document feed path 32 in the status during second side feeding due to the stop of feeding can be discharged to the document discharge tray 31 with the first side thereof downward.

As described above, according to the image scanner 1, when the stopped feeding of the document Gn is resumed and the control unit 60 determines that the document Gn is in the status during switch-back feeding in the double-sided scanning feeding mode on the basis of the feeding mode information, the scanning status information, and the rotation direction information, the control unit discharge the document from the end 41 of the bidirectional feed path 39 by allowing the motor 67 to rotate in the same direction as the rotation direction indicated by the rotation direction information. Accordingly, it is possible to reliably discharge the document Gn in the status during switch-back feeding before the stop of feeding externally.

Specifically, when the rotation direction of the motor 67 is switched by the control unit 60 in consideration of the time lag in detecting the trailing end of the document Gn by the switch-back sensor 55, failure of the switch-back feeding operation does not occur due to the variation in time lag which can occur when the feeding of the document Gn is stopped in the state where the trailing end of the document Gn abuts on the detector 56 of the switch-back sensor 55 or in the state where the detector 56 is allowed to rotate right before the On/Off states of the switch-back sensor 55 are switched.

In addition, in the image scanner 1, the bidirectional feed path 39 for feeding again the document Gn to the document feed path 32 has been formed to extend from the connection position 38 on the downstream side of the scanning position in the document feed path 32 and to intersect the intersection position 40 on the upstream side of the scanning position. The feed path of the bidirectional feed path 39 is only an example and the invention is not limited to the feed paths of the document feed path 32 and the bidirectional feed path 39 described in the aspects. Accordingly, the guide flap 46 and the guide flap 47 may be properly modified depending on the feed path of the bidirectional feed path or for example, a flexible film may be employed as a guide member instead of the guide flaps 46 and 47.

What is claimed is:

1. A document feeder comprising;
   a document accommodating section for accommodating a document;
   a document feeding unit for feeding the document from the document accommodating section to a document discharging section;
   a document feed path that connects the document accommodating section and the document discharging section by way of a scanning position, the document feed path having an end portion that is disposed above the document accommodating section, the document feed path used for scanning both sides of the document by document feeding process including a first feed process, a second feed process and a third feed process,
   in the first feed process, the document being fed by the document feeding unit from the document accommodating section, by way of the scanning position, to the end portion disposed above the document accommodating section,
   in the second feed process, the document being fed by the document feeding unit from the end portion, by way of the scanning position, back to the end portion, in the third feed process, the document being fed by the document feeding unit from the end portion, by way of the scanning position, to the document discharging section,
a first detecting section that is disposed in a position between the document accommodating section and the end portion;
a second detecting section that is disposed in a position between the end portion and the document discharging section; and
a controller configured to determine, based on a detecting information obtained by at least one of the first detecting section and the second detecting section, that the document feeding process is stopped during the first feed process, and the controller further configured to feed a document stopped during the first feed process to the end portion, to feed the document from the end portion by way of the scanning position back to the end portion, and to feed the document from the end portion to the document discharging section.

2. The document feeder according to claim 1,
wherein the controller is configured to determine, based on the detecting information obtained by at least one of the first detecting section and the second detecting section, that the document feeding process is stopped during the third feed process, and
wherein the controller is further configured to control the document feeding unit so as to discharge a document stopped during the third feed process to the document discharging section.

3. The document feeder according to claim 1,
wherein the controller is configured to determine, based on the detecting information obtained by at least one of the first detecting section and the second detecting section, that the document feeding process is stopped during the second feed process, and
wherein the controller is further configured to control the document feeding unit so as to feed a document stopped during the second feed process to the end portion, and to feed the document from the end portion to the document discharging section.

4. The document feeder according to claim 1,
wherein the controller is configured to determine, based on the detecting information obtained by at least one of the first detecting section and the second detecting section, that the document feeding process is stopped during the first feed process and before a document passes through the scanning position, and
wherein the controller is further configured to control the document feeding unit so as to discharge the document stopped during the first feed process before passing the scanning position to the document discharging section.

5. The document feeder according to claim 1,
the controller is configured to perform an operation for setting an initial status, the initial status being set, based on both the first detecting section and the second detecting section failing to detect the document, for feeding the document that is accommodated in the document accommodating section.

* * * * *